(12) United States Patent  (10) Patent No.: US 12,461,503 B2
Sawaoka  (45) Date of Patent: Nov. 4, 2025

(54) CONTROL DEVICE

(71) Applicant: FANUC CORPORATION, Yamanashi (JP)

(72) Inventor: Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 479 days.

(21) Appl. No.: 17/789,418

(22) PCT Filed: Feb. 2, 2021

(86) PCT No.: PCT/JP2021/003743
§ 371 (c)(1),
(2) Date: Jun. 27, 2022

(87) PCT Pub. No.: WO2021/157574
PCT Pub. Date: Aug. 12, 2021

(65) Prior Publication Data
US 2023/0050158 A1  Feb. 16, 2023

(30) Foreign Application Priority Data
Feb. 4, 2020 (JP) ................. 2020-017342

(51) Int. Cl.
G05B 19/404 (2006.01)
(52) U.S. Cl.
CPC .. G05B 19/404 (2013.01); *G05B 2219/37506* (2013.01)
(58) Field of Classification Search
CPC ............. B25J 9/1664; G05B 19/404; G05B 2219/37506; G05B 2219/39444
See application file for complete search history.

(56) References Cited

U.S. PATENT DOCUMENTS

2015/0094847 A1* 4/2015 Liu .............. G05B 19/404
700/174
2016/0332297 A1* 11/2016 Sugaya ............. B25J 9/1671
(Continued)

FOREIGN PATENT DOCUMENTS

CN  104950808 A  9/2015
CN  108469783 A  8/2018
(Continued)

OTHER PUBLICATIONS

International Search Report issued in PCT/JP2021/003743; mailed Apr. 20, 2021.
(Continued)

*Primary Examiner* — Tameem D Siddiquee
(74) *Attorney, Agent, or Firm* — Studebaker Brackett PLLC

(57) ABSTRACT

The present invention corrects errors made by a machining tool having a discretionary machine configuration, by using a graph in which constituent elements serve as nodes. This control device comprises: a control point coordinate system insertion unit that inserts, as nodes, a control point and a coordinate system, for each node of a machine configuration graph; an identifier allocation unit that allocates an identifier to the inserted control points and coordinate systems; an error information storage unit that stores information relating to a machine error on a control subject, and the identifier allocated to the coordinate system in which the machine error was observed; an error node generation unit that converts the machine error to an equivalent error node; and an error node addition unit that adds the error node to the machine configuration graph.

12 Claims, 51 Drawing Sheets

(56) References Cited

U.S. PATENT DOCUMENTS

2018/0164782 A1* 6/2018 Koga ................... G05B 19/19
2019/0129785 A1* 5/2019 Liu ................... G06F 11/0751

FOREIGN PATENT DOCUMENTS

| CN | 108555908 A | 9/2018 |
|----|----|----|
| JP | 5105024 B2 | 12/2012 |
| JP | 2018-120543 A | 8/2018 |
| JP | 2019-012342 A | 1/2019 |
| JP | 6549683 B2 | 7/2019 |
| JP | 2019-212041 A | 12/2019 |

OTHER PUBLICATIONS

Li, Yang; "An algorithm of straight-line approaching with approximate equal-error for BHF control based on servo drive"; Manufacturing Technology & Machine Tool; Jun. 2016; total 17 pages; China Academic Journal Electronic Publishing House; Qinhuangdao, China; DOI: 10.19287/j.cnki.1005-2402.2016.06.030.

* cited by examiner

MACHINE CONFIGURATION TREE

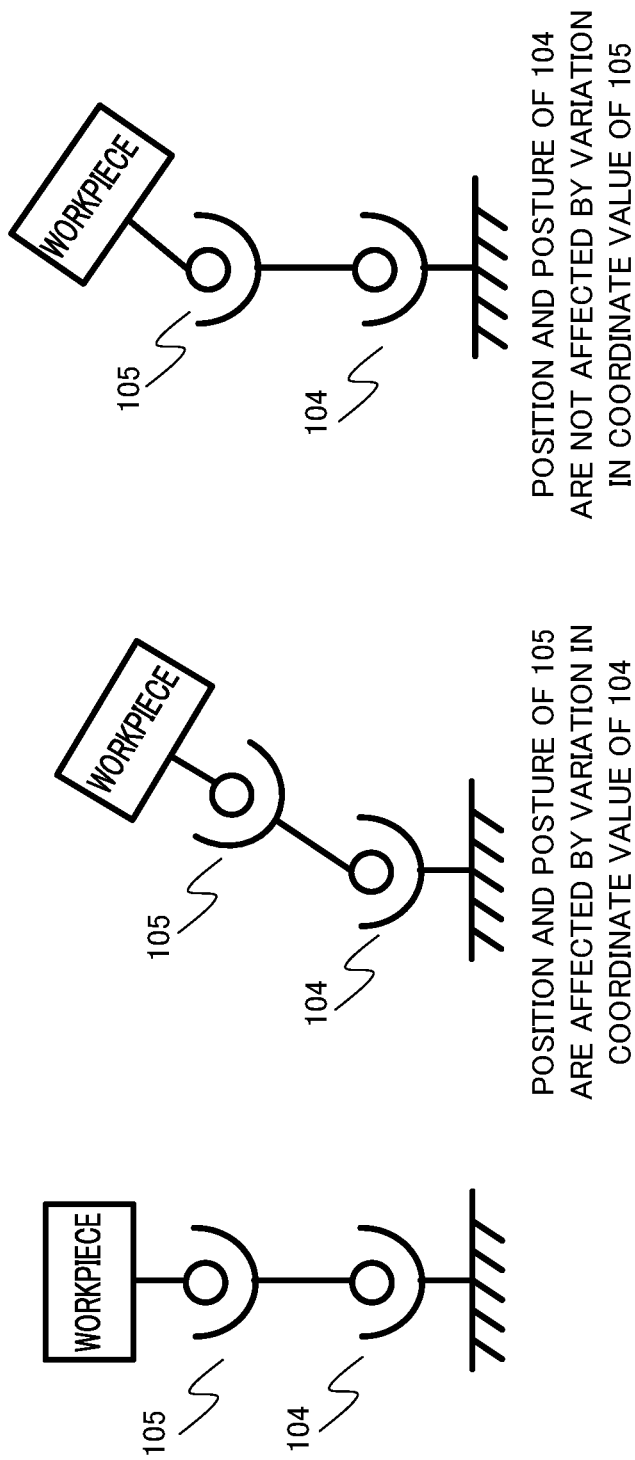

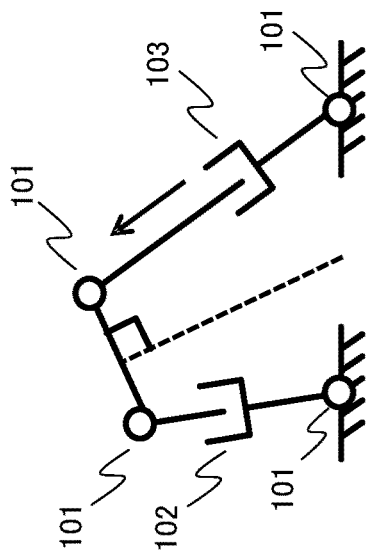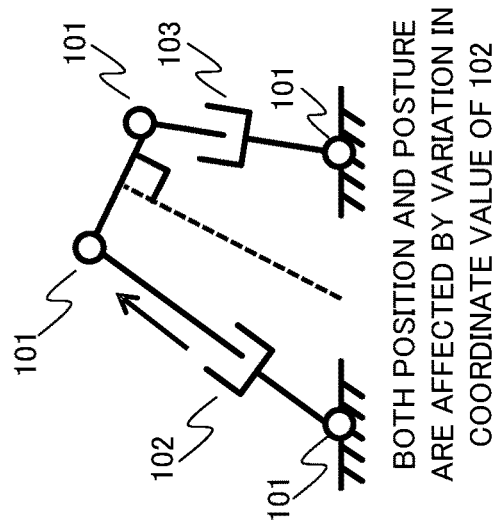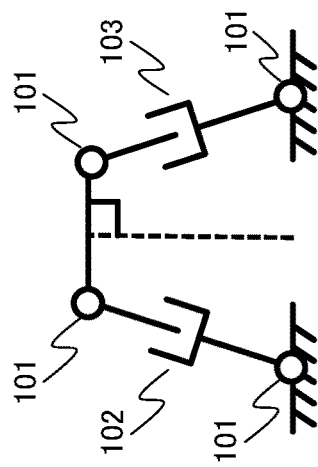

FIG. 10C
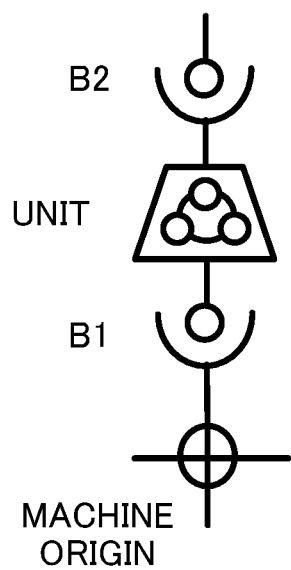
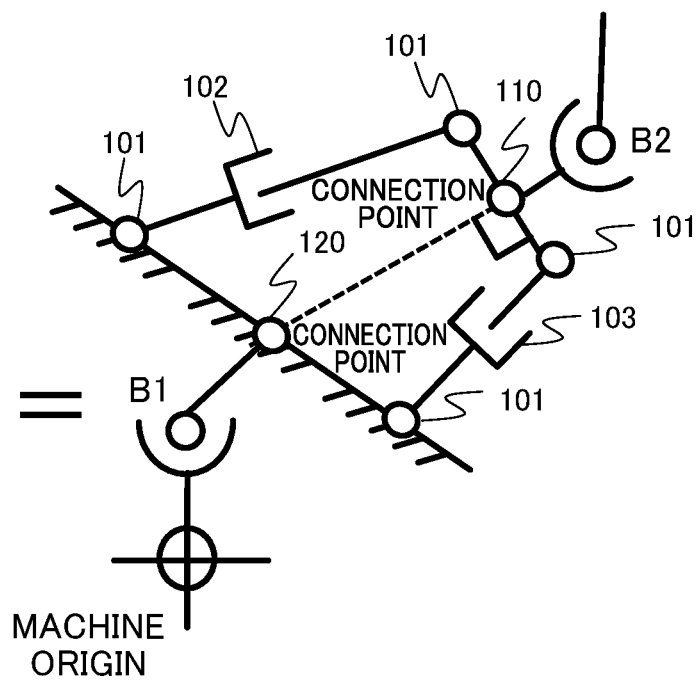

FIG. 11
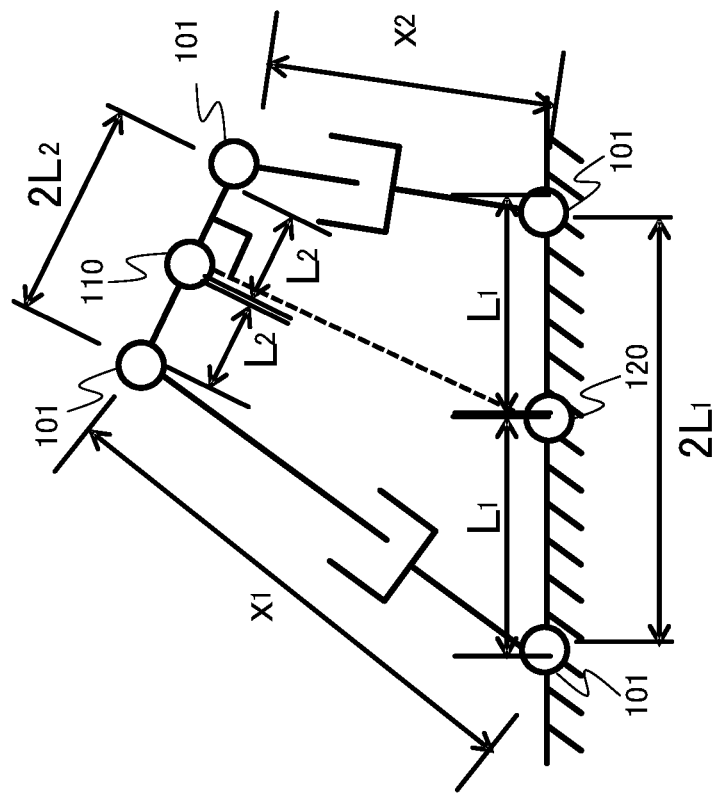
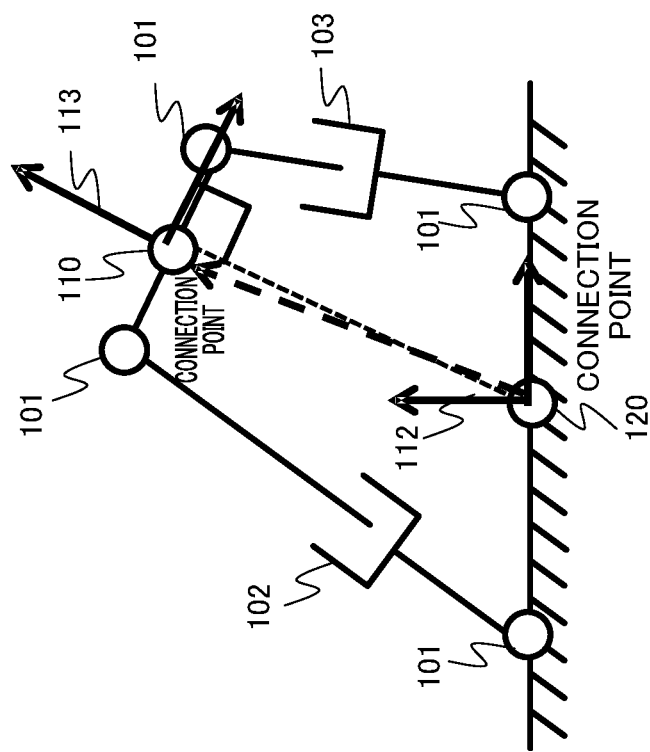
HOMOGENEOUS MATRIX $M_A$ INDICATING POSITION AND POSTURE OF CONNECTION POINT 120
HOMOGENEOUS MATRIX $M_B$ INDICATING POSITION AND POSTURE OF CONNECTION POINT 110

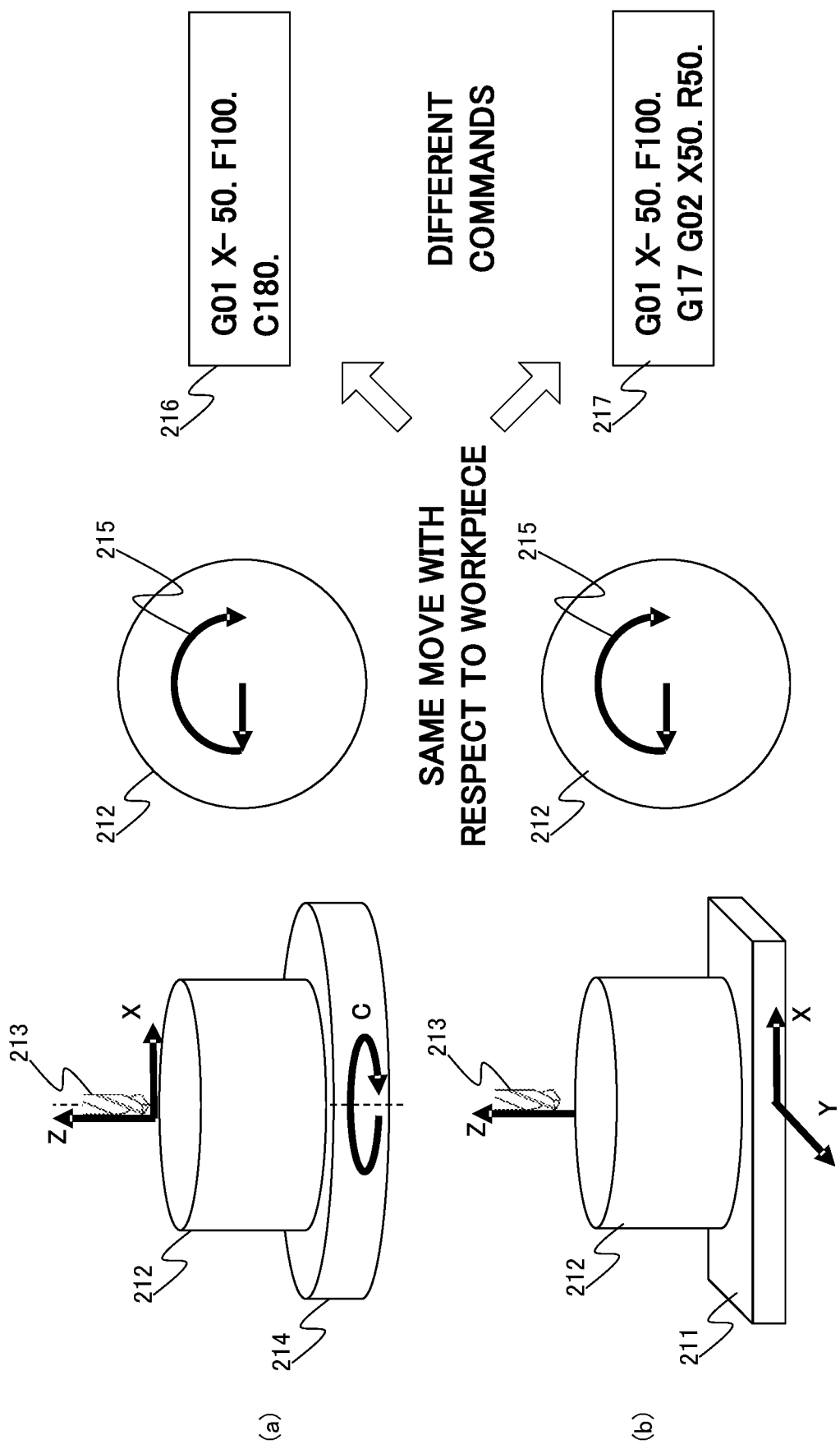

MACHINE CONFIGURATION 300

MACHINE ORIGIN

MACHINE CONFIGURATION TREE

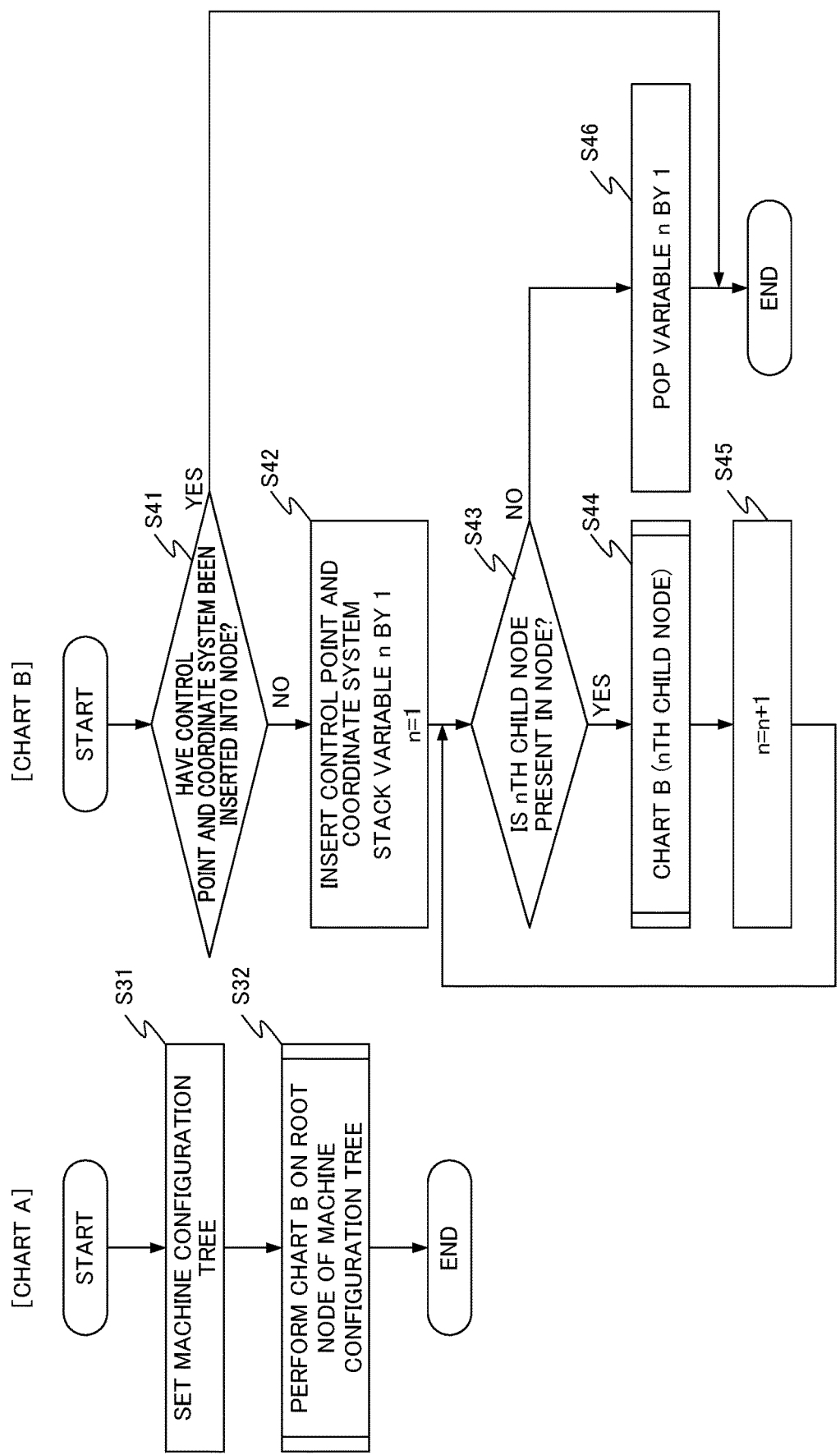

FIG. 25

```
====SPECIFY COORDINATE SYSTEM======
G54.9 <WORKPIECE 1>;    // SPECIFY NODE "WORKPIECE 1" AS COORDINATE SYSTEM
G54.8 P<WORKPIECE 1> <WORK1>;  //SET ANOTHER IDENTIFIER OF "WORK1" TO NODE "WORKPIECE 1"
G54.9 P<WORK1>; // USE ANOTHER IDENTIFIER OF "WORK1" TO SPECIFY NODE "WORKPIECE 1" AS
COORDINATE SYSTEM

G54.7 P<C1> X_Y_Z_;// SET COORDINATE SYSTEM CROSS-OFFSET OF NODE "C1"
G54.6 P<C1> I_J_K_;// SET COORDINATE SYSTEM POSTURE MATRIX OF NODE "C1" WITH Roll/Pitch/Yaw/
PITCH/YAW
G54.9 P<C1>;   // SPECIFY NODE "C1" AS COORDINATE SYSTEM (FOREGOING CROSS-OFFSET AND POSTURE
MATRIX BEING ADDED)

====SPECIFY CONTROL POINT======
G43.9 <TOOL 1>;    // SPECIFY NODE "TOOL 1" AS CONTROL POINT
G43.8 P<TOOL 1> <TOOL1>; // USE ANOTHER IDENTIFIER OF "TOOL1" TO SPECIFY NODE "TOOL 1" AS
CONTROL POINT
G43.9 P<TOOL1>; //THE NODE [TOOL 1] IS SPECIFIED BY ANOTHER IDENTIFIER OF "TOOL1" AS THE CONTROL
POINT

G43.7 P<B1> X_Y_Z_;// SET CONTROL POINT CROSS-OFFSET OF NODE "B1"
G43.6 P<B1> I_J_K_;// SET CONTROL POINT POSTURE MATRIX OF NODE "B1" WITH Roll/Pitch/Yaw
G43.9 P<B1>;  //SPECIFY NODE "B1" AS CONTROL POINT (FOREGOING CROSS-OFFSET AND POSTURE
MATRIX BEING ADDED)
```

FIG. 26

------SPECIFY COORDINATE SYSTEM------

G54.9 <COORDINATE SYSTEM [WORKPIECE 1]>; //SPECIFY NODE "COORDINATE SYSTEM [WORKPIECE 1]" AS COORDINATE SYSTEM
G54.8 P<COORDINATE SYSTEM [WORKPIECE 1]> <WORK1>; // ANOTHER IDENTIFIER OF "WORK1" IS SET TO THE NODE "COORDINATE SYSTEM [WORKPIECE 1]"
G54.9 P<WORK1>; //USE ANOTHER IDENTIFIER OF "WORK1" TO SPECIFY NODE "COORDINATE SYSTEM [WORKPIECE 1]" AS COORDINATE SYSTEM

G54.7 P<COORDINATE SYSTEM [C1]> X_Y_Z_; // SET COORDINATE SYSTEM CROSS-OFFSET OF NODE "COORDINATE SYSTEM [C1]"
G54.6 P<COORDINATE SYSTEM [C1]> I_J_K_; // SET COORDINATE SYSTEM POSTURE MATRIX OF NODE "COORDINATE SYSTEM [C1]" WITH Roll/Pitch/Yaw
G54.9 P<COORDINATE SYSTEM [C1]>; //SPECIFY NODE "COORDINATE SYSTEM [C1]" AS COORDINATE SYSTEM(FOREGOING CROSS-OFFSET AND POSTURE MATRIX BEING ADDED)

------SPECIFY CONTROL POINT------

G54.9 <CONTROL POINT [TOOL 1]>; // SPECIFY NODE "CONTROL POINT [TOOL 1]" AS CONTROL POINT
G54.8 P<CONTROL POINT [TOOL 1]> <TOOL1>; // SET ANOTHER IDENTIFIER OF "TOOL1" TO NODE "CONTROL POINT [TOOL 1]"
G54.9 P<TOOL1>; // USE ANOTHER IDENTIFIER OF "TOOL1" TO SPECIFY NODE "CONTROL POINT [TOOL 1]" AS CONTROL POINT

G54.7 P<CONTROL POINT [B1]> X_Y_Z_; // SET CONTROL POINT CROSS-OFFSET OF NODE "CONTROL POINT [B1]"
G54.6 P<CONTROL POINT [B1]> I_J_K_; // SET CONTROL POINT POSTURE MATRIX OF NODE "CONTROL POINT [B1]" WITH Roll/Pitch/Yaw
G54.9 P<CONTROL POINT [B1]>; //SPECIFY NODE "CONTROL POINT [B1]" AS CONTROL POINT (FOREGOING CROSS-OFFSET AND POSTURE MATRIX BEING ADDED)

FIG. 27

```
COORDINATE SYSTEM
G254.9 P<WORKPIECE1> Q<C1> 0;
G154.9 P<WORKPIECE1> Q<C1> 0;
G54.9 P<WORKPIECE1>;
```

ERROR OFFSET VECTOR

CONTROL DEVICE

TECHNICAL FIELD

The present invention relates to a controller.

BACKGROUND ART

Normally, in a controller which controls a machine tool or a robot, a control point which is included in the machine tool or the robot and which is a control target is controlled by use of a command value on a program. For example, in a machine tool, a tool root position is normally used as a control point.

On the other hand, when a tool length offset function is used or when tool tip point control is performed, a tool tip position is used as a control point. Then, control is performed such that these control points are moved to coordinate values specified by command values.

However, in an actual machine, there are often errors in numerical values indicating a tool tip point position, a tool root position, and a tool posture. For this reason, due to these errors, the tool tip point position and the tool posture may not follow the command values.

In this regard, as a technique for compensating errors, there has been known a technique related to a numerical controller that controls a machine tool having a linear axis and a rotary axis in order to realize machining with high precision by compensating an influence due to a translational error and an attitude error dependent on movement of the linear axis and a translational error and an attitude error dependent on movement of the rotary axis, the numerical controller including: a linear axis dependent position compensation amount calculating means for calculating a position compensation amount of the linear axis from the translational error and the attitude error dependent on the movement of the linear axis; a rotary axis dependent position compensation amount calculating means for calculating a position compensation amount of the linear axis from the translational error and the attitude error dependent on the movement of the rotary axis; a rotary axis angle compensation amount calculating means for calculating an angle compensation amount of the rotary axis from a part of the attitude error dependent on the movement of the linear axis and a part of the attitude error dependent on the movement of the rotary axis; and a position addition compensation amount calculating means for calculating a position compensation amount of the linear axis corresponding to the rotary axis compensation amount (for example, see Japanese Patent No. 5105024).

On the other hand, there has been known a technique for expressing a machine configuration of an industrial machine to be controlled in the form of a graph in which constituent elements are nodes and for controlling the industrial machine having an arbitrary machine configuration based on the graph (for example, see Japanese Patent No. 6549683).

Patent Document 1: Japanese Patent No. 5105024
Patent Document 2: Japanese Patent No. 6549683

DISCLOSURE OF THE INVENTION

Problems to be Solved by the Invention

Since the normal error compensation technique is not provided for a machine tool having an arbitrary machine configuration, it is conceivable to employ a means for applying a control technique using the graph, in which the constituent elements are nodes, for error compensation as described above. However, it has been difficult to apply the conventional control technique using the graph, in which the constituent elements are nodes, for error compensation as it is.

There is a demand for a technique for compensating an error in a machine tool having an arbitrary machine configuration by using a graph in which constituent elements are nodes.

Means for Solving the Problems

One aspect of the present disclosure provides a controller that expresses a machine configuration of a control target in a form of a graph in which constituent elements are nodes and that holds the machine configuration, the controller including: a control point coordinate system insertion portion that inserts, as a node, a control point and a coordinate system into each of the nodes in the graph of the machine configuration; an identifier allocation portion that allocates an identifier to the control point and the coordinate system which have been inserted; an error information storage portion that stores information related to a machine error in the control target and the identifier allocated to a coordinate system in which the machine error is observed; an error node generation portion that transforms the machine error into an equivalent error node; an error node addition portion that adds the error node in the graph of the machine configuration; a control point coordinate system specification portion that specifies, with the identifier, one or more sets of the control point and the coordinate system in the graph of the machine configuration; a command value determination portion that uses the control point and the coordinate system specified by the control point coordinate system specification portion to determine for which control point and on which coordinate system one or more command values commanded in a program correspond to a coordinate value; and a movement command portion that commands movement of the control point such that the coordinate value of the control point become equal to the command value.

Another aspect of the present disclosure provides a controller that expresses a machine configuration of a control target in a form of a graph in which constituent elements are nodes and that holds the machine configuration, the controller including: a control point coordinate system insertion portion that allows each of the nodes in the graph of the machine configuration to have a control point and a coordinate system as information; an identifier allocation portion that allocates an identifier to the control point and the coordinate system which have been inserted; an error information storage portion that stores information related to a machine error in the control target and the identifier allocated to a coordinate system in which the machine error is observed; an error node generation portion that transforms the machine error into an equivalent error node; an error node addition portion that adds the error node in the graph of the machine configuration; a control point coordinate system specification portion that specifies, with the identifier, one or more sets of the control point and the coordinate system in the graph of the machine configuration; a command value determination portion that uses the control point and the coordinate system specified by the control point coordinate system specification portion to determine for which control point and on which coordinate system one or more command values commanded in a program correspond to a coordinate value; and a movement command portion that commands movement of the control point such that the coordinate value of the control point becomes equal to the command value.

Effects of the Invention

According to the present invention, it is possible to compensate an error in a machine tool having an arbitrary machine configuration by using a graph where constituent elements are nodes.

BRIEF DESCRIPTION OF THE DRAWINGS

FIG. 9A is a diagram showing an example of a parent-child relationship of the machine configuration according to the embodiment of the present invention;

FIG. 9B is a diagram showing an example of the parent-child relationship of the machine configuration according to the embodiment of the present invention;

FIG. 10C is a diagram showing an example of the unit included in the machine configuration according to the embodiment of the present invention;

FIG. 11 is a diagram showing an example of the machine configuration according to the embodiment of the present invention;

FIG. 14 is a diagram showing an example of a command for a workpiece installed in a normal table;

FIG. 20 is a diagram showing a generation operation of inserting the control point into the machine configuration tree in the embodiment of the present invention;

FIG. 25 is a diagram showing an example of a program in the embodiment of the present invention;

FIG. 26 is a diagram showing an example of the program in the embodiment of the present invention;

FIG. 27 is a diagram showing an example of the program in the embodiment of the present invention;

FIG. 29 is a diagram showing an example of the program in the embodiment of the present invention;

FIG. 30 is a diagram showing an example of the program in the embodiment of the present invention;

FIG. 34 is a diagram showing an example of the program in the embodiment of the present invention;

PREFERRED MODE FOR CARRYING OUT THE INVENTION

An embodiment of the present invention will be described in detail below with reference to FIGS. 1 to 48. The configuration of a numerical controller according to the embodiment of the present invention will first be described.

1. CONFIGURATION OF INVENTION

Figure 1:
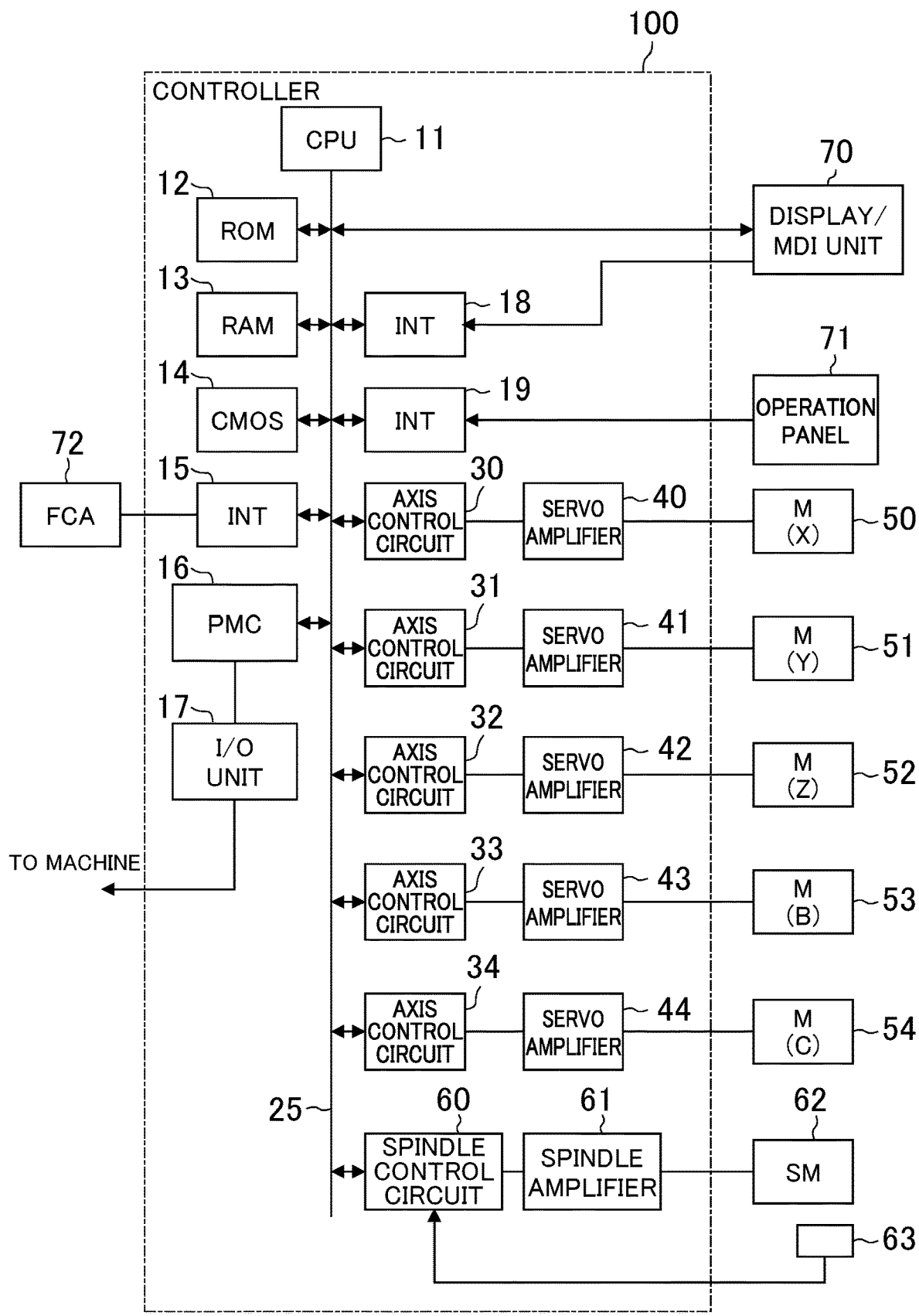
FIG. 1 is a diagram illustrating a configuration of a controller according to an embodiment of the present invention.

FIG. 1 shows an example of the configuration of the numerical controller 100 according to the embodiment of the present invention. The numerical controller 100 mainly includes a CPU 11, a ROM 12, a RAM 13, a CMOS 14, interfaces 15, 18 and 19, a PMC (Programmable Machine Controller) 16, an I/O unit 17, axis control circuits 30 to 34, servo amplifiers 40 to 44, a spindle control circuit 60 and a spindle amplifier 61.

The CPU 11 is a processor which performs overall control on the numerical controller 100. The CPU 11 reads, through a bus 20, a system program stored in the ROM 12 so as to control the entire numerical controller 100 according to the system program.

In the RAM 13, temporary calculation data and display data and various types of data which are input by an operator through a display/MDI unit 70 are stored.

The CMOS memory 14 is configured as a non-volatile memory which is backed up by an unillustrated battery and in which even when the power supply of the numerical controller 100 is turned off, its memory state is held. In the CMOS memory 14, a machining program which is read through the interface 15, a machining program which is input through the display/MDI unit 70 and the like are stored.

Figure 2:
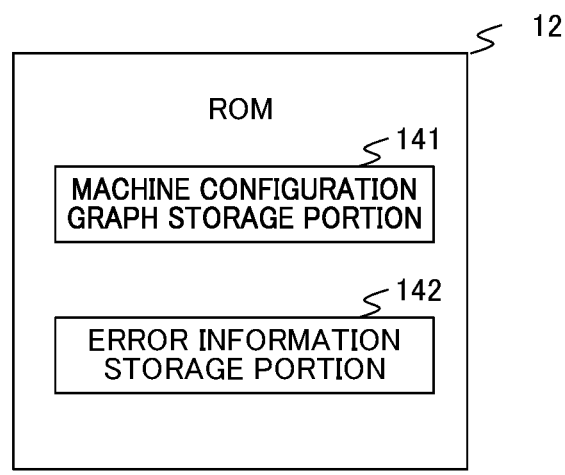
FIG. 2 is a block diagram illustrating a function of a CMOS memory provided in the controller according to the embodiment of the present invention.

In the present embodiment, the ROM 12 includes a machine configuration graph storage portion 141 and an error information storage portion 142. FIG. 2 illustrates a constitution of the ROM 12.

The machine configuration graph storage portion 141 stores a machine configuration in the form of a graph generated by a graph generation portion 111 to be described below, that is, a "machine configuration tree" in the present embodiment.

The error information storage portion 142 stores information related to a machine error in an industrial machine as a control target and an identifier allocated to a coordinate system in which a machine error is observed. It should be noted that the identifier is allocated by an identifier allocation portion 114 which will be described below. A function related to input/output of information between the error information storage portion 142 and another constituent element included in the CPU 11 will be described below in the description of the CPU 11.

In the ROM 12, various types of system programs for performing processing on an edition mode necessary for the production and edition of a machining program and processing for an automatic operation are previously written.

Various types of machining programs such as a machining program for practicing the present invention are input through the interface 15 and the display/MDI unit 70 and can be stored in the CMOS memory 14.

The interface 15 makes it possible to connect together the numerical controller 100 and external equipment 72 such as an adaptor. From the side of the external equipment 72, a machining program, various types of parameters and the like are read. The machining program edited within the numerical controller 100 can be stored through the external equipment 72 in an external storage means.

The PMC (Programmable Machine Controller) 16 uses a sequence program incorporated in the numerical controller 100 so as to output a signal to an auxiliary device of an industrial machine (for example, an actuator such as a robot hand for tool replacement) through the I/O unit 17 and thereby perform control. The PMC (Programmable Machine Controller) 16 also receives signals of various types of switches and the like in an operation panel provided in the main body of the industrial machine, performs necessary signal processing and then feeds the signals to the CPU 11.

The display/MDI unit 70 is a manual data input device which includes a display, a keyboard and the like. The interface 18 receives a command or data from the keyboard of the display/MDI unit 70 and feeds it to the CPU 11. The interface 19 is connected to an operation panel 71 which includes a manual pulse generator and the like.

The axis control circuits 30 to 34 of the individual axes receive, from the CPU 11, the movement command amounts of the individual axes, and output the commands of the individual axes to the servo amplifiers 40 to 44.

The servo amplifiers 40 to 44 receive the commands so as to drive the servo motors 50 to 54 of the individual axes. The servo motors 50 to 54 of the individual axes incorporate position/speed detectors, feedback position/speed feedback signals from the position/speed detectors to the axis control circuits 30 to 34 and thereby perform feedback control on the position and the speed. In the block diagram, the position/speed feedback is omitted.

The spindle control circuit 60 receives a main axis rotation command to the machine tool so as to output a spindle speed signal to the spindle amplifier 61. The spindle amplifier 61 receives the spindle speed signal so as to rotate the spindle motor 62 of the machine tool at a commanded rotation speed and thereby drives a tool.

A pulse encoder 63 is coupled to the spindle motor 62 with a gear, a belt or the like. The pulse encoder 63 outputs a return pulse in synchronization with the rotation of the main axis. The return pulse is read via the bus 20 by the CPU 11.

In the example of the configuration of the numerical controller 100 shown in FIG. 1, the five axis control circuits 30 to 34 and the five servo motors 50 to 54 are shown. However, the present invention is not limited to this configuration, and arbitrary numbers of axis control circuits and servo motors can be provided.

Figure 3:
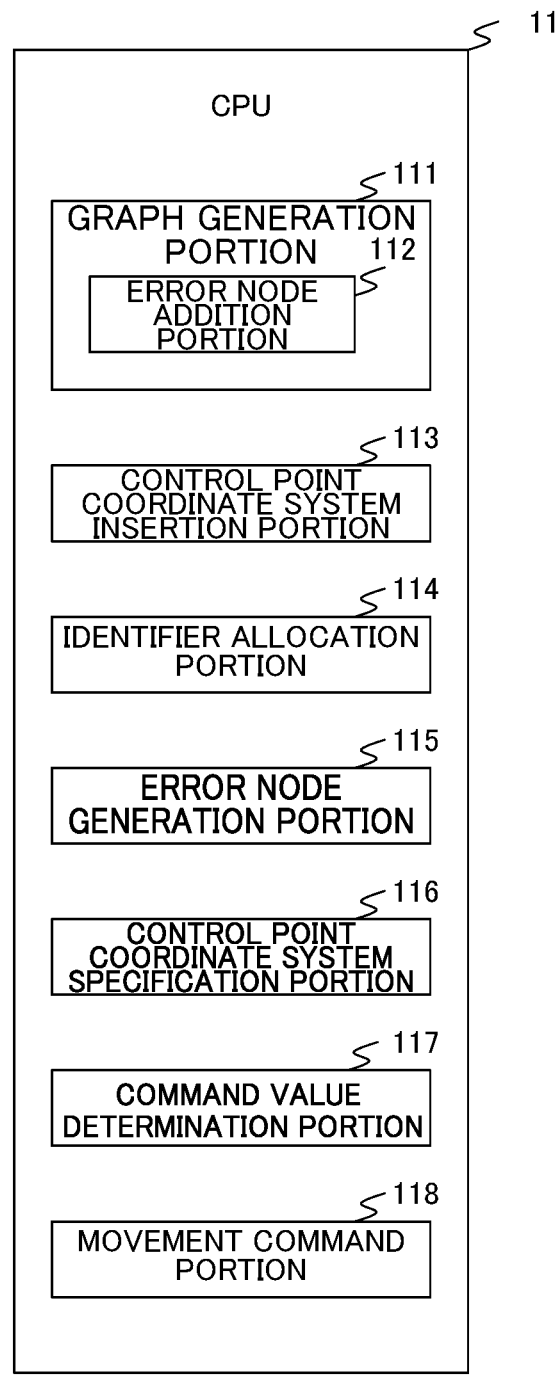
FIG. 3 is a block diagram illustrating a function of a CPU provided in the controller according to the embodiment of the present invention.

FIG. 3 is a functional block diagram showing a function which the CPU 11 reads, through the bus 20, the system program and an application program stored in the ROM 12 so as to realize according to the system program and the application program. The CPU 11 includes a graph generation portion 111, a control point coordinate system insertion portion 113, an identifier allocation portion 114, an error node generation portion 115, a control point coordinate system specification portion 116, a command value determination portion 117, and a movement command portion 118.

The graph generation portion 111 generates the machine configuration of a control target in a graph form. The detailed operation of that portion will be described in detail "2. Generation of machine configuration tree" below.

Further, the graph generation portion 111 includes an error node addition portion 112. A function of the error node addition portion 112 will be described below.

The control point coordinate system insertion portion 113 inserts a control point and a coordinate system into the graph of the machine configuration. The identifier allocation portion 114 allocates an identifier to each of the control point and the coordinate system. The detailed operations of the control point coordinate system insertion portion 113 and the identifier allocation portion 113 will be described in detail in "3. Abstraction of command address" to "8. Derivation of coordinate system from machine configuration tree" below.

The error node generation portion 115 transforms the machine error stored in the error information storage portion 142 into a value relative to an error node insertion position.

The error node transformed by the error node generation portion 115 is added to the machine configuration generated in the form of a graph by the error node addition portion 112, that is, the "machine configuration tree" in the present embodiment.

Specific examples of functions of the error information storage portion 142, the error node generation portion 115, and the error node addition portion 112 will be described in the following "10. Examples".

The control point coordinate system specification portion 116 specifies, with the identifiers, the control point and the coordinate system. Specifically, the control point coordinate system specification portion 116 uses, for example, any one of a command in a program, a parameter setting, a screen operation and an input value from an input means to the numerical controller 100 so as to specify the control point and the coordinate system. The command value determination portion 117 determines for which control point and on which coordinate system the command value in the program is a coordinate value. The detailed operations of the control point coordinate system specification portion 116 and the command value determination portion 117 will be described in detail in "3. Abstraction of command address" to "8. Derivation of coordinate system from machine configuration tree" below.

The movement command portion 118 issues a command for the move of the control point such that the coordinate value of the control point is the command value in the program. The detailed operation of the movement command portion 118 will be described in detail "9. Movement pulse generation method" below. An example of the configuration of the movement command portion 118 will be shown in FIG. 4.

Figure 4:
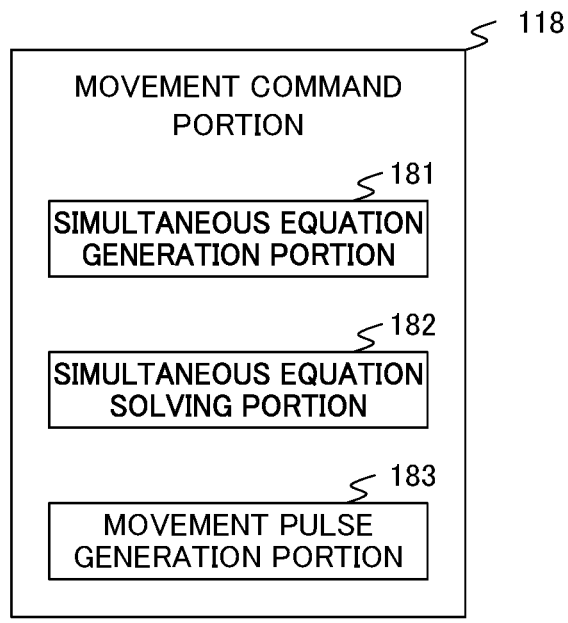
FIG. 4 is a block diagram showing the function of a CPU in the numerical controller according to the embodiment of the present invention.

As shown in FIG. 4, the movement command portion 118 includes a simultaneous equation generation portion 181, a simultaneous equation solving portion 182 and a movement pulse generation portion 183.

The simultaneous equation generation portion 181 uses the method described in "9. Movement pulse generation method" below so as to determine a first coordinate transformation formula of the coordinate value from the coordinate system and the graph of the machine configuration specified, to determine a second coordinate transformation formula of the control point from the control point and the graph of the machine configuration specified and to generate a hypercomplex multidimensional simultaneous equation for defining that the first coordinate transformation formula is equal to the second coordinate transformation formula.

The simultaneous equation solving portion 182 determines the solution of the hypercomplex multidimensional simultaneous equation. The movement pulse generation portion 183 uses the solution generated by the simultaneous equation solving portion 182 so as to generate a movement pulse used in a movement command.

2. GENERATION OF MACHINE CONFIGURATION TREE

The numerical controller 100 according to the embodiment of the present invention first generates the graph showing the machine configuration. A method of generating a machine configuration tree as an example of the graph will be described in detail with reference to FIGS. 5 to 8.

Figure 5:
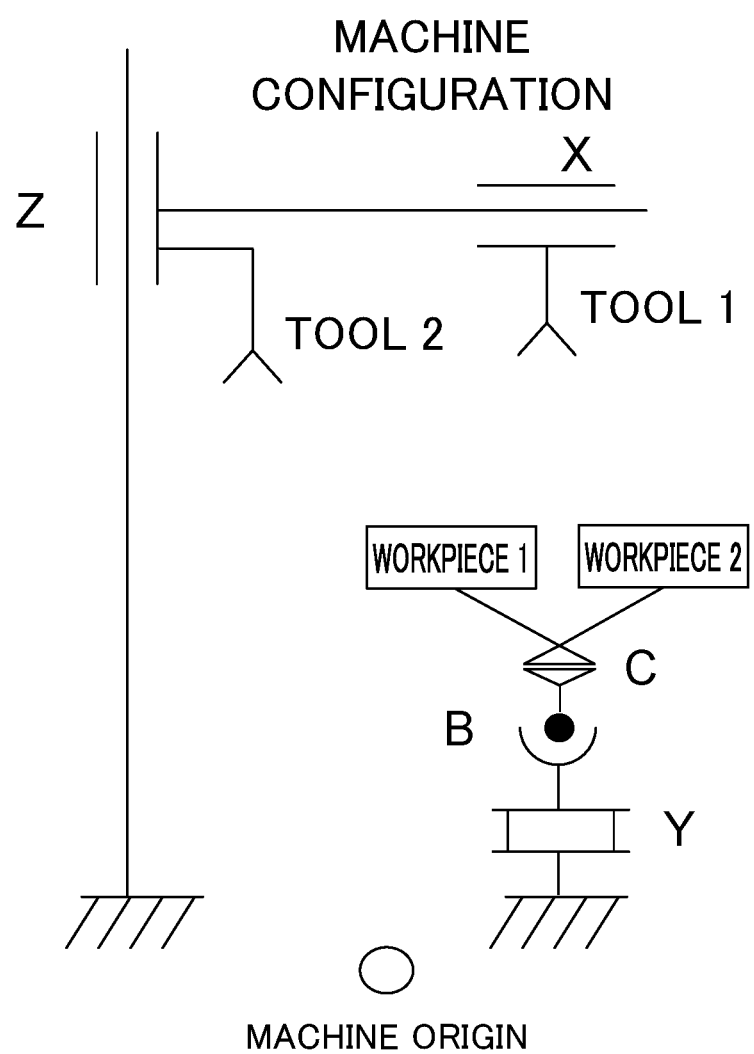
FIG. 5 is a diagram illustrating an example of a machine which is a target for the generation of a machine configuration tree according to the embodiment of the present invention.

As the example, the method of generating the machine configuration tree expressing the configuration of a machine shown in FIG. 5 will be described. In the machine of FIG. 5, it is assumed that an X axis is set perpendicular to a Z axis, that a tool 2 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of expressing the machine configuration as the machine configuration tree will be described below.

Figure 6:
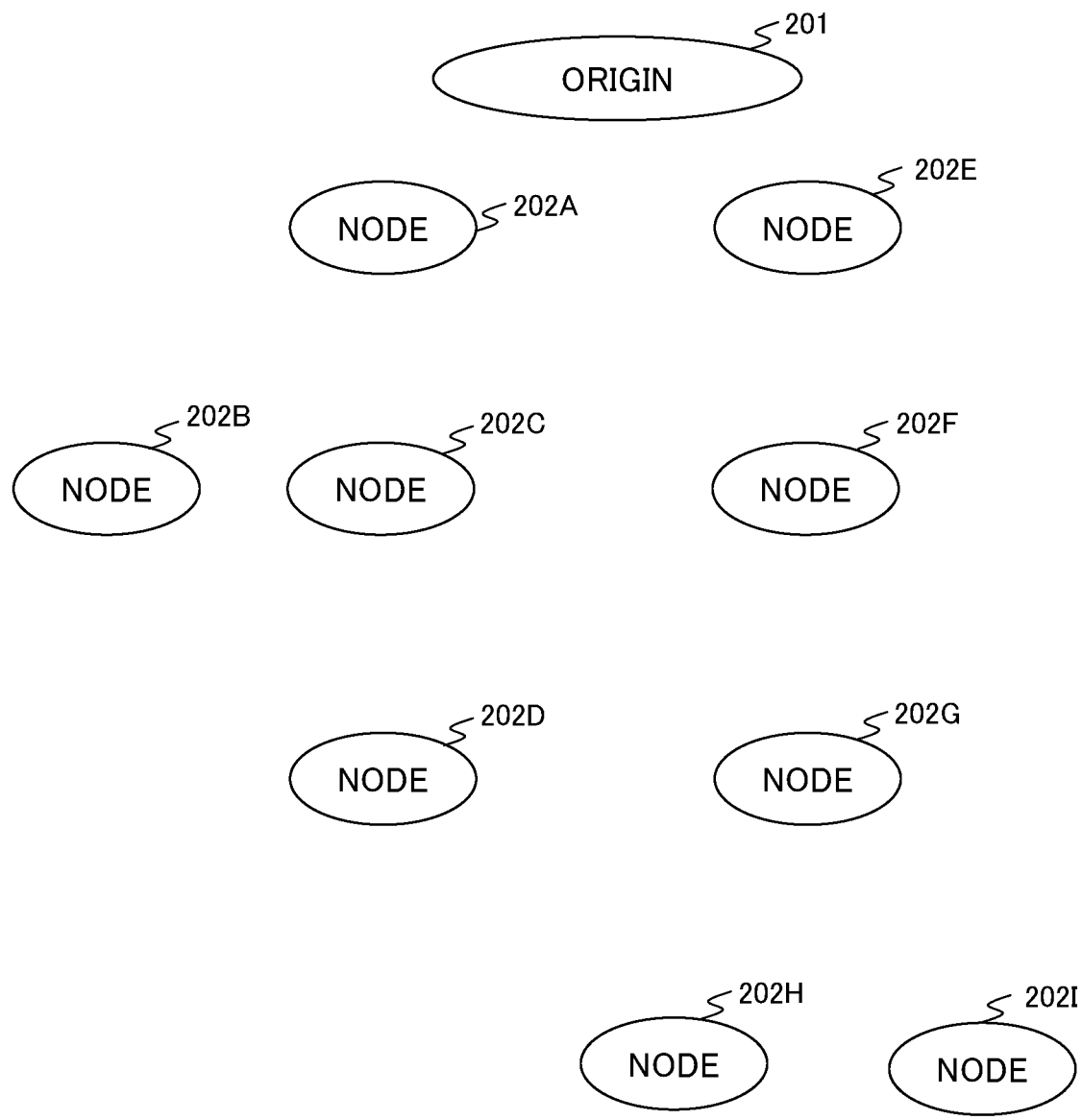
FIG. 6 is a diagram showing a method of generating the machine configuration tree according to the embodiment of the present invention.

First, as shown in FIG. 6, only an origin 201 and nodes 202A to 202G are arranged. In this stage, there is no connection between the origin 201 and the node 202 and between the nodes 202, and the names of the origin and the nodes are not set.

Figure 7:
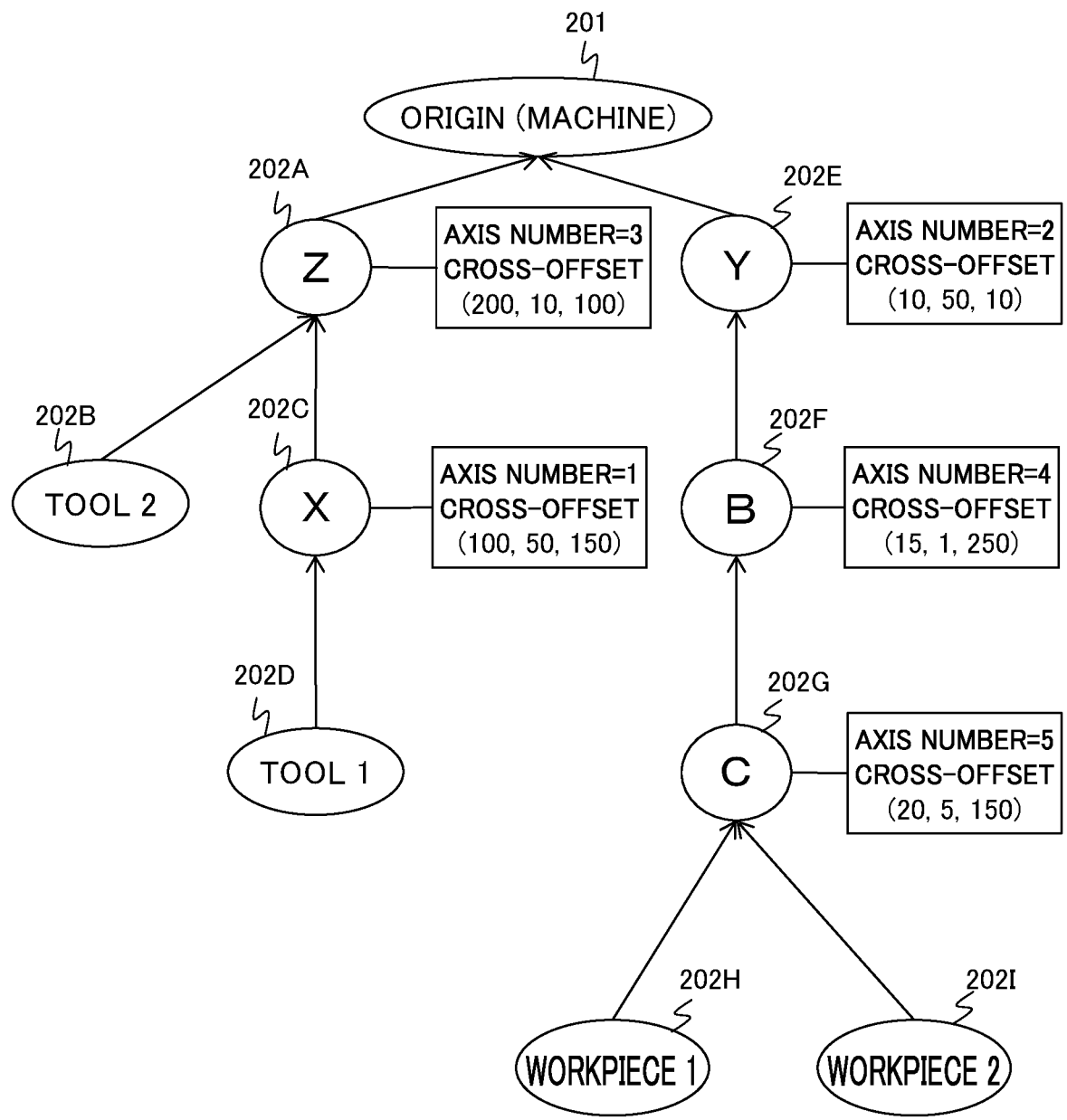
FIG. 7 is a diagram showing a method of generating the machine configuration tree according to the embodiment of the present invention.

Then, the axis names (axis types) of the individual axes, the names of the individual tools, the names of the individual workpieces, the names of the individual origins and the physical axis numbers (axis types) of the individual axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 7 is generated.

Each node of the machine configuration tree is not limited to the pieces of information described above, and it may or may not have information related to, for example, the identifier (name), the identifier of the parent node of itself, the identifiers of all child nodes whose parents are itself, an relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/origin and the like), the physical axis number and the transformation formulas of an orthogonal coordinate system and a physical coordinate system.

In addition, each node of the machine configuration tree may or may not have information necessary for the node itself to be a control point or a coordinate system. The information necessary for the node itself to be a control point or a coordinate system is information as to whether or not, for example, an offset, a posture matrix, movement, and an offset are considered though the details thereof will be described below, and may or may not include them. At this time, the embodiment of a control point coordinate system specification portion to be described below differs depending on whether or not each node has the information necessary for the node itself to be the control point or the coordinate system. When each node does not have the necessary information, the necessary information can also be given to the node by a control point coordinate system insertion portion and a control point coordinate system identifier allocation portion which will be described below.

As described above, values are set to the individual nodes, and thus data which has a data structure in the shape of a machine configuration tree is generated within the numerical controller 100. Furthermore, even when another machine (or robot) is added, an origin is added, and thus it is possible to further add nodes.

Figure 8:
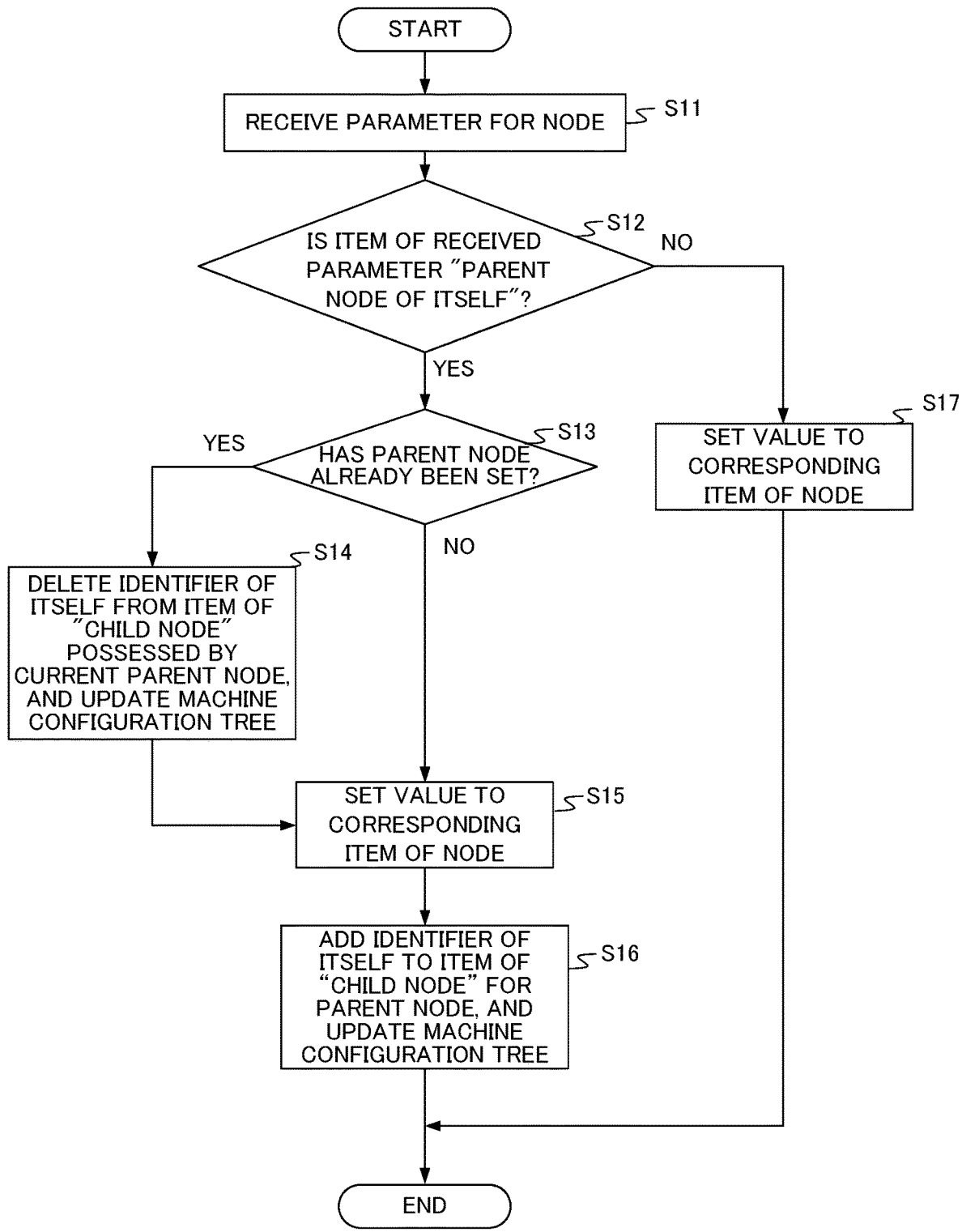
FIG. 8 is a diagram showing a generation operation of the machine configuration tree generated in the embodiment of the present invention.

A flowchart obtained by generalizing the method of generating the machine configuration tree described above, in particular, the method of setting the values to the nodes is shown in FIG. 8.

In step S11, the graph generation portion 111 receives the value of a parameter set to the node. When in step S12, the item of the set parameter is "parent node of itself" (YES in S12), the processing is transferred to step S13. When the item of the set parameter is not "parent node of itself" (NO in S12), the processing is transferred to step S17.

When in step S13, a parent node has already been set to the node to which the parameter is set (YES in S13), the processing is transferred to step S14. When a parent node has not been set (NO in S13), the processing is transferred to step 315.

In step S14, the graph generation portion 111 deletes the identifier of itself from the item of "child node" possessed by the current parent node of the node to which the parameter is set so as to update the machine configuration tree.

In step S15, the graph generation portion 111 sets the value to the corresponding item of the node to which the parameter is set.

In step S16, the graph generation portion 111 adds the identifier of itself to the item of "child node" in the parent node so as to update the machine configuration tree, and thereafter the flow is completed.

In step S17, the graph generation portion 111 sets the value to the corresponding item of the node to which the parameter is set, and thereafter the flow is completed.

The method of generating the data having the data structure in the shape of the machine configuration tree described above is used, and thus it is possible to set a parent-child relationship of the constituent elements of the machine. Here, the parent-child relationship refers to a relationship in which, for example, when as shown in FIG. 9A, two rotary axis nodes 104 and 105 are present, a variation in the coordinate value of the node 104 on one side unilaterally affects the geometric state (typically, the position and the posture) of the node 105 on the other side. In this case, the nodes 104 and 105 are said to have a parent-child relationship, the node 104 is referred to as a parent and the node 105 is referred to as a child. However, for example, as shown in FIG. 9B, in a machine configuration that is configured with two linear axis nodes 102 and 103 and four free joints 101, a mechanism is present in which as the coordinate value (length) of one of the nodes 102 and 103 is varied, not only the geometric state of the other node but also the geometric state of itself is varied, that is, the nodes affect each other. In such a case, both of them are parents and children, and in other words, the parent-child relationship can be regarded as being bidirectional.

Figure 10A:
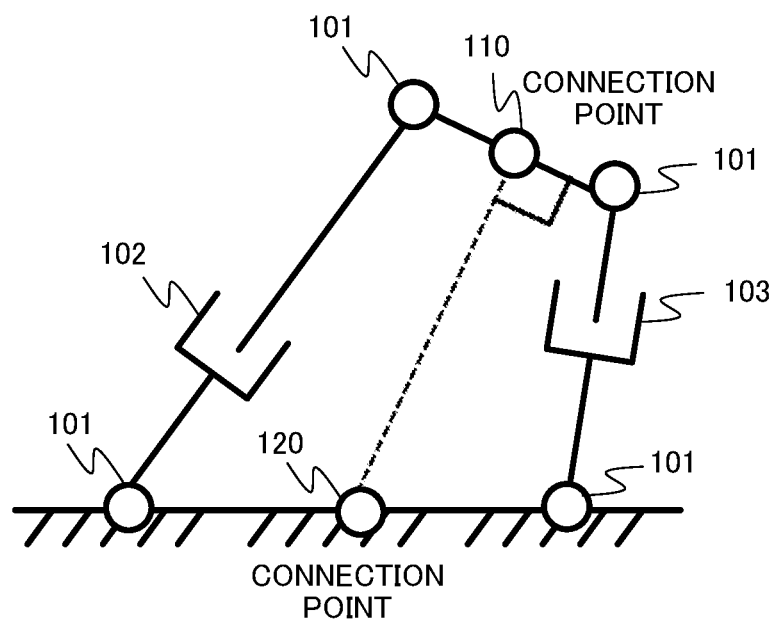
FIG. 10A is a diagram showing an example of a unit included in the machine configuration according to the embodiment of the present invention.
Figure 10B:
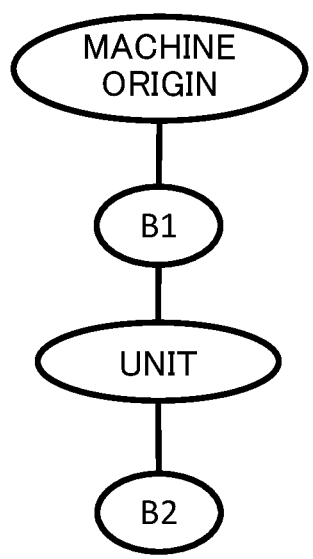
FIG. 10B is a diagram showing an example of the unit included in the machine configuration according to the embodiment of the present invention.

As described above, a mechanism in which a variation in a certain node affects the other node is regarded as one unit in terms of convenience, this unit is inserted into the machine configuration tree and thus the entire machine configuration tree is generated. As shown in FIG. 10A, the unit has two connection points 110 and 120, and when the unit is inserted into the machine configuration tree as shown in FIG. 10B, as shown in FIG. 10C, the parent node is connected to the connection point 120, and the child node is connected to the connection point 110. The unit also has a transformation matrix from the connection point 120 to the connection point 110. This transformation matrix is indicated by the coordinate values of the individual nodes included in the unit. For example, in the case of a machine configuration shown in FIG. 11, when a homogeneous matrix indicating the position and the posture of the connection point 120 is assumed to be $M_A$, and a homogeneous matrix indicating the position and the posture of the connection point 110 is assumed to be $M_B$, a transformation formula between the matrixes is represented as follows by use of the coordinate values $x_1$ and $x_2$ of the linear axis nodes included in the unit.

When it is assumed $$\theta = \sin^{-1}\left(\frac{x_1^2 - x_2^2}{4L_1 L_2}\right)$$

$$L = L_1 \cos\theta + \sqrt{0.5x_1^2 + 0.5x_2^2 - L_2^2 - L_1^2\sin^2\theta}$$

the formula is represented $$M_B = TM_A \text{ where } T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Formula 1] described above. The homogeneous matrix refers to a 4×4 matrix which can collectively express the position and the posture as in the mathematical formula of [Formula 2] below.

$$\begin{pmatrix} \overset{\text{posture}}{\cos\theta} & \overset{}{-\sin\theta} & 0 & \overset{\text{position}}{x} \\ \sin\theta & \cos\theta & 0 & y \\ 0 & 0 & 1 & z \\ 0 & 0 & 0 & 1 \end{pmatrix} \quad [\text{Formula 2}]$$

Even when the parent-child relationship is not mutual, in order for calculation processing or a setting to be simplified, a unit which a plurality of nodes are previously integrated into one may be defined and configured into the machine configuration tree.

Figure 12A:
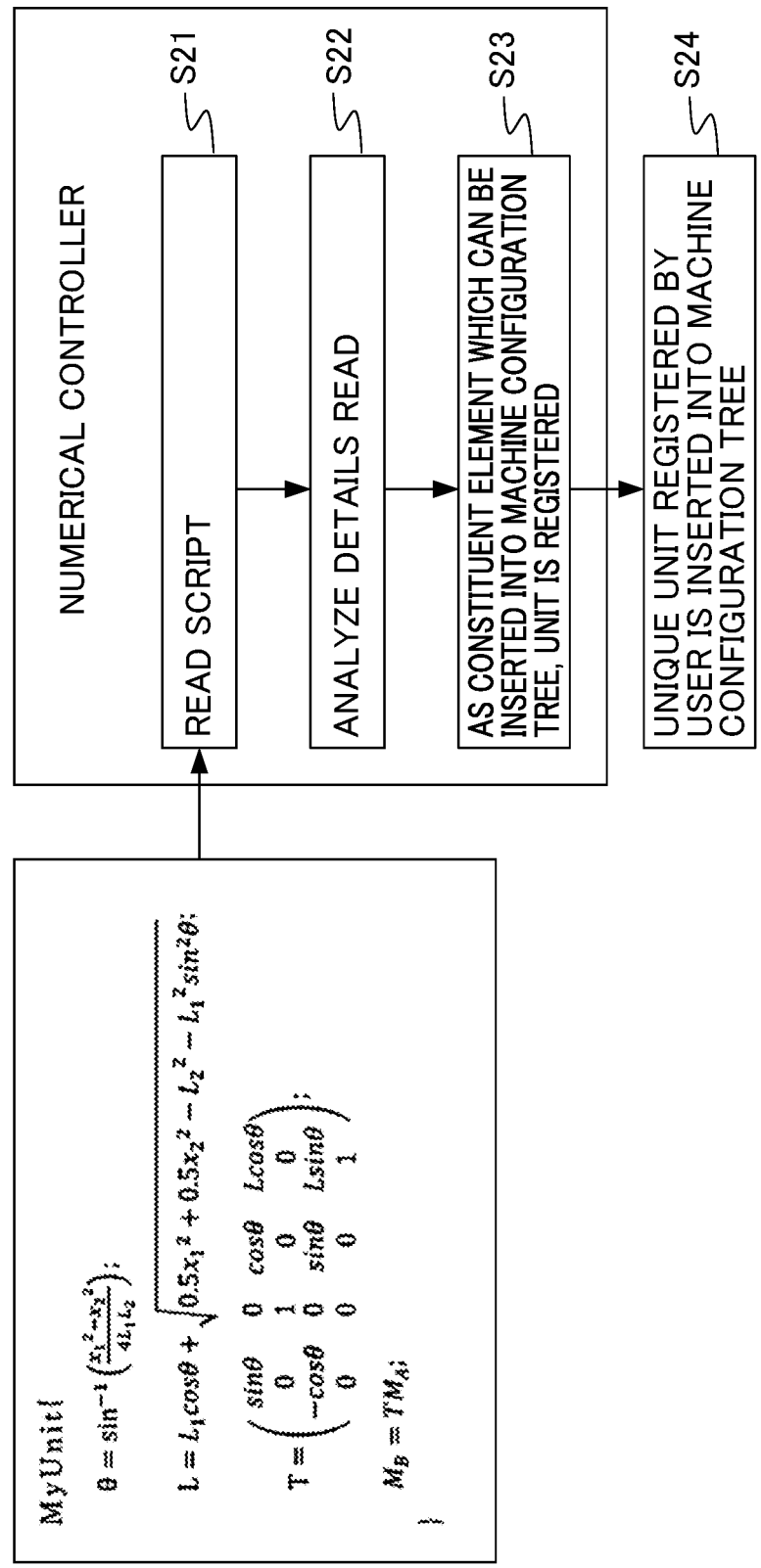
FIG. 12A is a method of defining the unit included in the machine configuration according to the embodiment of the present invention.

The unit described above may be previously defined in the numerical controller or a script which is described uniquely by a user may be read by the numerical controller. FIG. 12A shows an example of a flow when the script described uniquely by the user is read by the numerical controller. In step S21, the numerical controller 100 reads the script defined by the user. In step S22, the numerical controller 100 analyzes the details of the read script, and newly defines a unit. In step S23, the numerical controller 100 newly registers the newly defined unit as a constituent element which can be inserted into a machine configuration graph. Consequently, in step S24, the user can insert the registered unique unit (in the example of FIG. 12B, MyUnit) into the machine configuration tree.

Figure 12B:
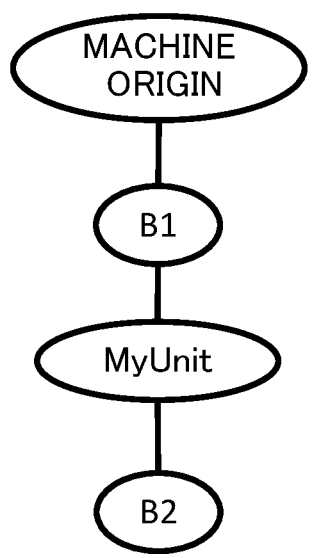
FIG. 12B is a diagram showing an example of the unit included in the machine configuration according to the embodiment of the present invention.

In other words, a configuration may be adopted in which the script uniquely described by the user is read by the numerical controller and the details thereof are analyzed such that a unit is newly defined, and in which this unit is used so as to be able to be configured into the machine configuration tree. FIG. 12B shows an example where the unique unit MyUnit newly defined by the script described in FIG. 12A is inserted into the machine configuration tree. In this way, even when the unit of a form desired by the user is not previously defined in the numerical controller, the user can uniquely add a definition, with the result that convenience is enhanced.

As described above, in the present embodiment, the graph of the machine configuration can include, as a constituent element, a unit in which a plurality of axes is integrated into one.

Figure 13A:
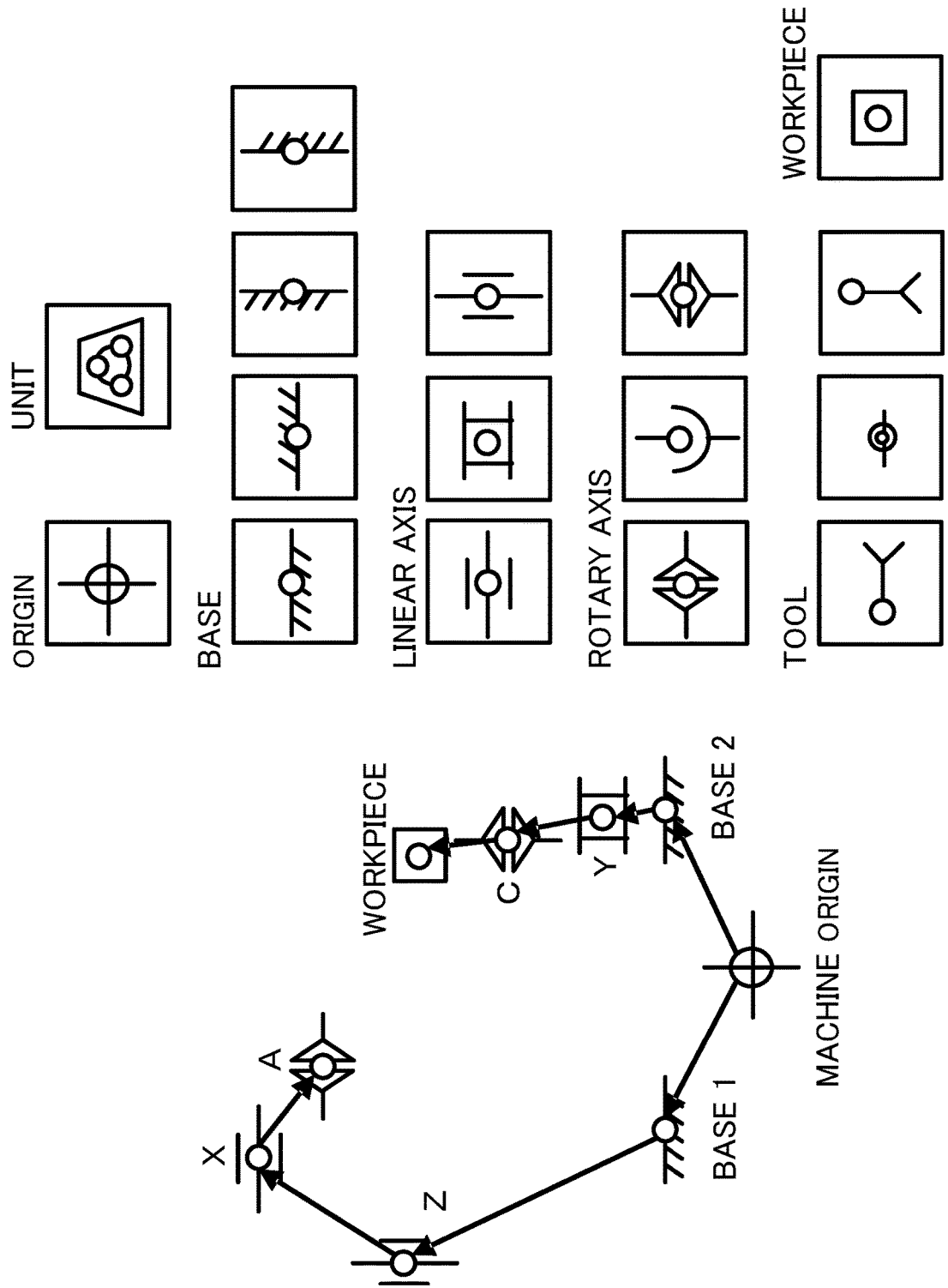
FIG. 13A is a diagram showing an example of a GUI (graphical user interface) in the embodiment of the present invention.
Figure 13B:
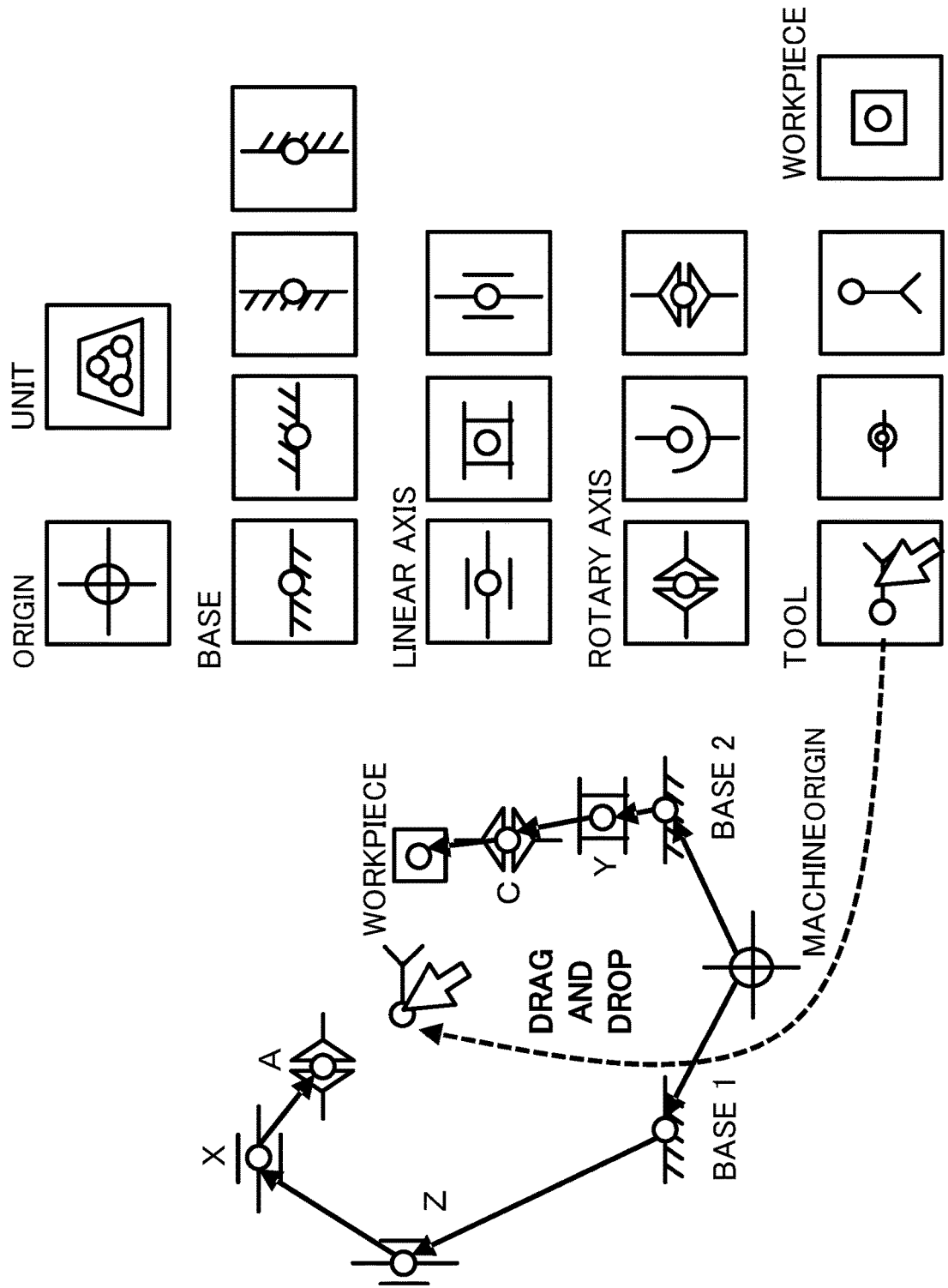
FIG. 13B is a diagram showing an example of the GUI (graphical user interface) in the embodiment of the present invention.
Figure 13C:
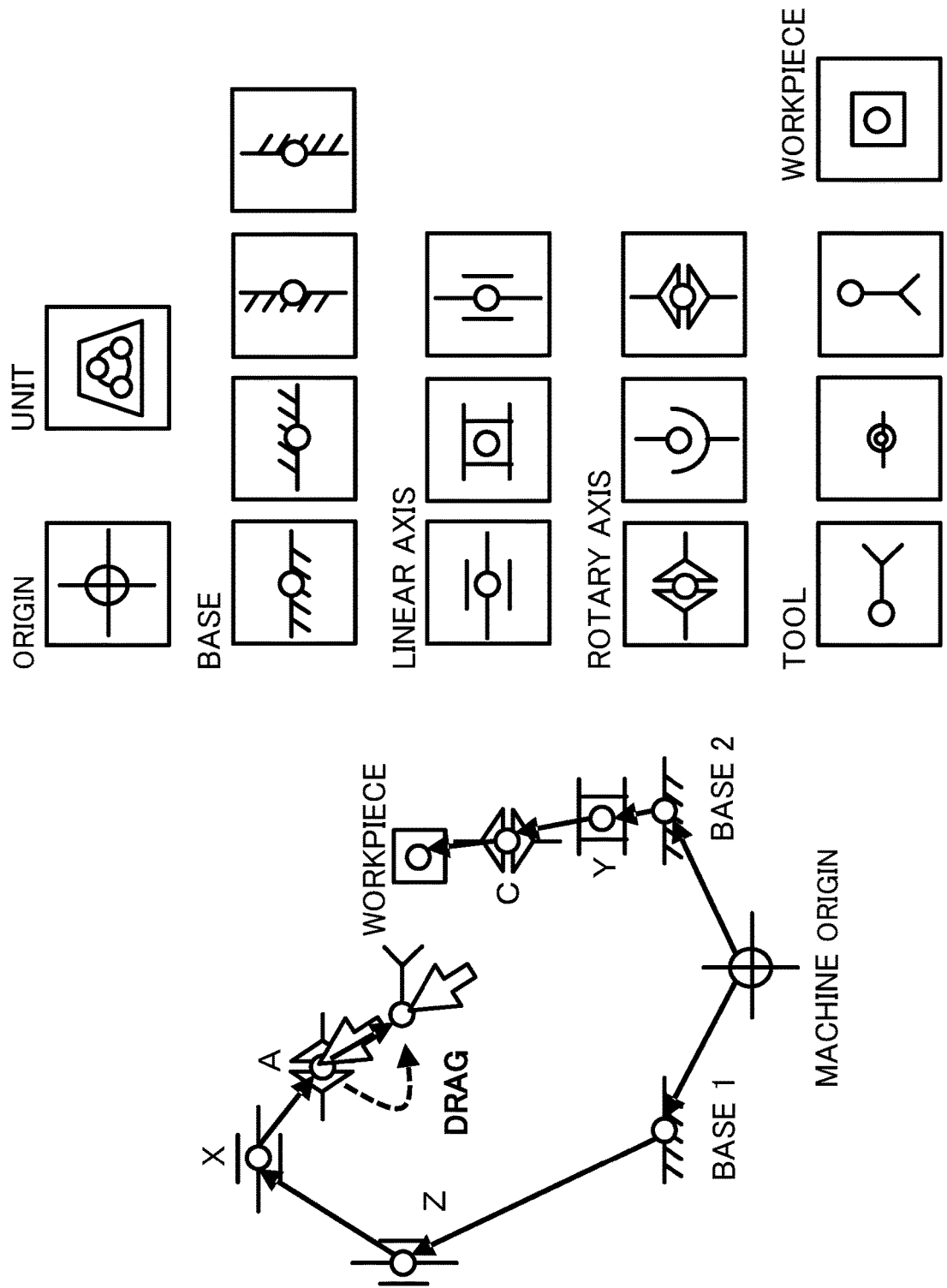
FIG. 13C is a diagram showing an example of the GUI (graphical user interface) in the embodiment of the present invention.
Figure 13D:
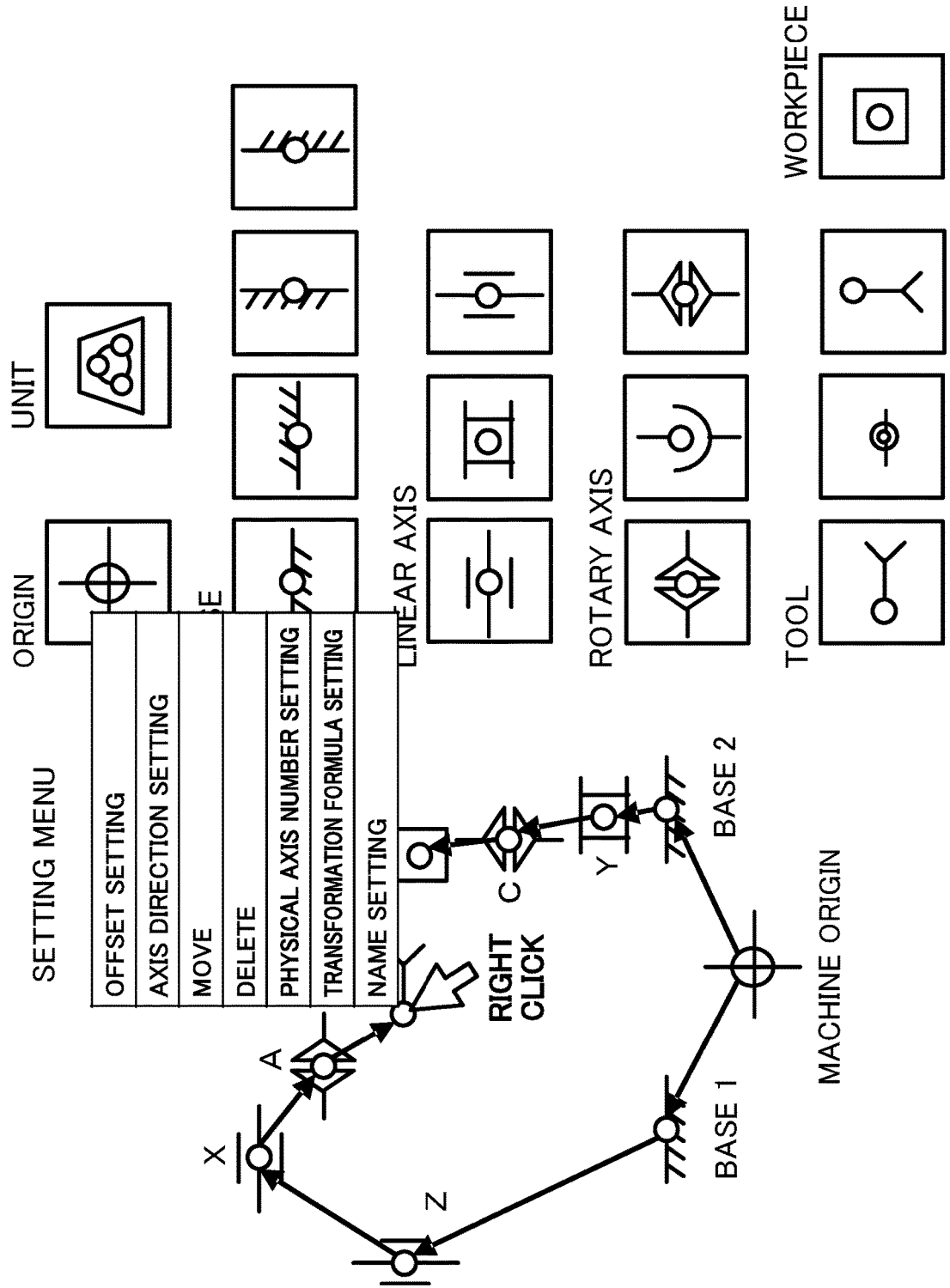
FIG. 13D is a diagram showing an example of the GUI (graphical user interface) in the embodiment of the present invention.
Figure 15:
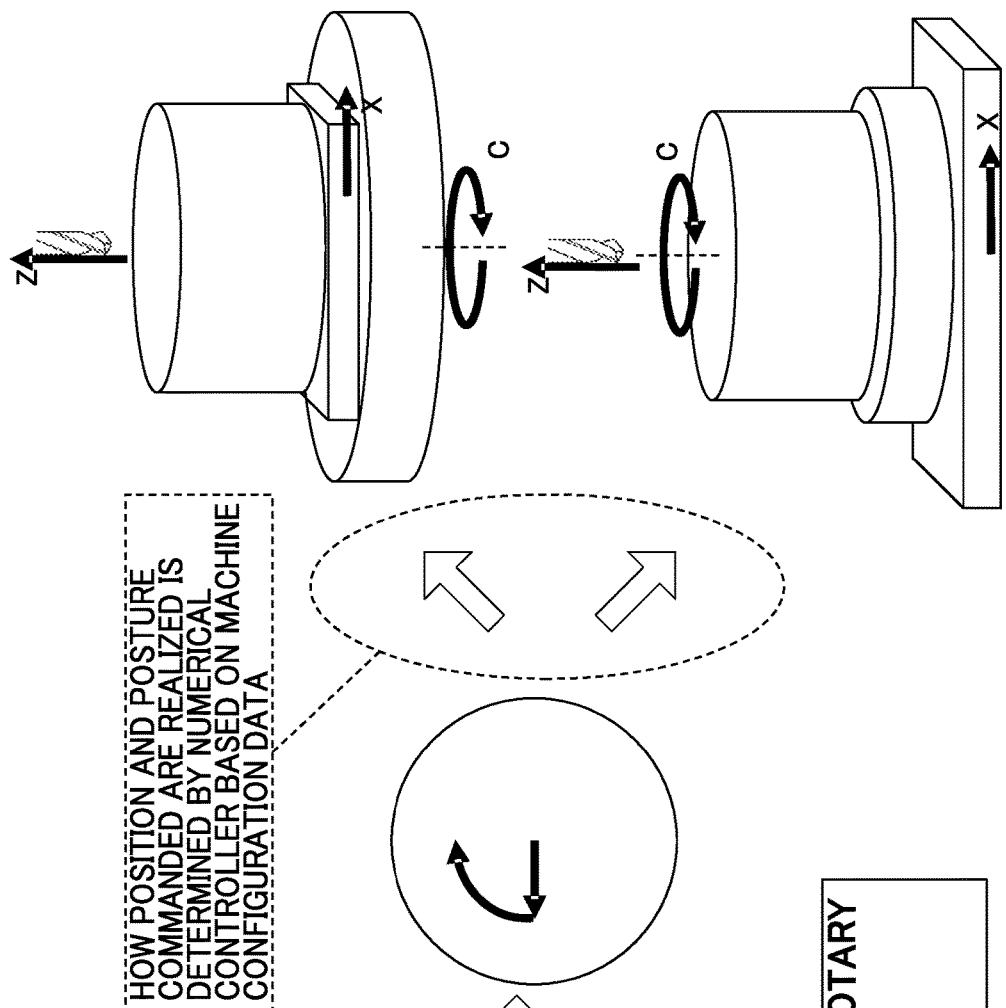
FIG. 15 is a diagram showing an example of a command issued by the numerical controller according to the embodiment of the present invention.

As shown in FIG. 13A, the machine configuration tree described above can be graphically displayed on the display 70 and can be simply set on the display 70 by use of a graphic user interface (GUI). For example, as shown in FIG. 13B, the node can be arranged by a drag and drop operation, as shown in FIG. 13C, a parent-child relationship of the nodes can be set by a drag operation and as shown in FIG. 13D, a setting menu is opened to set the attribute of the node by a mouse click operation.

Since an industrial machine such as a machine tool has various machine configurations, various parent-child relationships of constituent elements are provided whereas a numerical controller normally does not have information on the parent-child relationship of constituent elements so that the numerical controller cannot perform control requiring such information. However, the numerical controller uses the method of generating data having the machine configuration tree described above or having the data structure in the shape of the machine configuration tree, and thereby can control a machine tool or a robot which has various machine configurations, with the result that convenience is enhanced.

The user also uses a graphic user interface (GUI) so as to be intuitively set the machine configuration tree to the numerical controller.

3. ABSTRACTION OF COMMAND ADDRESS

As described above, when the machine configuration tree is generated, the axis names are added to the individual axes. Normally, in a machining program used in a numerical controller, a combination between the axis name and the coordinate value of a destination or a value meaning the amount of move is used so as to command a move.

However, even when the axis name can be arbitrarily set, if the axis configuration of the machine is different, as long as a command is issued with the individual axis name, the program is inevitably different. For example, as shown in FIG. 14, when a tool 213 is used to perform machining on a workpiece 212, even if a case where as in (a), the workpiece is placed on a rotary table 214 and a case where as in (b), the workpiece is placed on a direct drive table 211 are the same in the desired machining path 215 of the tool 213 with respect to the workpiece 212, programs are inevitably different such that the command for realizing it is 216 in the case of (a) and the command for realizing it is 217 in the case of (b). Specifically, the programs are different such that in the case of 216, the rotary axis C of the rotary table is moved by 180 degrees so as to realize the arc path whereas in the case of 217, an arc interpolation command is issued with a linear axis XY so as to realize the arc path.

Conventionally, a commandable address is determined for each G code modal, and when the modal is changed, a command address needs to be changed accordingly. For example, when the posture of a tool is indicated in tool tip point control, a commandable address is determined in each mode such that in a type 1 mode, a command is issued with each rotary axis address (for example, address A, B, and C) whereas in a type 2 mode, a command is issued with a tool posture vector (address I, J, and K). Hence, for example, in the type 1 mode, it is impossible to issue a command with the address I, J, and K whereas in the type 2 mode, it is impossible to issue a command with the rotary axis address A, B, and C.

Hence, in the present invention, instead of the axis name, an abstract address is used which defines the position, the posture and the like of a certain control point on a certain coordinate system. Specifically, first, in order to define an address, a command is issued as in 218 of FIG. 15. In 218, addresses α and β are substituted which are suitable for identifiers (an identifier L1 indicating a first linear axis position and an identifier L2 indicating a second linear axis position) that are previously defined regardless of the actual axis names in the machine configuration, and as the first linear axis position in an orthogonal coordinate system, the address α is defined, and as the second linear axis position in the orthogonal coordinate system, the address β is defined. Likewise, addresses may be substituted which are suitable for identifiers V1, V2 and V3 indicating tool posture vectors that are previously defined regardless of the actual axis names such that the addresses indicating the tool posture vectors are defined. Alternatively, addresses may be substituted which are suitable for identifiers R1 and R2 indicating first and second rotary axis positions that are previously defined regardless of the actual axis names such that the addresses indicating the rotary axis positions are defined. When these are not defined in the program, default addresses which are set with parameters in the numerical controller 100 are defined as addresses indicating the abstract meanings of the first linear axis position, the second linear axis position and the like. Thereafter, as shown in 219 of FIG. 15, these α and β are used in the program, and thus in any machine configuration or in machines whose actual axis names are different, programs can be described with the common form. With respect to commands for the same control point, as in 220 of FIG. 15, the address is only changed, and thus it is possible to individually use various command methods suitable for a program producer such that, for example, a command is issued with a vector in order to determine the direction of a tool in a certain block or a command is issued with a rotary axis angle in another block.

As described above, in the present embodiment, as the command value, regardless of the axis names included in the graph of the machine configuration, an arbitrary address which is allocated to an identifier previously defined for each meaning can be used. The "meanings" described above include the position of the control point, the posture of the control point and the position of the angle of the rotary axis for determining the posture.

4. AUTOMATIC INSERTION OF CONTROL POINT AND COORDINATE VALUE

Although as described in "2. Generation of machine configuration tree", each node of the machine configuration graph can have information necessary for the node itself to be the control point or the coordinate system, each node can be formed such that it does not have the necessary information.

When the node does not have the information necessary for the node itself to be the control point or the coordinate system, in order to specify, as the control points, various positions on the machine configuration and set coordinate systems in various places on the machine configuration, the following method is performed by use of the machine configuration tree generated in "2. Generation of machine configuration tree" described above.

Figure 16A:
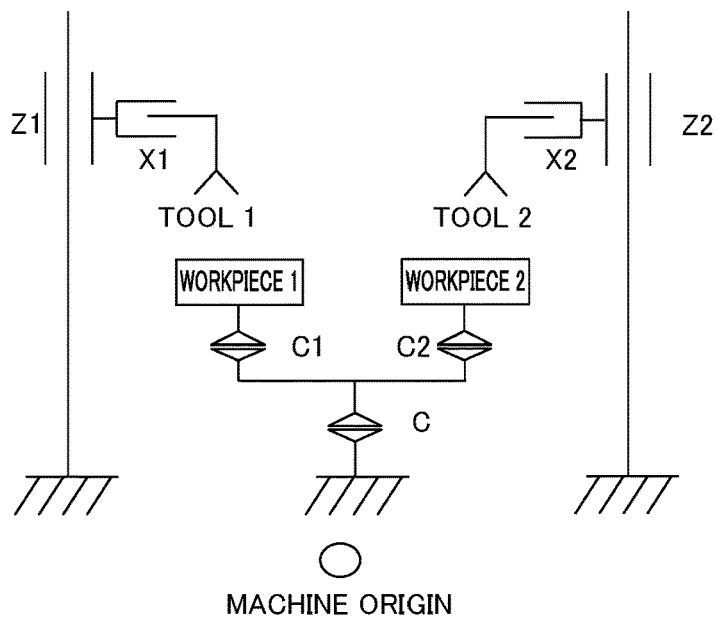
FIG. 16A is a diagram showing an example of a machine which is a target for the generation of the machine configuration tree.
Figure 16B:
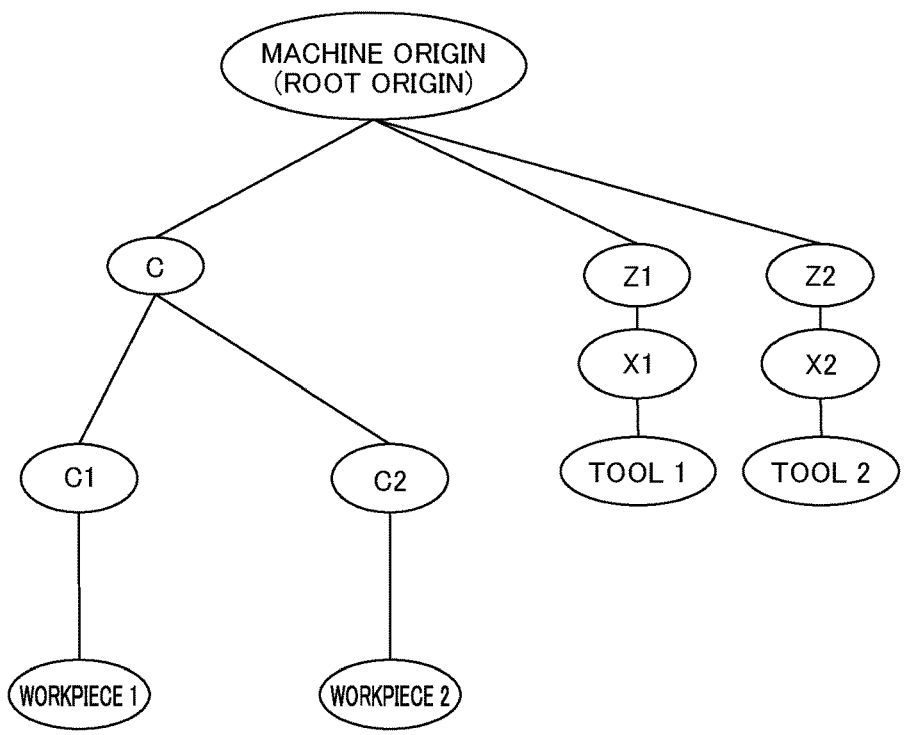
FIG. 16B is a diagram showing an example of a machine configuration tree corresponding to the machine which is a target for the generation of the machine configuration tree.

For example, in a rotary index machine 300 shown in FIG. 16A, an X1 axis is set perpendicular to a Z1 axis, and a tool 1 is installed in the X1 axis. An X2 axis is set perpendicular to a Z2 axis, and a tool 2 is installed on the X2 axis. Furthermore, in a table, on a C axis, a C1 axis and a C2 axis are set in parallel, and in the C1 axis and the C2 axis, a workpiece 1 and a workpiece 2 are respectively installed. When this machine configuration is represented by a machine configuration tree, the machine configuration tree shown in FIG. 16B is provided.

Figure 17:
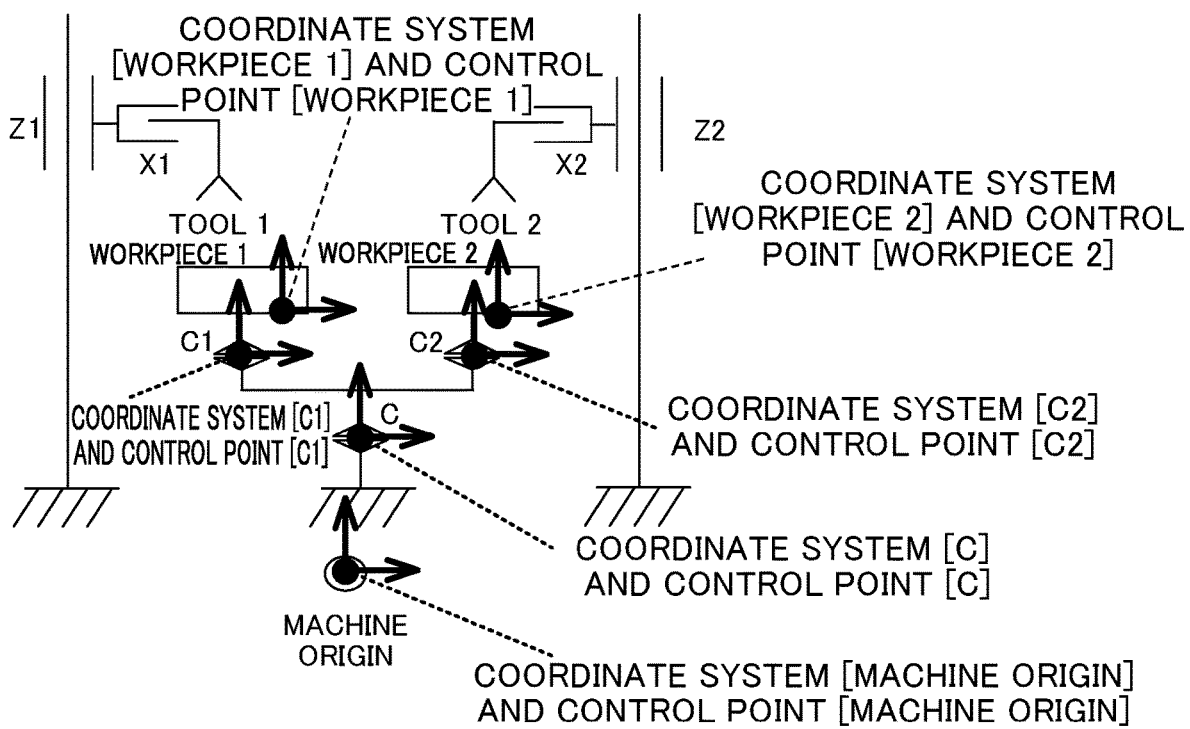
FIG. 17 is a diagram showing an example where a coordinate system and a control point are inserted into each node in the machine in the embodiment of the present invention.
Figure 18:
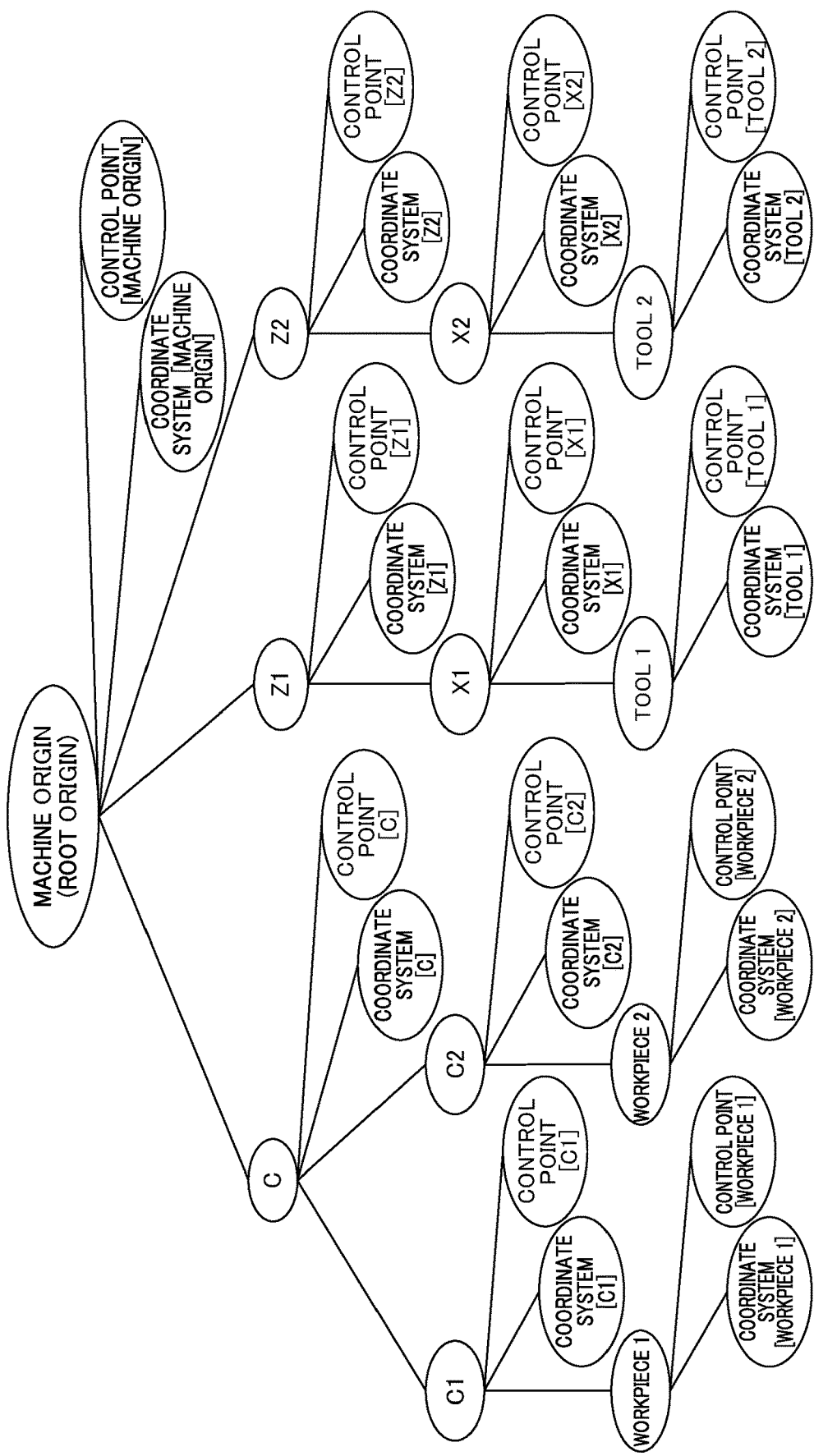
FIG. 18 is a diagram showing an example of the machine configuration tree into which the coordinate system and the control point are inserted in the embodiment of the present invention.

In an example of a series of nodes leading from individual workpieces to the machine origin, as shown in FIG. 17, a coordinate system and a control point are automatically inserted into each of the machine origin, the C axis, the C1 axis, the C2 axis, the workpiece 1 and the workpiece 2. This is performed not only on the table but also on the series of nodes leading from individual tools to the machine origin, that is, all the X1 axis, the X2 axis, the Z1 axis, the Z2 axis, the tool 1 and the tool 2. Consequently, as shown in FIG. 18, into all the nodes constituting the machine configuration tree, the control points and the coordinate systems corresponding to the individual nodes are automatically inserted. Normally, when machining is performed, the coordinate system is specified in the workpiece, and the tool is specified as the control point. In this way, it is possible to cope with various cases such as a case where in order to move a workpiece itself to a predetermined position, the control point is desired to be specified in the workpiece and a case where in order to use a certain tool to polish another tool, the coordinate system is desired to be set in the tool itself.

Figure 19A:
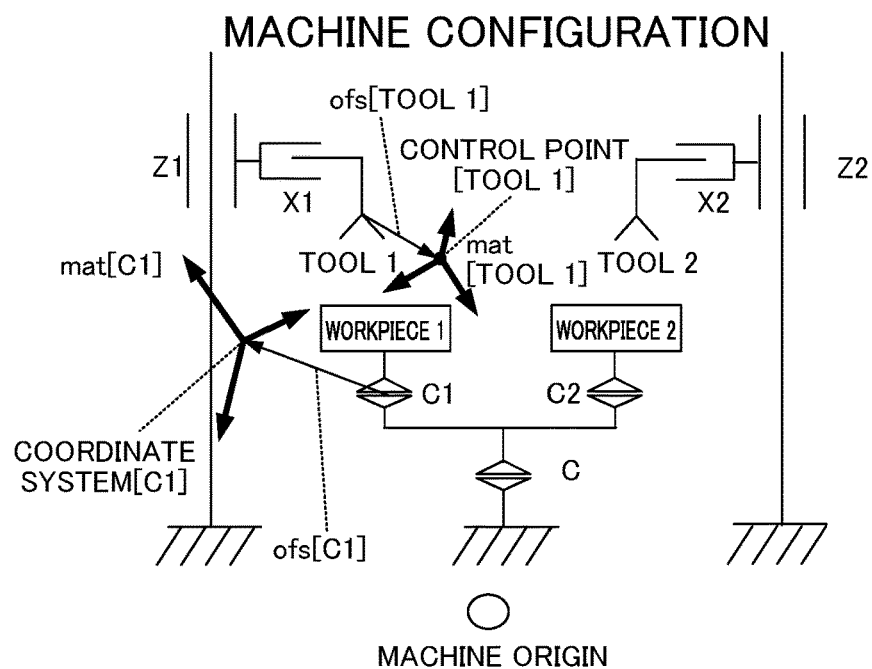
FIG. 19A is a diagram showing an example of the machine in which an offset and a posture matrix are inserted into each node in the embodiment of the present invention.
Figure 19B:
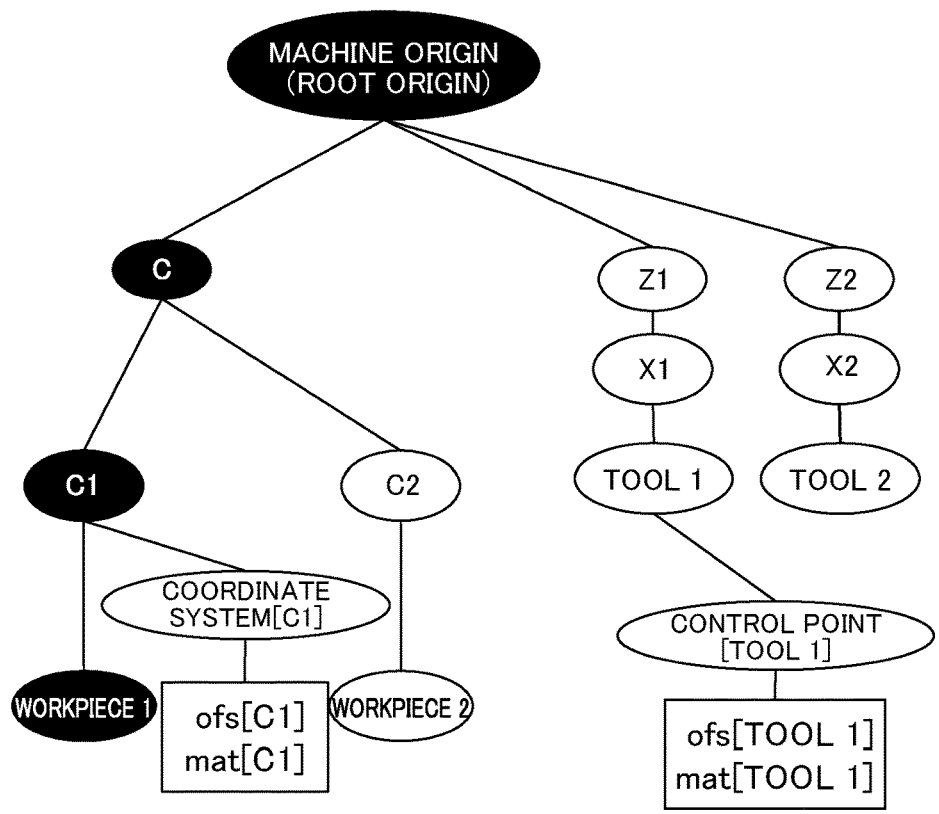
FIG. 19B is a diagram showing an example where the offset and the posture matrix are inserted into each node in the machine in the embodiment of the present invention.

As shown in FIG. 19A, each of the control points and the coordinate systems has an offset. Hence, a point away from the center of the node can be set to a control point or a coordinate system origin. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 19B, the offset and the posture matrix are expressed so as to be associated with the nodes corresponding thereto. Furthermore, each of the control points and the coordinate systems has information on whether or not the "move" and the "cross-offset" of the node present on a path up to the route of the machine configuration tree are individually added, and the information can be set.

A flowchart obtained by generalizing the method of automatically inserting the control point described above is shown in FIG. 20. Specifically, this flowchart includes a chart A and a chart B, and as will be described later, the chart B is performed in the middle of the chart A.

The chart A will first be described. In step S31, the graph generation portion 111 sets a machine configuration tree. In step S32, the chart B is performed, and the flow of the chart A is completed.

The chart B will then be described. In step S41 of the chart B, when the node has inserted the control point and the coordinate system (YES in S41), the flow is completed. When the node has not inserted the control point and the coordinate system (NO in S41), the processing is transferred to step S42.

In step S42, the control point coordinate system insertion portion 112 inserts the control point and the coordinate system into the node, and stacks a variable n by 1. A setting is made such that n=1.

In step S43, when the n$^{th}$ child node is present in the node (YES in S43), the processing is transferred to step 344. When the n$^{th}$, child node is not present in the node (NO in S43), the processing is transferred to step 346.

In step S44, on the n$^{th}$ child node, the chart B itself is performed in a recursive manner.

In step 345, n is incremented by 1. In other words, the increment is performed such that n=n+1, and the processing is returned to step S43.

In step S46, the variable n is popped by 1, and the flow of the chart B is completed.

Figure 21:
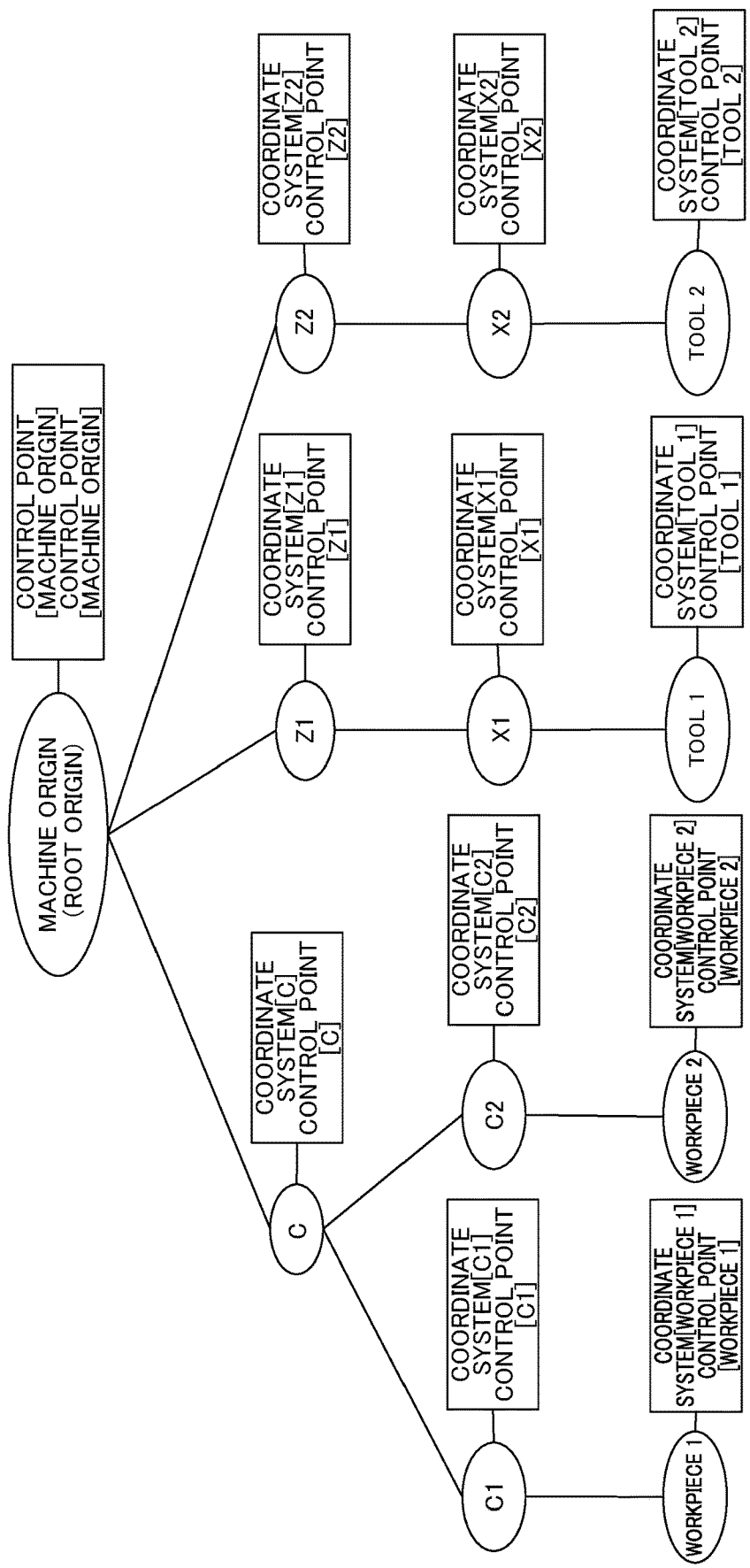
FIG. 21 is a diagram showing an example of the machine configuration tree into which the coordinate system and the control point are inserted in the embodiment of the present invention.
Figure 22:
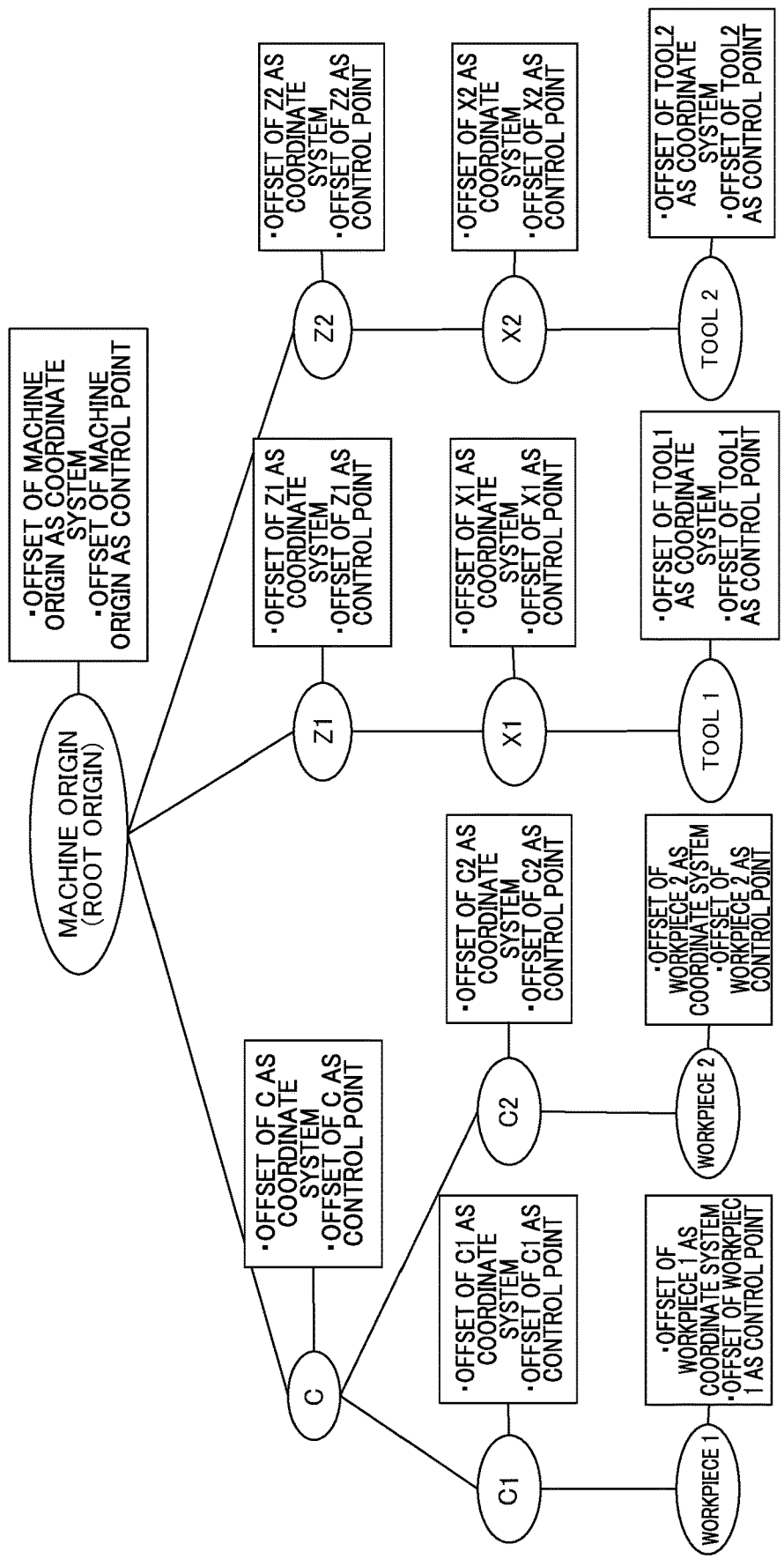
FIG. 22 is a diagram illustrating an example of the machine configuration tree according to the embodiment of the present invention.

By the method described above, the control point coordinate system insertion portion 113 inserts, as nodes, the control point and the coordinate system into the individual nodes of the graph in the machine configuration. Although the example has been described above where the control point and the coordinate system are added as nodes, an embodiment is also possible in which as illustrated in FIG. 21, the control point coordinate system insertion portion 113 makes the individual nodes of the graph in the machine configuration have the control point and the coordinate system as information. Further, As described in "2. Generation of machine configuration tree", the graph generation portion can also generate the machine configuration tree (the machine configuration tree which has information necessary for each node to be the control point or the coordinate system) as illustrated in FIG. 22. In this case, the machine configuration tree has already had the information as the control point or the coordinate system, and thus it is not always necessary to provide the control point coordinate system insertion portion.

5. CALCULATION METHOD OF CONTROL POINT POSITION AND CONTROL POINT POSTURE

Figure 23:
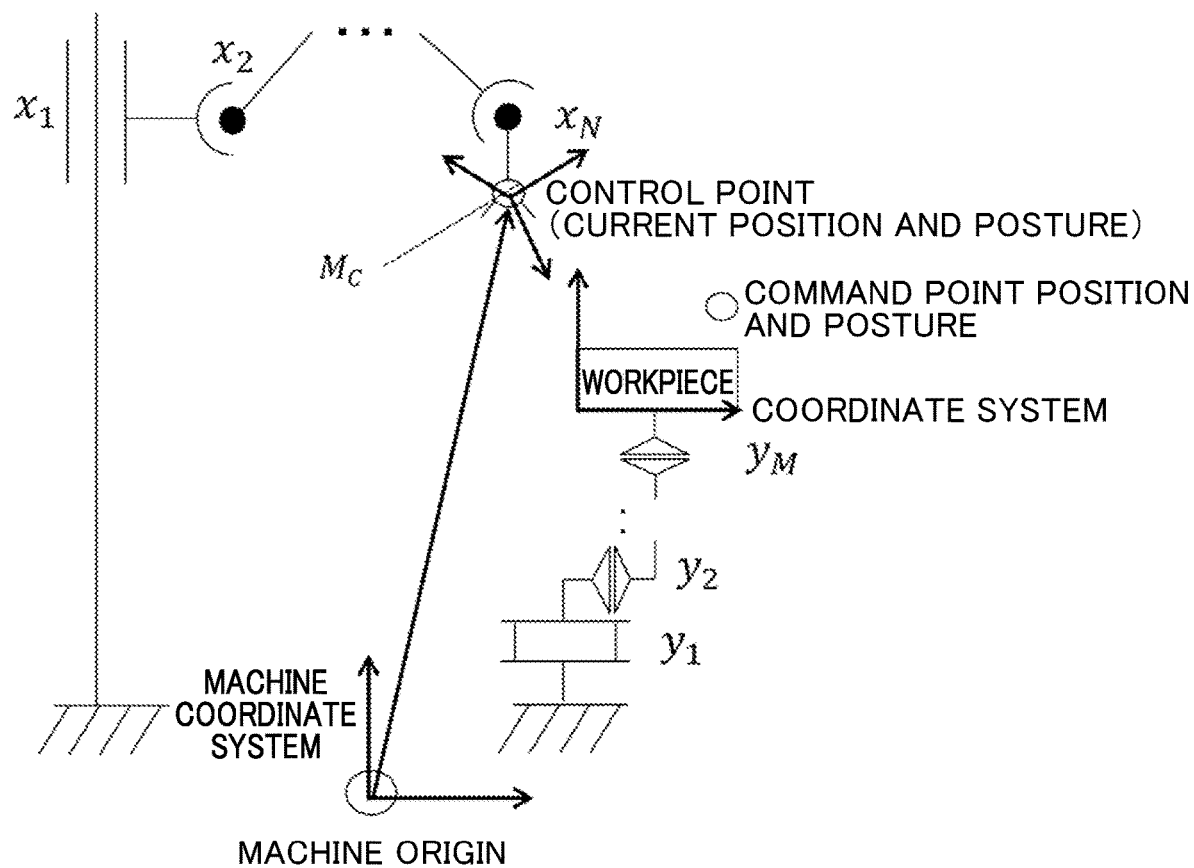
FIG. 23 is a diagram showing a control point position vector and a control point posture matrix with respect to a machine origin in a machine coordinate system in the embodiment of the present invention.

As shown in FIG. 23, when a homogeneous matrix which indicates the position and the posture of a certain control point in the machine configuration tree with respect to the route of the machine configuration tree is assumed to be $M_c$, this can be determined as follows.

First, nodes which are present between a certain node and a certain node in the machine configuration tree and which are aligned are defined as a path. For example, in FIG. 19, a path p1 from a node Z1 to a control point [tool 1] is represented as follows.

$$p_1 = \{Z1, X1, \text{tool 1}, \text{control point}[\text{tool 1}]\} \quad \text{[Formula 3]}$$

It is assumed that a path p2 from a route in the machine configuration tree to a certain control point is as follows.

$$p2 = \{x_1, x_2, \ldots, x_N, \text{control point}\} \quad \text{[Formula 4]}$$

A start point $x_1$ in the path is the route. The homogeneous matrix $M_c$ of a position and a posture with respect to the route in the control point represented by the path is calculated by Formula 5, $$M_C = \{\Pi_{i=1}^N S(a_{x_i}, b_{x_i})\} M_{[ctrl]} \quad \text{where} \quad \Pi_{i=1}^n M_i = M_1 M_2 \ldots M_n \quad \text{[Formula 5]}$$

where the meanings of symbols are as follows.
S: Homogeneous transformation matrix of each node;
N: Number of a series of nodes leading from the route of the machine configuration tree to the control point;
M [ctrl]: Homogeneous matrix of a relative offset and a posture with respect to the parent node of the control point which is defined, according to the mathematical formula of [Formula 2], from an offset vector and a posture matrix defined in the control point;
$a_{xi}$: The cross-offset of a node xi is added (1) or is not added (0); and
$b_{xi}$: The move of the node x1 is added (1) or is not added (0). Here, $a_{xi}$ and $b_{xi}$ are information which can also be specified when the control point is specified, and the details thereof will be described in "8. Customization of coordinate system derived from machine configuration tree" which will be described later.

The homogeneous transformation matrix S is changed depending on the type of node (linear axis/rotary axis/unit/control point/coordinate system and the like), and is represented as follows. In the case of the linear axis, the homogeneous transformation matrix S is calculated by Formula 6, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} \begin{pmatrix} 1 & 0 & 0 & b_{x_i} x_i \overrightarrow{v_{x_i}} \\ 0 & 1 & 0 & \\ 0 & 0 & 1 & \\ 0 & 0 & 0 & 1 \end{pmatrix} \quad \text{[Formula 6]}$$

where the meanings of symbols are as follows.
$x_i$: Coordinate value of node xi;
of $s_{xi}$: Relative offset vector with respect to parent node of node xi; and
$v_{xi}$: Movement direction vector of node xi.

In the case of the rotary axis, the homogeneous transformation matrix S is calculated by Formula 7, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} R(b_{x_i} x_i, v_1, v_2, v_3) \quad \text{[Formula 7]}$$

$$R(x_i v_1, v_2, v_3) = \begin{pmatrix} v_1^2(1-\cos x_i) + \cos x_i & v_1 v_2(1-\cos x_i) - v_3 \sin x_i & v_1 v_3(1-\cos x_i) + v_2 \sin x_i & 0 \\ v_1 v_2(1-\cos x_i) + v_3 \sin x_i & v_2^2(1-\cos x_i) + \cos x_i & v_3 v_2(1-\cos x_i) - v_1 \sin x_i & 0 \\ v_1 v_3(1-\cos x_i) - v_2 \sin x_i & v_2 v_3(1-\cos x_i) + v_1 \sin x_i & v_3^2(1-\cos x_i) + \cos x_i & 0 \\ 0 & 0 & 0 & 1 \end{pmatrix}$$

where the meanings of symbols are as follows.
$v_1$: First component of rotary axis direction vector of node xi;
$v_2$: Second component of rotary axis direction vector of node xi; and
$v_3$: Third component of rotary axis direction vector of node xi;

In the case of the unit, the homogeneous transformation matrix S is calculated by Formula 8, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} T(b_{x_i}) \quad \text{[Formula 8]}$$

where the meanings of symbols are as follows.
T(0): Unit matrix (non-transformation matrix); and
T(1): Homogeneous transformation matrix from connection point 120 to connection point 110 defined in a unit node.

The homogeneous transformation matrix of the unit is a homogeneous transformation matrix such as T in the mathematical formula of [Formula 1] described previously which is defined for each unit.

When the homogeneous transformation matrix S is not particularly specified, the homogeneous transformation matrix S is assumed to be a unit matrix.

6. CALCULATION METHOD OF COMMAND POINT POSITION AND COMMAND POINT POSTURE

Figure 24:
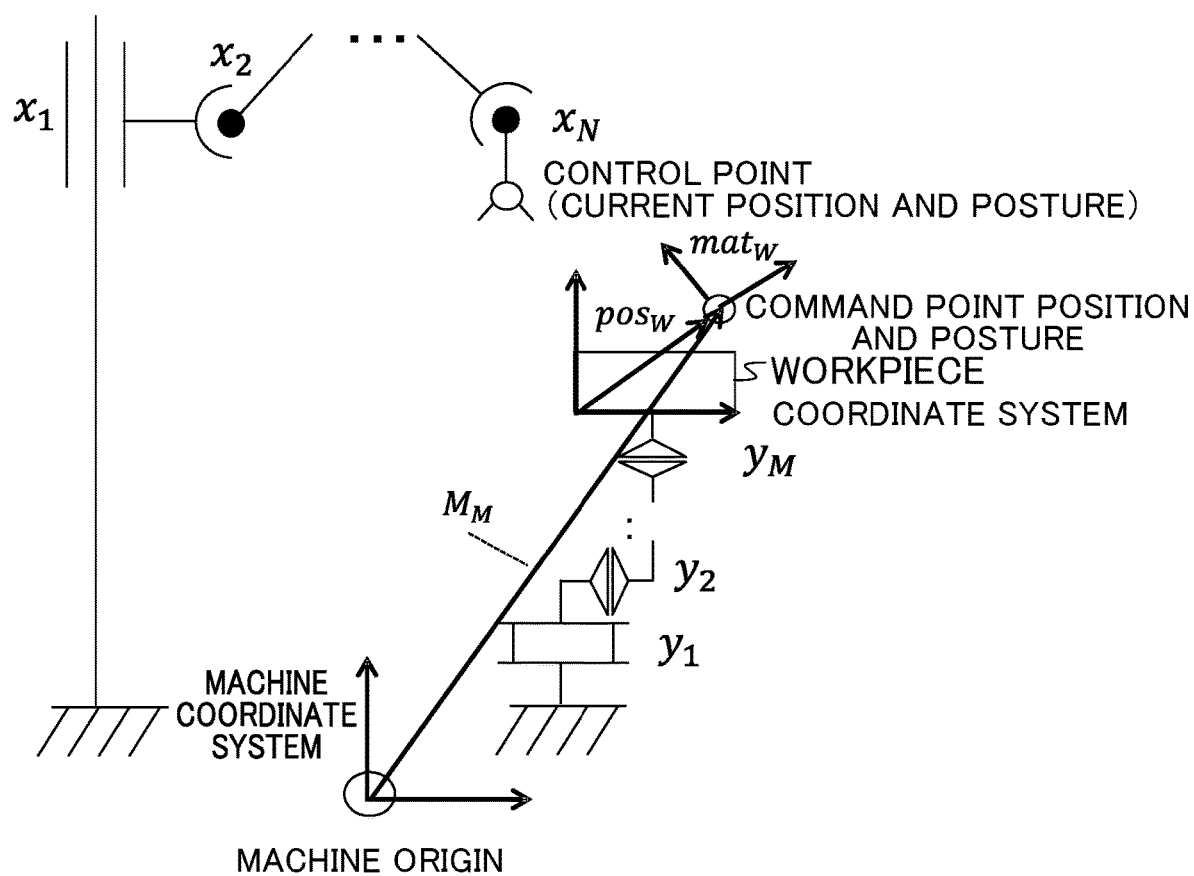
FIG. 24 is a diagram showing a command value position vector and a command value posture matrix with respect to the machine origin in the machine coordinate system in the embodiment of the present invention.

When as shown in FIG. 24, as a command value on a certain specified coordinate system, a command position vector $pos_w$ and a command posture matrix $mat_w$ are specified, a homogeneous matrix $M_M$ indicating a position and a posture with respect to the route of the machine configuration tree for this command value is determined by a formula below.

The homogeneous matrix $M_w$ of the command value is first defined as follow.

$$M_w = \begin{pmatrix} mat_w & \overrightarrow{pos_w} \\ 0 \quad 0 \quad 0 & 1 \end{pmatrix}$$ [Formula 9]

As in the case of the control point, it is assumed that a path $p_3$ from a route in the machine configuration tree to a certain coordinate system is as follows.

$$p_3 = \{x_1, x_2, \ldots, x_L, \text{coordinate system}\}$$ [Formula 10]

In this way, the homogeneous matrix $M_M$ is calculated by Formula 11, $$M_M = \{\Pi_{i=1}^{L} S(a_{xi}, b_{xi})\} M_{[coord]} M_w \text{ where}$$
$$\Pi_{i=1}^{n} M_i = M_1 M_2 \ldots M_n$$ [Formula 11]

where the meanings of symbols are as follows.
S: Homogeneous transformation matrix of each node;
L: Number of a series of nodes leading from the route of the machine configuration tree to the coordinate system;
M [coord]: Homogeneous matrix of a relative offset and a posture with respect to the parent node of the coordinate system which is defined, according to the mathematical formula of [Formula 2], from an offset vector and a posture matrix defined in the coordinate system;
$a_{xi}$: The cross-offset of a node xi is added (1) or is not added (0); and
$b_{xi}$: The move of the node x1 is added (1) or is not added (0).
Here, $a_{xi}$ and $b_{xi}$ are information which can be specified when the coordinate system is specified, and the details thereof will be described in "8. Customization of coordinate system derived from machine configuration tree" which will be described later. The homogeneous transformation matrix S is the same as that described by use of the mathematical formulas of [Formula 6] to [Formula 8].

7. METHOD OF SPECIFYING CONTROL POINT AND COORDINATE SYSTEM WITHIN PROGRAM

An example of a method of specifying each node as the control point or the coordinate system within a program when in the "2. Generation of machine configuration tree" described above, the machine configuration tree is generated such that each node has the information necessary for each node to be the control point or the coordinate system is first shown in FIG. 25.

In a command illustrated in FIG. 25, the first half is a sentence example in which the coordinate system is specified, and the second half is a sentence example in which the control point is specified. Although the description of FIG. 25 is repeated, the contents of a command in each line within the program will be described below.

By the first line "G54.9 P<workpiece 1>;", a node [workpiece 1] is specified as the coordinate system.

By the second line "G54.8 P<workpiece 1><WORK1>;", another identifier of "WORK1" is set to the node [workpiece 1].

By the third line "G54.9 P<WORK1>;", the node [workpiece 1] is specified by another identifier of "WORK1" as the coordinate system.

By the fourth line "G54.7 P<C1>X_Y_Z_;", the coordinate system cross-offset of a node [C1] is set.

By the fifth line "G54.6 P<C1>I_J_K_;", the coordinate system posture matrix of the node [C1] is set by Roll/Pitch/Yaw.

By the sixth line "G54.9 P<C1>;", the node [C1] is specified as the coordinate system, and the cross-offset and the posture matrix described above are added.

By the seventh line "G43.9<tool 1>;", a node [tool 1] is specified as the control point.

By the eighth line "G43.8 P<tool 1><TOOL1>;", another identifier of "TOOL1" is set to the node [tool 1].

By the ninth line "G43.9 P<TOOL1>;", the node [tool 1] is specified by identifier of "TOOL1" as the control point.

By the tenth line "G43.7 P<B1>X_Y_Z_;", the control point cross-offset of a node [B1] is set.

By the eleventh line "G43.6 P<B1>I_J_K_;", the control point posture matrix of the node [B1] is set by Roll/Pitch/Yaw.

By the twelfth line "G43.9 P<B1>;", the node [B1] is specified as the control point, and the cross-offset and the posture matrix described above are added.

An example of a method of specifying, within a program, the control point and the coordinate system inserted into the machine configuration tree by "4. Automatic insertion of control point and coordinate system" described above will be illustrated in FIG. 26.

In a command illustrated in FIG. 26, the first half is a sentence example in which the coordinate system is specified, and the second half is a sentence example in which the control point is specified. Although the description of FIG. 26 is repeated, the contents of a command in each line within the program will be described below.

By the first line "G54.9<coordinate system [workpiece 1]>;", the coordinate system [workpiece 1] is specified.

By the second line "G54.8 P<coordinate system [workpiece 1]><WORK1>;", an identifier of "WORK1" is set to the coordinate system [workpiece 1].

By the third line "G54.9 P<WORK1>;", the coordinate system [workpiece 1] is specified by identifier of "WORK1".

By the fourth line "G54.7 P<coordinate system [C1]>X_Y_Z_;", the cross-offset of the coordinate system [C1] is set.

By the fifth line "G54.6 P<coordinate system [C1]>I_J_K_;", the posture matrix of the coordinate system [C1] is set by Roll/Pitch/Yaw.

By the sixth line "G54.9 P<coordinate system [C1]>;", the coordinate system [C1] is specified, and the cross-offset and the posture matrix described above are added.

By the seventh line "G54.9<control point [tool 1]>;", the control point [tool 1] is specified.

By the eighth line "G54.8 P<control point [tool 1]><TOOL1>;", an identifier of "TOOL1" is set to the control point [tool 1].

By the ninth line "G54.9 P<TOOL1>;", the control point [tool 1] is specified by another identifier of "TOOL1".

By the tenth line "G54.7 P<control point [B1]>X_Y_Z_;", the cross-offset of the control point [B1] is set.

By the eleventh line "G54.6 P<control point [B1]>I_J_K_;", the posture matrix of the control point [B1] is set by Roll/Pitch/Yaw.

By the twelfth line "G54.9 P<control point [B1]>;", the control point [B1] is specified, and the cross-offset described above is added.

In this regard, regardless of whether or not each node has the information necessary for each node to be the control point or the coordinate system, it is possible to specify an appropriate place in the machine configuration tree as the control point or the coordinate system. Although in FIG. 25, the numbers of G codes for specifying the control point and the coordinate system are separate, in FIG. 26, the G codes for specifying the control point and the coordinate system can be made common. As described above, the coordinate system control point insertion portion and the identifier allocation portion are not indispensable in the practice of the present invention, but may be introduced.

8. CUSTOMIZATION OF COORDINATE SYSTEM DERIVED FROM MACHINE CONFIGURATION TREE

As described above, the suitable coordinate system in the machine configuration tree can be selected by a program command, and a command value on the selected coordinate system can be transformed into a machine coordinate value with the mathematical formulas of [Formula 9] to [Formula 11] as described above. In this transformation, a series of $a_{xi}$ and $b_{xi}$ corresponding to the individual nodes in the path p3 are basically calculated as follows so as to be all 1.

$$p_3 = \{x_1, x_2, \ldots, x_L, \text{coordinate system}\}$$

$$a_{p3} = \{a_{x_1}, a_{x_2}, \ldots, a_{x_L}, a_{[coord]}\} = \{1, 1, \ldots, 1, 1\}$$

$$b_{p3} = \{b_{x_1}, b_{x_2}, \ldots, b_{x_L}, b_{[coord]}\} = \{1, 1, \ldots, 1, 1\} \quad \text{[Formula 12]}$$

In this case, all the cross-offsets and the moves of the series of nodes are added.

Here, $a_{p3}$ and $b_{p3}$ have elements corresponding to the individual elements of the path p3 so as to be able to be regarded as accompanying paths. Hence, they are referred to as the accompanying paths $a_{p3}$ and $b_{p3}$ of p3.

Incidentally, as described previously in "Problems to be Solved by Invention", it may be preferable that the coordinate system is not rotated to follow only a specific axis. For example, in a case where in FIGS. 19A and 19B, on a coordinate system defined in a path $p_4$ below, it is desired to perform turning with a C1 axis, it is easy to use the coordinate system when the coordinate system is not rotated to follow the C1 axis.

$$p_4 = \{\text{machine zero point}, C, C_1, \text{work 1, coordinate system}\} \quad \text{[Formula 13]}$$

In this case, accompanying paths $a_{p4}$ and $b_{p4}$ are specified as described below, and thus it is possible to customize the coordinate system such that the coordinate system is not rotated to follow only the C1 axis.

$$a_{p4} = \{a_{\text{machine zero point}}, a_C, a_{C_1}, a_{\text{work 1}}, a_{\text{coordinate system}}\} = \{1, 1, 1, 1, 1\}$$

$$b_{p4} = \{b_{\text{machine zero point}}, b_C, b_{C_1}, b_{\text{work 1}}, b_{\text{coordinate system}}\} = \{1, 1, 0, 1, 1\} \quad \text{[Formula 14]}$$

As described above, the accompanying path is specified as necessary on the specified coordinate system, and thus it is possible to customize the coordinate system such that the coordinate system is suitable according to the usage. The accompanying path can be specified by a program command as shown in FIG. 27. The details of the program will be described here. By a command of G254. 9P<workpiece 1>Q<C1>0, ac1 on the coordinate system inserted into the workpiece 1 can be specified so as to be 0.

Moreover, by a command of G154. 9P<workpiece 1>Q<C1>0, bc1 on the coordinate system inserted into the workpiece 1 can be specified so as to be 0.

Then, by a command of G54. 9P<workpiece 1>, the coordinate systems [workpiece 1] which are customized so as to be ac1=0 and bc1=0 can be specified.

Since an accompanying path is likewise present in the control point in addition to the coordinate system, the accompanying path is likewise specified with a program, and thus the customized control point can be used.

As described above, in the present embodiment, the information for specifying the coordinate system and the control point is changed, and thus it is possible to arbitrarily customize the coordinate system and the control point. In particular, in the coordinate system and the control point, it is possible to remove the influence of a specific node, specifically, an influence caused by the move and offset of the specific node.

9. MOVEMENT PULSE GENERATION METHOD

Then, the numerical controller 100 according to the embodiment of the present invention interprets a command value within a program commanded by the method of "3. Abstraction of command address" as a coordinate value on the coordinate system specified by the method of "7. Method of specifying control point and coordinate system within program" and "8. Customization of coordinate system derived from machine configuration tree", and generates a movement pulse necessary for moving the control point such that the coordinate value of the specified control point is the command value.

Specifically, first, by the method of "6. Calculation method of command point position and command point posture", the first coordinate transformation formula of the command value is determined from the coordinate system and the machine configuration tree specified. Then, the second coordinate transformation formula of the control point is determined from the control point and the machine configuration tree specified by the method of "5. Calculation method of control point position and control point posture". Then, a hypercomplex multidimensional simultaneous equation for defining that the first coordinate transformation formula is equal to the second coordinate transformation formula is determined. Finally, the solution of the hypercomplex multidimensional simultaneous equation which is calculated by use of, for example, a Gröbner basis is used, and thus a movement pulse used in a movement command is generated.

For example, as shown in FIG. 27, it is assumed that an axis x2 is set on an axis x1, that an axis x3 is set on the axis x2, that then, N nodes are likewise continuous and that the end thereof is an axis xN. Furthermore, it is assumed that on the axis xN, a control point is installed. Likewise, it is assumed that an axis y2 is set on an axis y1, that an axis y3 is set on the axis y2, that then, L nodes are likewise continuous and that the end thereof is an axis yL. Furthermore, it is assumed that on the axis yL, a workpiece is installed. Here, although xi and yi are the names of nodes, it is assumed that they simultaneously indicate the coordinate values of the individual nodes.

As shown in FIG. 29, it is assumed that addresses X, Y and Z indicating an orthogonal coordinate position and addresses I, J and K indicating a tool posture are specified by a program, and that a position $pos_w=(X_W, Y_W, Z_W)$ and a tool direction vector $vec_w=(I_W, J_W, K_W)$ are given by these addresses. As shown in FIG. 30, it is assumed that a control point [xN] and a coordinate system [yM] are specified by the program.

Here, a path $p_{ctrl}$ from the machine configuration tree of the control point specified here and a path $p_{coord}$ from the machine configuration tree of the coordinate system specified here are represented by [Formula 15] below.

$$p_{ctrl}=\{x_0,x_1,x_2,\ldots,x_N,\text{control point}\}$$

$$p_{coord}=\{y_0,y_1,y_2,\ldots,y_L,\text{coordinate system}\} \quad \text{[Formula 15]}$$

Since the accompanying paths of the control point and the coordinate system are not particularly specified by a program, the elements of the accompanying paths $a_{pctrl}$, $b_{pctrl}$, $a_{pcoord}$ and $b_{pcoord}$ of the individual paths are represented by [Formula 16] so as to be all 1.

$$a_{p_{ctrl}}=\{a_{x_0},a_{x_1},a_{x_2},\ldots,a_{x_N},a_{control\ point}\}=\{1,1,1,\ldots,1,1\}$$

$$b_{p_{ctrl}}=\{b_{x_0},b_{x_1},b_{x_2},\ldots,b_{x_N},b_{control\ point}\}=\{1,1,1,\ldots,1,1\}$$

$$a_{p_{coord}}=\{a_{y_0},a_{y_1},a_{y_2},\ldots,a_{y_L},a_{coordinate\ system}\}=\{1,1,1,\ldots,1,1\}$$

$$b_{p_{coord}}=\{b_{y_0},b_{y_1},b_{y_2},\ldots,b_{y_L},b_{coordinate\ system}\}=\{1,1,1,\ldots,1,1\} \quad \text{[Formula 16]}$$

Figure 28:
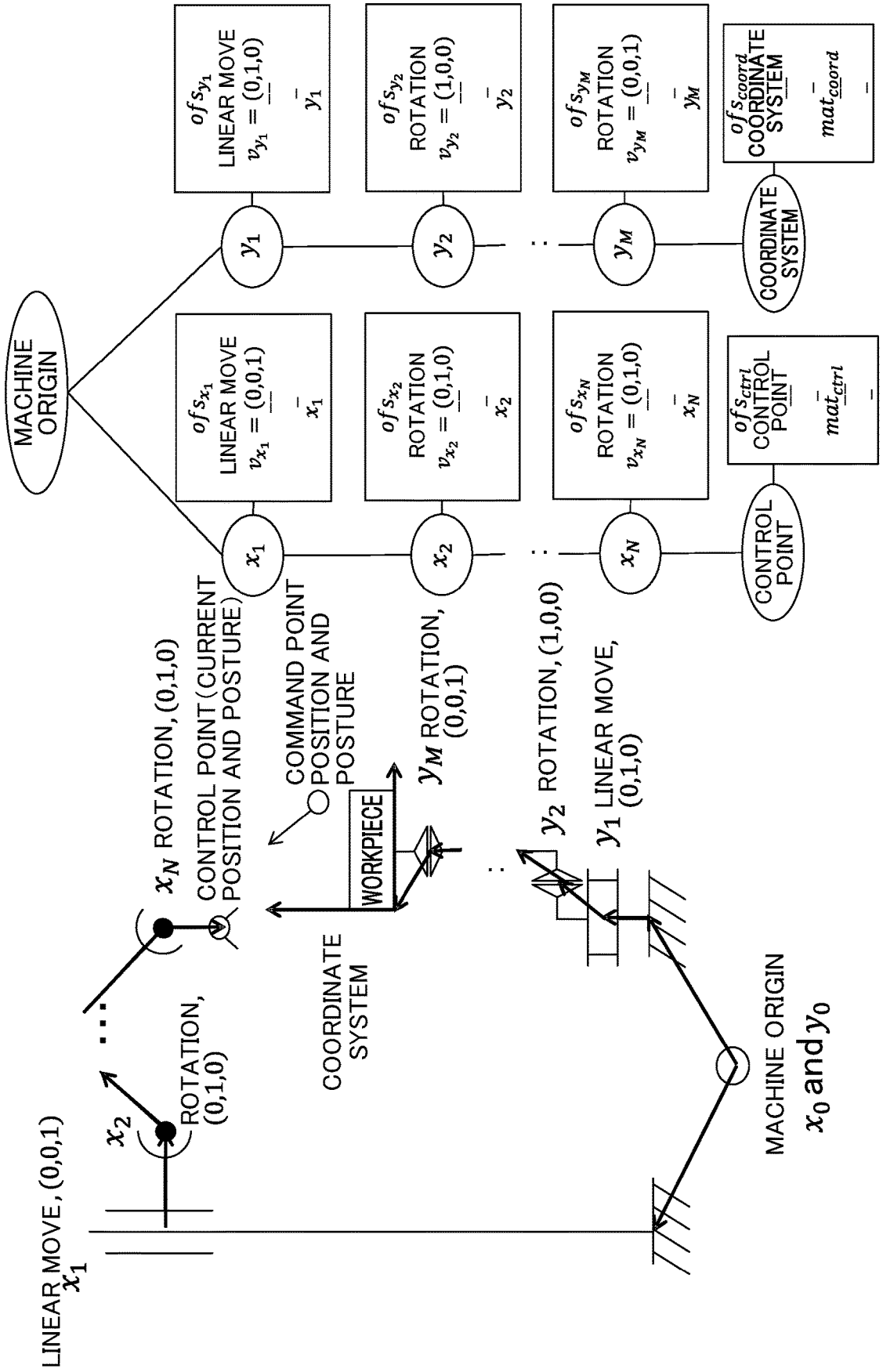
FIG. 28 is a diagram showing an example of information used when a movement pulse is generated in the embodiment of the present invention.

Furthermore, it is assumed that the offset, the type of node (linear line/rotation/unit/control point/coordinate system), the axis direction, the posture matrix and the coordinate value shown in FIG. 28 are given to the individual nodes.

Figure 31:
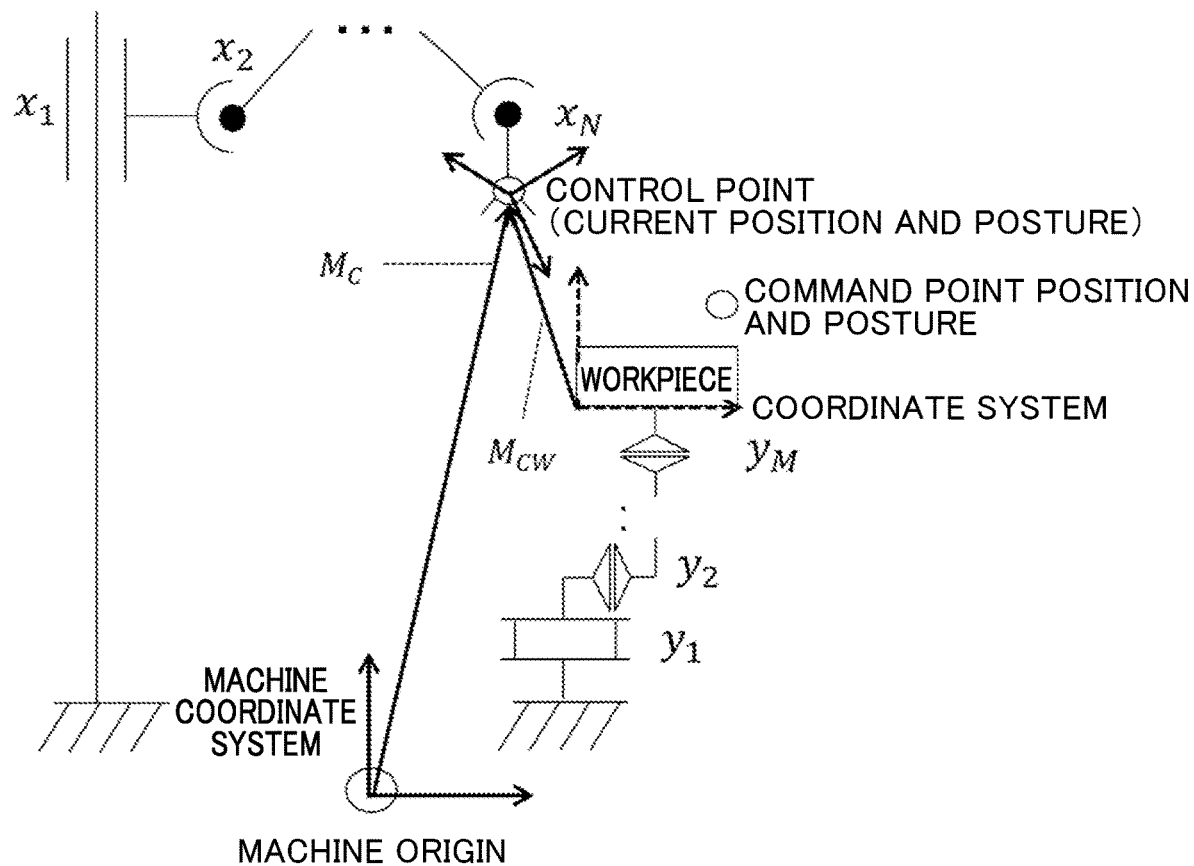
FIG. 31 is a diagram showing an example of the information used when the movement pulse is generated in the embodiment of the present invention.

Here, as shown in FIG. 31, the homogeneous matrix $M_c$ indicating the current position and posture of the control point with respect to the route (machine origin) is determined by a formula below.

$$M_C=\{\Pi_{i=1}^{N}S(a_{x_i},b_{x_i})\}M_{[ctrl]} \quad \text{where} \quad \Pi_{i=1}^{N}M_i=M_1 M_2\ldots M_n \quad \text{[Formula 17]}$$

Here, the meanings of symbols are as described in "5. Calculation method of control point position and control point posture", and thus they are omitted.

A homogeneous matrix Mcw indicating the current position and posture of the control point on the specified coordinate system is determined by a formula below by use of $M_c$.

$$M_{cw}=M_{[coord]}^{-1}\{\Pi_{i=L}^{1}S^{-1}(a_{y_i},b_{y_i})\}M_c \quad \text{where} \quad \Pi_{i=1}^{n}M_i=M_1 M_2\ldots M_n \quad \text{[Formula 18]}$$

Then, the current position vector $pos_{cw}$ of the control point on the specified coordinate system is determined as follows.

$$Pos_{cw}=M_{cw}(0\ 0\ 0\ 1)^T \quad \text{[Formula 19]}$$

Figure 32:
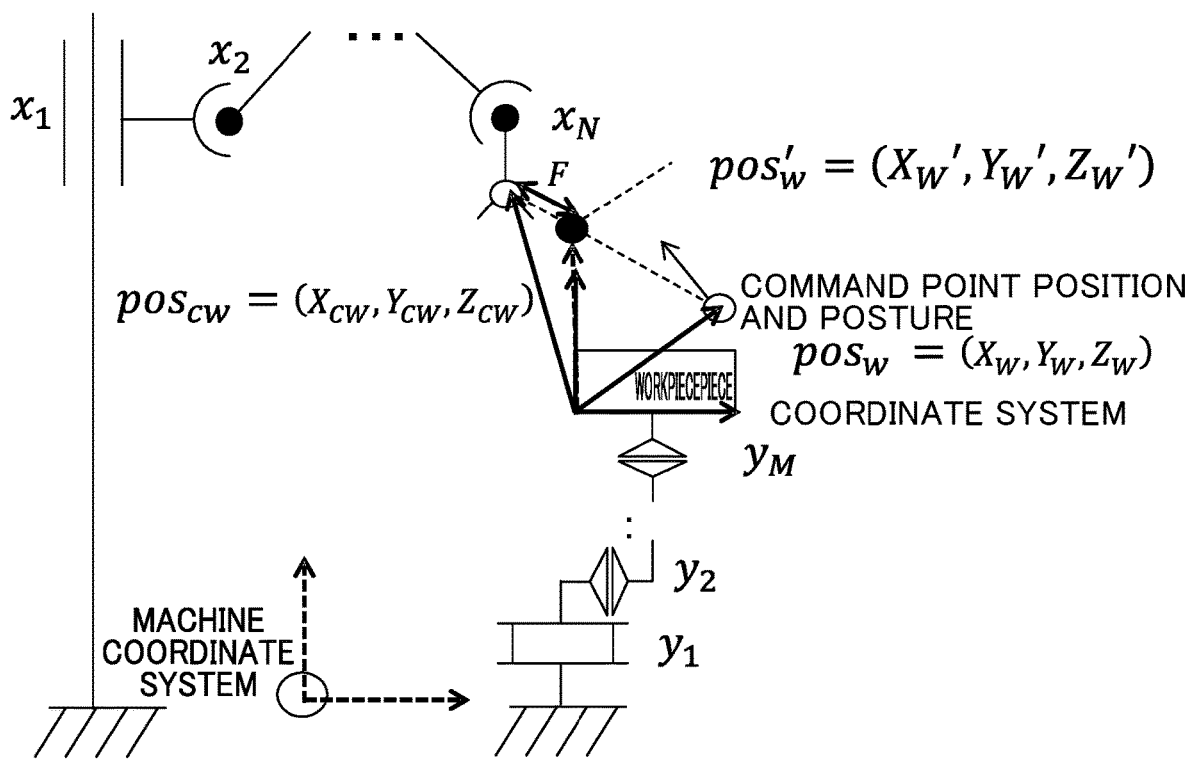
FIG. 32 is a diagram showing an example of the information used when the movement pulse is generated in the embodiment of the present invention.

Then, as shown in FIG. 32, the subsequent interpolation position vector $pos'_w$ on the specified coordinate system is determined by a formula below by use of $pos_{cw}$, $$pos'_w = pos_{cw}+F\frac{pos_w-pos_{cw}}{\|pos_w-pos_{cw}\|} \quad \text{[Formula 20]}$$

where F represents a specified move speed per interpolation period. In this way, it is possible to determine the position per interpolation period on a linear line connecting the current position and the command point position in the specified coordinate system.

On the other hand, the current tool direction vector $vec_{cw}$ of the control point on the specified coordinate system is determined as follows with the assumption that the tool reference direction vector is (0, 0, 1, 0).

$$vec_{cw}=M_{cw}(0\ 0\ 1\ 0)^T \quad \text{[Formula 21]}$$

The tool reference direction vector is not limited to the tool reference direction vector described above, and may be changed by a command, a parameter setting or the like.

Figure 33:
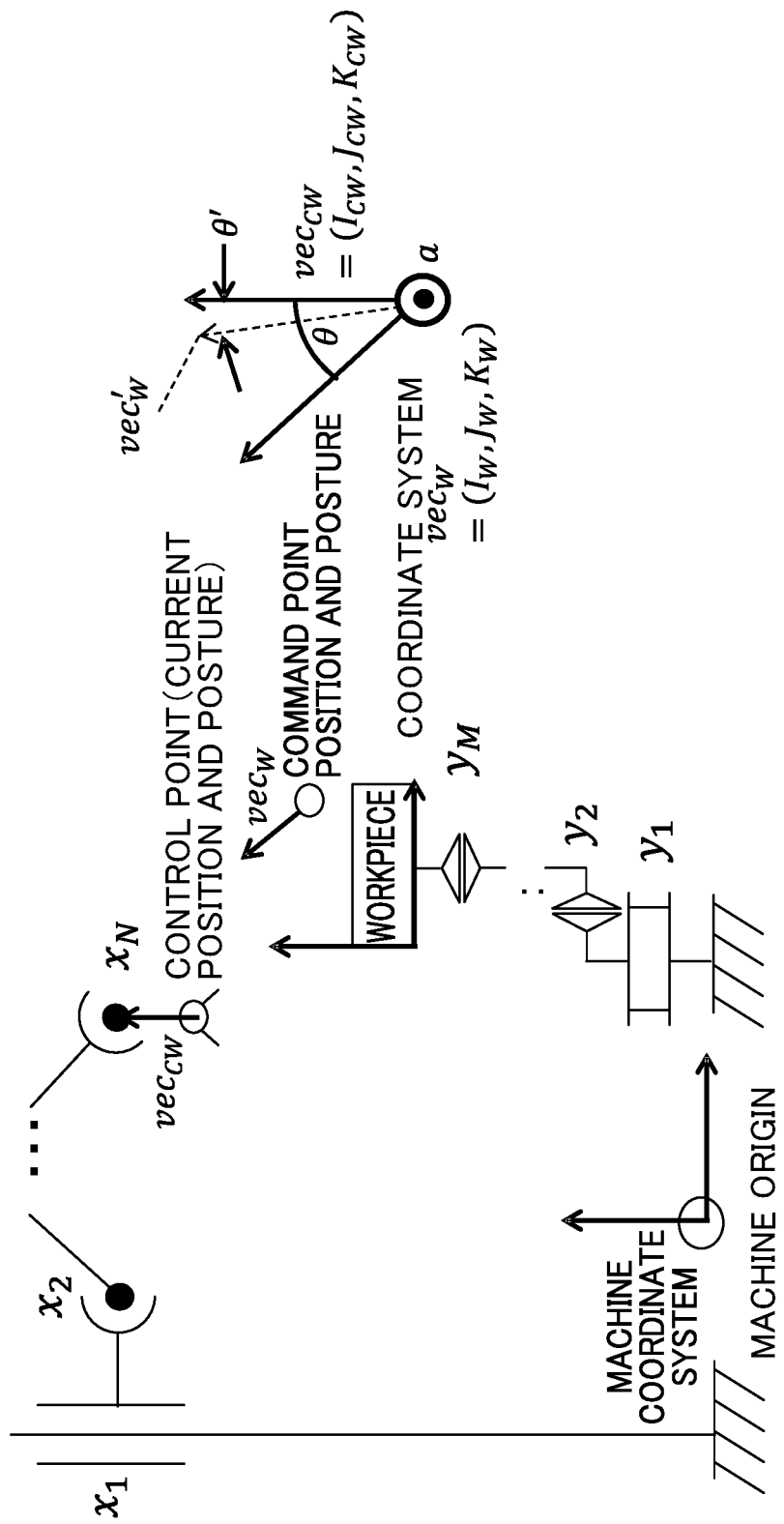
FIG. 33 is a diagram showing an example of the information used when the movement pulse is generated in the embodiment of the present invention.

Then, as shown in FIG. 33, the subsequent interpolation tool direction vector $vec'_w$ of the control point on the specified coordinate system is determined by a formula below, $$\theta = \cos^{-1}(vec_{cw} \cdot vec_w) \quad \text{[Formula 22]}$$

$$\theta' = \frac{\|pos'_w-pos_{cw}\|}{\|pos_w-pos_{cw}\|}\theta$$

$$\text{axis} = \frac{vec_{cw} \times vec_w}{\|vec_{cw} \times vec_w\|}$$

$$vec'_w = \text{Rot}(\theta',\text{axis})$$

where the description of a symbol is as follows.

Rot ($\theta'$,axis): Rotary matrix rotated in a vector axis direction by $\theta'$ which is the same as in the description of a matrix R in [Formula 7].

As described above, the subsequent interpolation position vector $pos'_w$ and the subsequent interpolation tool direction vector $vec'_w$ are determined, and then the following simultaneous equation is set up for each of the position and the posture of the control point.

$$\left\{\prod_{i=1}^{N}S(a_{x_i},b_{x_i})\right\}M_{[ctrl]}\begin{pmatrix}0&0&0&1\\0&0&1&0\end{pmatrix}^T = \left\{\prod_{i=1}^{L}S(a_{y_i},b_{y_i})\right\}M_{[coord]}\begin{pmatrix}pos'_w&1\\vec'_w&0\end{pmatrix}^T \quad \text{[Formula 23]}$$

This simultaneous equation is solved with respect to each of $x_i$ and $y_i$, and thus the subsequent interpolation position of each axis is determined.

When the simultaneous equation is solved, it is possible to calculate the solution by use of, for example, a Gröbner basis. Specifically, based on a lexicographic order $x_1 > x_2 > \ldots > x_N > y_1 > y_2 > \ldots y_M$, for example, a Buchburger algorithm or the like is used so as to determine the Gröbner basis of the simultaneous equation, and thus a unitary multidimensional equation with respect to the least significant order $y_M$ is determined. This equation is solved so as to determine the solution of $y_M$, this solution is used so as to sequentially solve the equations with respect to other Gröbner bases and thus it is possible to determine the solution of the simultaneous equation described above with respect to each of $x_i$ and $y_i$.

The solutions $x_i'$ and $y_i'$ determined in this way are used so as to output the amount of move of $\Delta x_i'=x_i'-x_i$, $\Delta y_i'=y_i'-y_i$ to each axis, and thus it is possible to realize a move at a specified speed on the specified coordinate system.

When the flexibility of the machine configuration is redundant, for example, it is possible to cope with such a case by adding, in a simultaneous manner, to the mathematical formula of [Formula 23], a restraint condition in which some axes are not moved or in which a command value is directly given to some axes. It is also possible to cope with it by a method of making some axes have the attribute of an auxiliary axis which is normally moved and moving the axes only in the vicinity of a singular point only for an operation of avoiding the singular point. It is also possible to cope with it by adding an auxiliary control point and issuing a command to it.

Even when the flexibility of the machine configuration is not redundant, a command value is directly given to some axes, and thus it is possible to omit the simultaneous state of the simultaneous equation. For example, in order to distinguish a rotary axis in which as the coordinate value is varied, the tool direction of the control point with respect to the specified coordinate system is varied from a rotary axis which does not contribute to a variation in the tool direction, the rotary axis is referred to as a tool variation rotary axis, and it is assumed that information as to whether or not each node of the machine configuration tree is the tool variation rotary axis is possessed. It is also assumed that the individual paths from the route to the control point and from the route to the coordinate system are represented by the mathematical formula of [Formula 15], and that a list of tool variation rotary axis nodes included in the individual paths is the mathematical formula of [Formula 24].

$$\{x_n, y_m\} \qquad \text{[Formula 24]}$$

Figure 34:
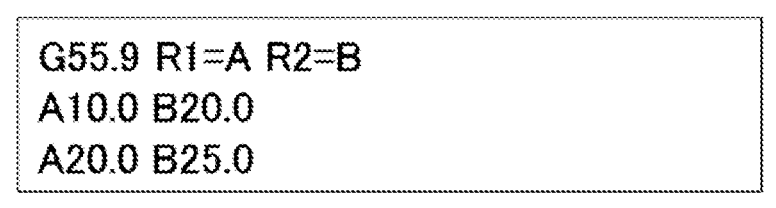

Among the tool variation rotary axes on the side of the control point, sequentially from the farthest one from the route, the first and the second are provided, and thereafter among the tool variation rotary axes on the side of the coordinate system, sequentially from the farthest one from the route, the third and the fourth are provided, with the result that it is possible to strictly define the order of the tool variation rotary axes for any machine configuration tree. Hence, xn is referred to as the first tool variation rotary axis, and ym is referred to as the second tool variation rotary axis. Here, an identifier R1 representing the first tool variation rotary axis and an identifier R2 representing the second tool variation rotary axis are used, and thus a command is issued as shown in FIG. 34. The addresses A and B specified in this way are used, and thus not the tool direction vector but the angle value of the tool variation rotary axis can be directly commanded.

In this case, the subsequent interpolation positions xn' and yn' of the first tool variation rotary axis and the second tool variation rotary axis can be determined by a formula below.

When command values for $x_n$, [Formula 25]

$y_m$ are assumed to be $x_{nw}, y_{mw}$ $$x'_n = x_n + \frac{\|pos'_w - pos_{cw}\|}{\|pos_w - pos_{cw}\|}(x_{nw} - x_n)$$

$$y'_m = y_m + \frac{\|pos'_w - pos_{cw}\|}{\|pos_w - pos_{cw}\|}(y_{mw} - y_m)$$

In this way, the node coordinate values of the first tool variation rotary axis and the second tool variation rotary axis are determined, and thus the tool direction vector is also determined. Hence, it is not necessary to solve the simultaneous equation with respect to the tool direction vector, and thus the following simultaneous equation with respect to the command position is only solved.

$$\{\Pi_{i=1}^{N} S(a_{x_i}b_{x_i})\} M_{[ctrl]}(0\ 0\ 0\ 1)^T = \{\Pi_{i=1}^{L} S(a_{y_i}b_{y_i})\}$$
$$M_{[coord]}(\text{pos}'_w 1)T \qquad \text{[Formula 26]}$$

However, in the equation described above, as the coordinate values of nodes xn and yn, the values determined as described above are substituted, and thus the equation is solved while they are regarded as constants.

As described above, as the command value in the program, the coordinate value of the specific node can be directly specified. In this way, it is possible to reduce the number of simultaneous equations.

10. EXAMPLES

10.1 Example 1

Hereinafter, Example 1 will be described with reference to FIGS. 35 to 41. Example 1 is an example in which an error node related to a three-dimensional rotational error is inserted adjacent to the machine origin in the machine configuration tree.

Figure 35:
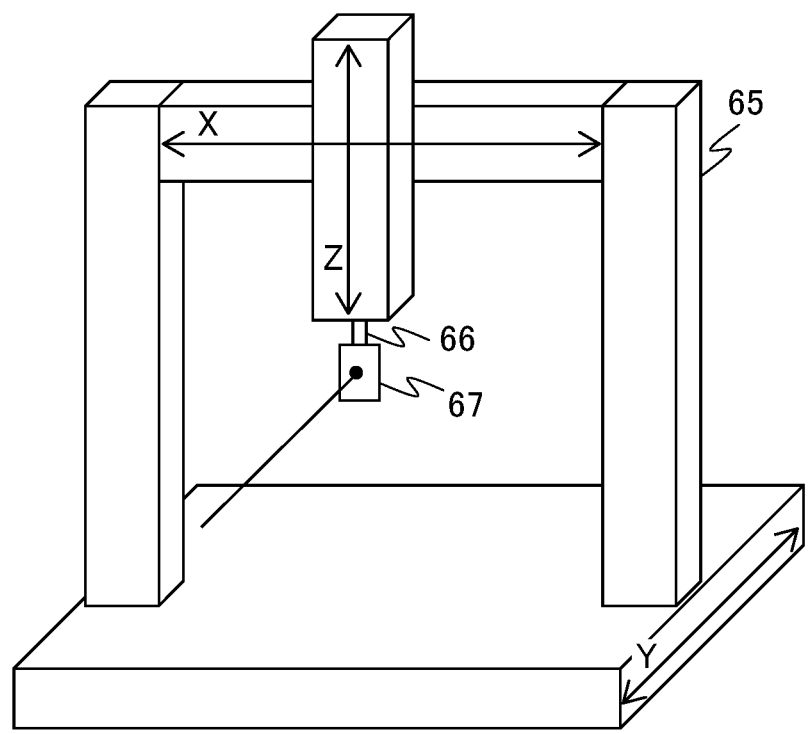
FIG. 35 is an explanatory diagram for illustrating an actual measurement method of an error in a machine tool.

FIG. 35 is a diagram illustrating a method of actually measuring an error in a machine tool 65. As illustrated in FIG. 35, a mirror 67 is installed at a tip of a tool 66 of the machine tool 65, and the mirror 67 is irradiated with a laser by a laser interferometer (not illustrated), whereby an error in the position of the mirror 67 is actually measured.

Figure 36:
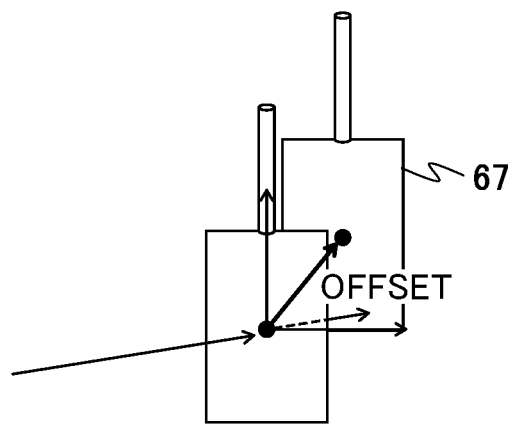
FIG. 36 is an explanatory diagram for illustrating an offset as an error of a mirror installed in the machine tool.
Figure 37:
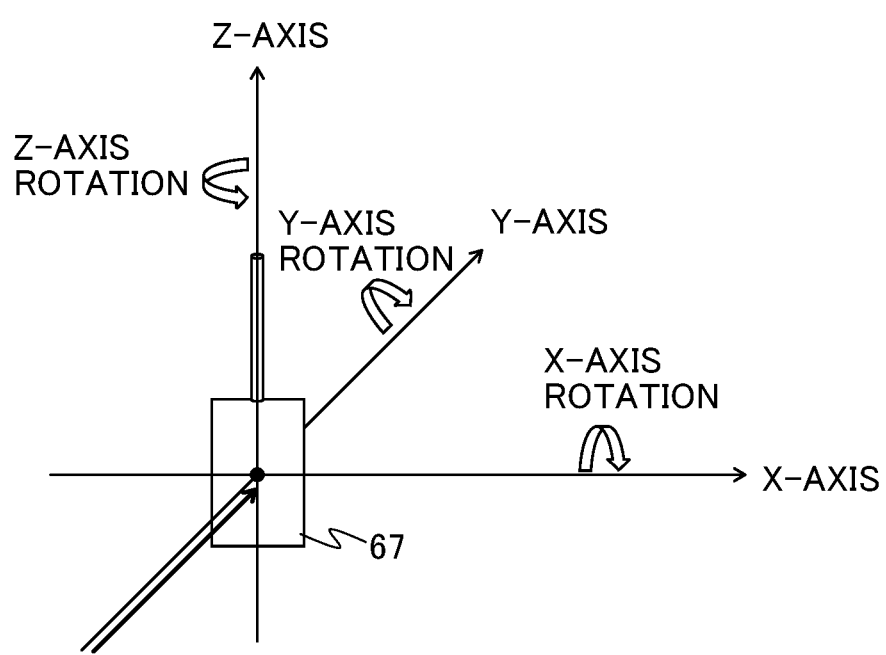
FIG. 37 is an explanatory diagram for illustrating a roll, a pitch, and a yaw as an error of the mirror installed in the machine tool.

The error in the position of the mirror 67 includes a translational error and a rotational error. As illustrated in FIG. 36, the translational error is an error related to an error of a center position of the mirror 67, and is actually measured as an offset of the center position. On the other hand, as illustrated in FIG. 37, the rotational error is an error related to a posture of the mirror 67, and is actually measured as a rotation angle around an X-axis, a rotation angle around a Y-axis, and a rotation angle of a Z-axis. Further, the translational error and the rotational error are differential values on the machine coordinate system.

A translational error vector representing the translational error of the mirror 67 can be obtained by the following formula using an actual value (x, y, z)=($T_x$, $T_y$, $T_z$) of the offset of the mirror 67.

$$\vec{T} = \begin{pmatrix} T_x \\ T_y \\ T_z \end{pmatrix} \qquad \text{[Formula 27]}$$

On the other hand, a rotational error matrix representing the rotational error of the mirror 67 can be approximately obtained by the following formula using the rotation angle a around the X-axis, the rotation angle b around the Y-axis, and the rotation angle c around the Z-axis of the mirror 67 when the rotation angles a, b, and c are small.

$$\hat{R} = \begin{pmatrix} 1 & -c & b \\ c & 1 & -a \\ -b & a & 1 \end{pmatrix} \qquad \text{[Formula 28]}$$

The translational error vector and the rotational error matrix described above are stored as error information in the error information storage portion 142. In addition, as a coordinate system in which the machine coordinate system observes the error, the translational error vector and the rotational error matrix are stored in the error information storage portion 142.

Next, the error in the mirror position stored in the error information storage portion 142 is transformed into an error in the error node insertion position by the error node generation portion 115. Here, as an example, it is assumed that the error is transformed into an error at a machine origin 68 of the machine tool 65.

Figure 38:
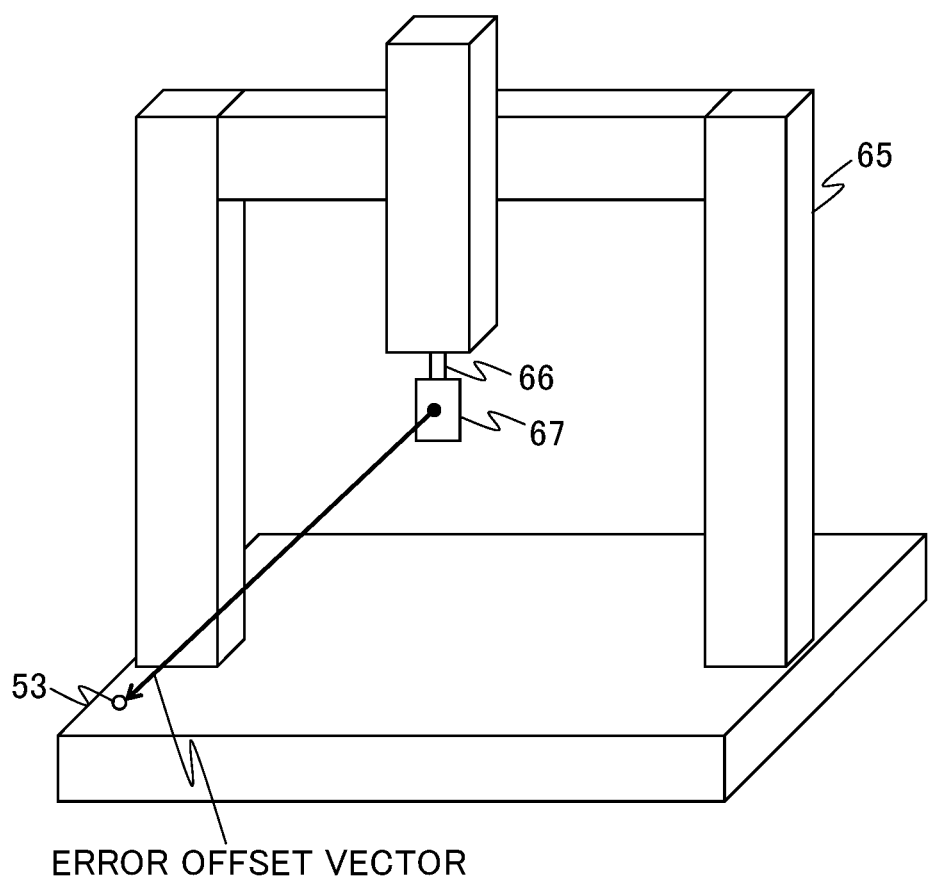
FIG. 38 is an explanatory diagram for illustrating an error offset vector in the machine tool.
Figure 39:
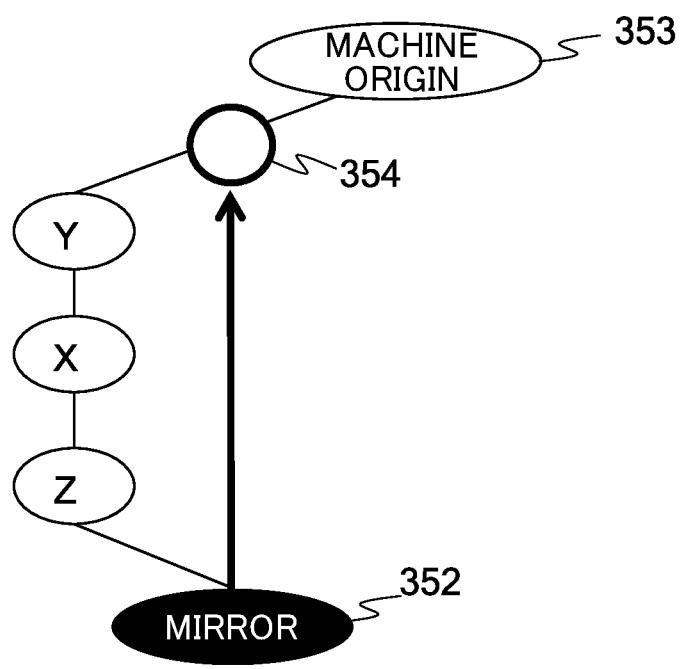
FIG. 39 is a diagram illustrating an insertion place of an error node in the machine configuration tree according to the embodiment of the present invention.

As illustrated in FIG. 38, a vector from the machine origin 68 to the position of the mirror 67 is referred to here as an "error offset vector". The error offset vector can be calculated from the machine configuration tree. At this time, it is assumed in the machine configuration tree illustrated in FIG. 39 that a node separated by the error offset vector from a node 352 corresponding to the mirror is added as an error node 354 adjacent to a node 353 corresponding to the machine origin.

Figure 40:
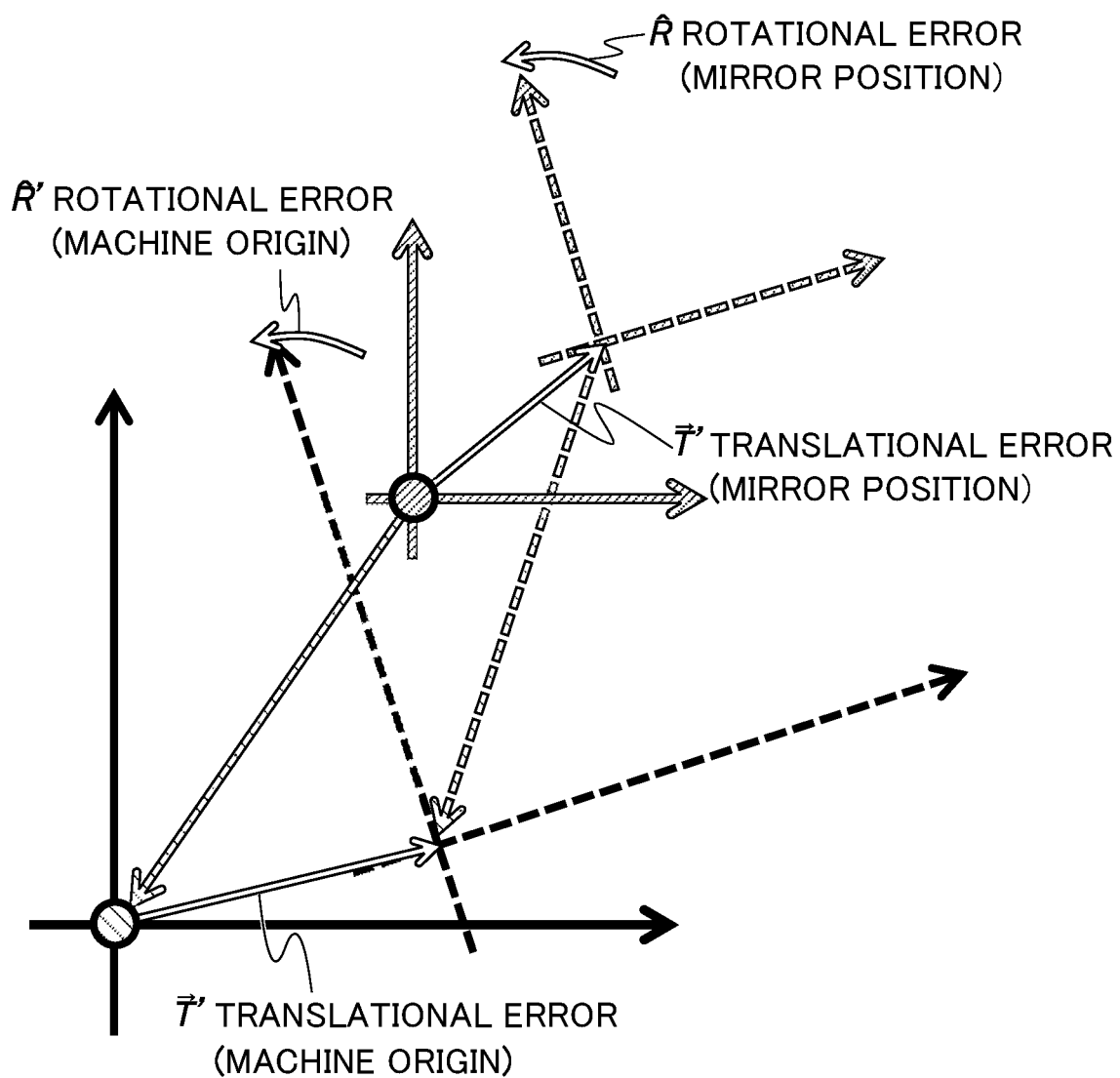
FIG. 40 is a diagram illustrating a method of transforming a translational error and a rotational error between different coordinate systems in the embodiment of the present invention.

As illustrated in FIG. 40, assuming that the translational error at the mirror position is as follows:

$$\vec{T} \quad \text{[Formula 29]}$$

the rotational error at the mirror position is as follows:

$$\hat{R} \quad \text{[Formula 30]}$$

the translational error at the machine origin position is as follows:

$$\vec{T}' \quad \text{[Formula 31]}$$

the rotational error at the machine origin position is as follows: and $$\hat{R}' \quad \text{[Formula 32]}$$

the error offset vector is as follows:

$$\vec{L} \quad \text{[Formula 33]}$$

the error node generation portion 115 transforms the error at the mirror position into the error at the machine origin and generates an error node corresponding to the error at the machine origin, using the following formula:

$$\hat{R}' = \hat{R}$$

$$\vec{T}' = \vec{T} + \hat{R}\vec{L} - \vec{L} \quad \text{[Formula 34]}$$

The above formula is a formula when movement of the position among the position and posture stored in the node of the machine configuration tree is calculated first in the coordinate value in a forward kinematics transformation. The formula when the rotation of the posture is calculated first can be transformed as follows.

$$\hat{R}'' = \hat{R}'$$

$$\vec{T}'' = \hat{R}'\vec{T}' \quad \text{[Formula 35]}$$

Figure 41:
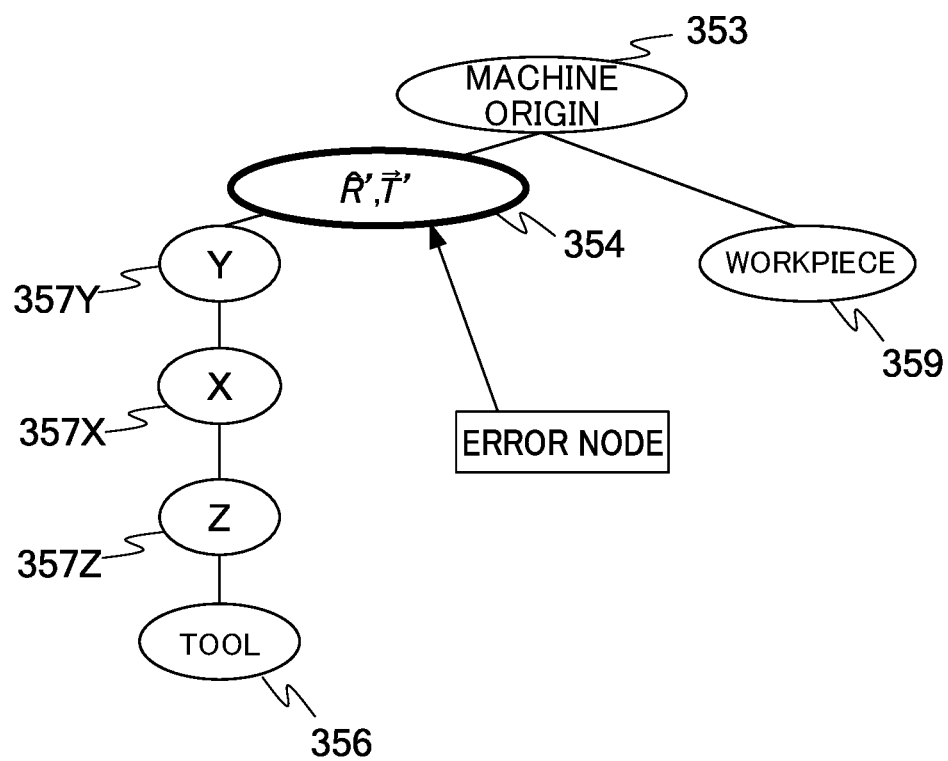
FIG. 41 is a diagram illustrating an example of the machine configuration tree in the embodiment of the present invention.

Next, the error node addition portion 112 adds the error node 354 generated by the error node generation portion 115 to the machine configuration tree to be adjacent to the node 353 corresponding to the machine origin. FIG. 41 shows a machine configuration tree after the error node 354 is added.

Finally, the controller 100 calculates a motor command value using the machine configuration tree to which the error node 354 is added.

Example 1 can compensate the error even when the cause of the error to be measured cannot be separated for each axis.

10.2 Example 2

Hereinafter, Example 2 will be described with reference to FIGS. 42 and 43. Example 2 is an example in which an error node related to a three-dimensional rotational error is inserted at a mirror position in a machine configuration tree.

First, also in Example 2, as in Example 1, a translational error vector and a rotational error matrix are stored as error information in the error information storage portion 142 and an error at a mirror position stored in the error information storage portion 142 is transformed into an error at an error node insertion position by the error node generation portion 115.

In Example 2, in parallel with this, the error node generation portion 115 generates two nodes corresponding to the mirror offset as follows.

$$\vec{M} \quad \text{[Formula 36]}$$

and $$-\vec{M} \quad \text{[Formula 37]}$$

Figure 42:
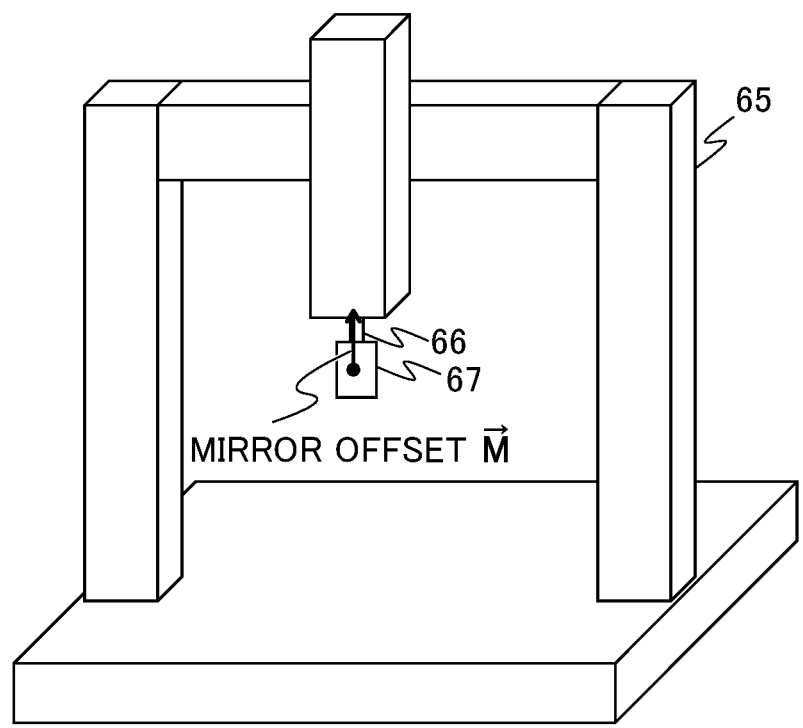
FIG. 42 is an explanatory diagram for illustrating a mirror offset in the machine tool.
Figure 43:
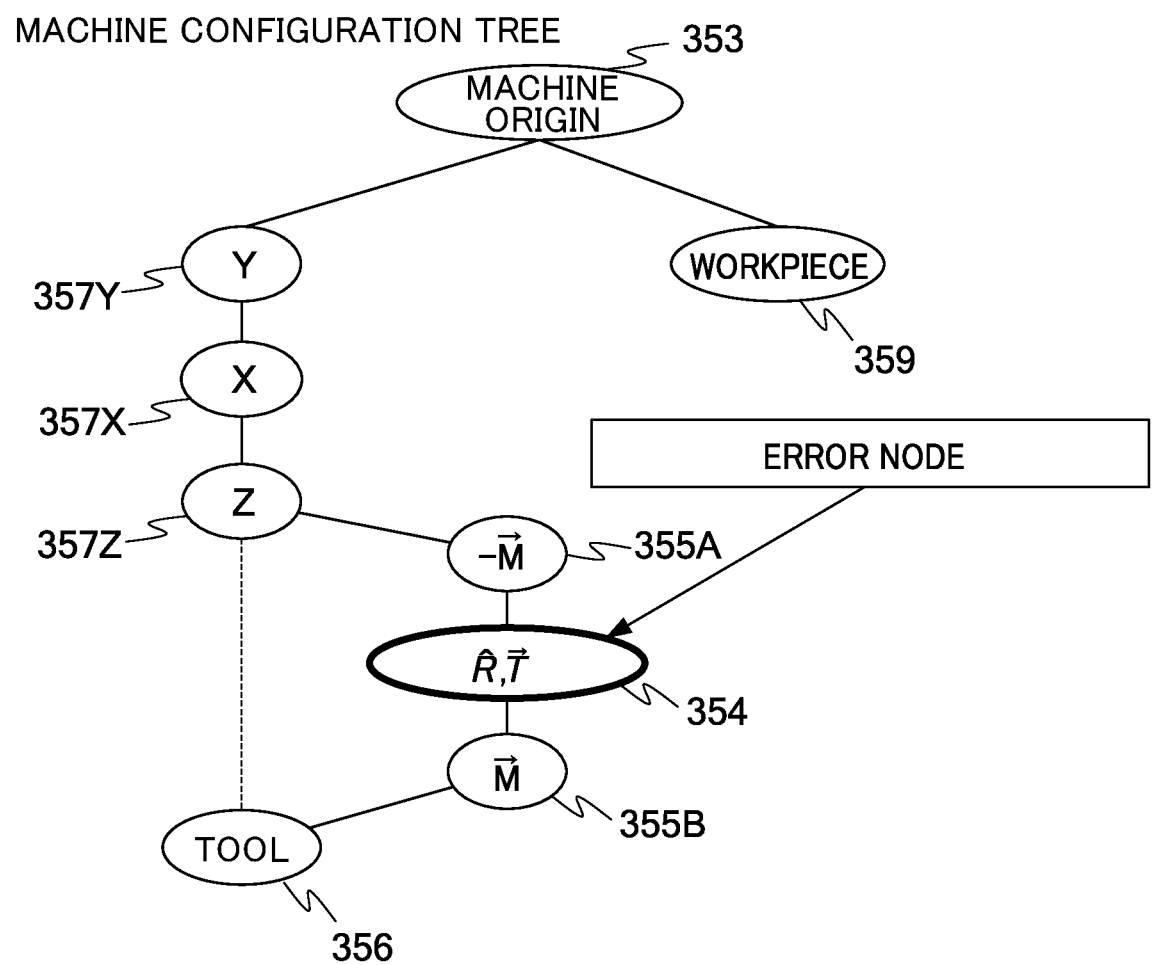
FIG. 43 is a diagram illustrating an example of the machine configuration tree in the embodiment of the present invention.

Here, the "mirror offset" is a vector from a center position of a mirror 67 to a root position of a tool 66 as illustrated in FIG. 42. In other words, the "mirror offset" is a vector from a position where the error is measured until the error node is inserted, and corresponds to the error offset vector of "Example 1" above.

Next, the error node addition portion 112 adds an error node 354 and two mirror offset nodes 355A and 355B, which are generated by the error node generation portion 115, to the machine configuration tree. More specifically, as illustrated in FIG. 43, the two mirror offset nodes 355A and 355B are added adjacent to the node 356 corresponding to the tool, and the error node 354 is added between the two mirror offset nodes 355A and 355B. A node, in which these nodes 355A, 354, and 355B are combined, corresponds to an error at an error node insertion position 357Z.

Finally, the controller 100 calculates a motor command value using the machine configuration tree to which the error node 354 and the two mirror offset nodes 355A and 355B are added.

In Example 2, it is not necessary to transform the measured error into a relative value from the error node insertion position, and thus the time and labor are reduced.

This is because the nodes 355A and 355B are added to the machine configuration tree and thus the calculation corresponding to Formula 33 of "Example 1" above is performed by the movement command portion.

10.3 Example 3

Figure 44:
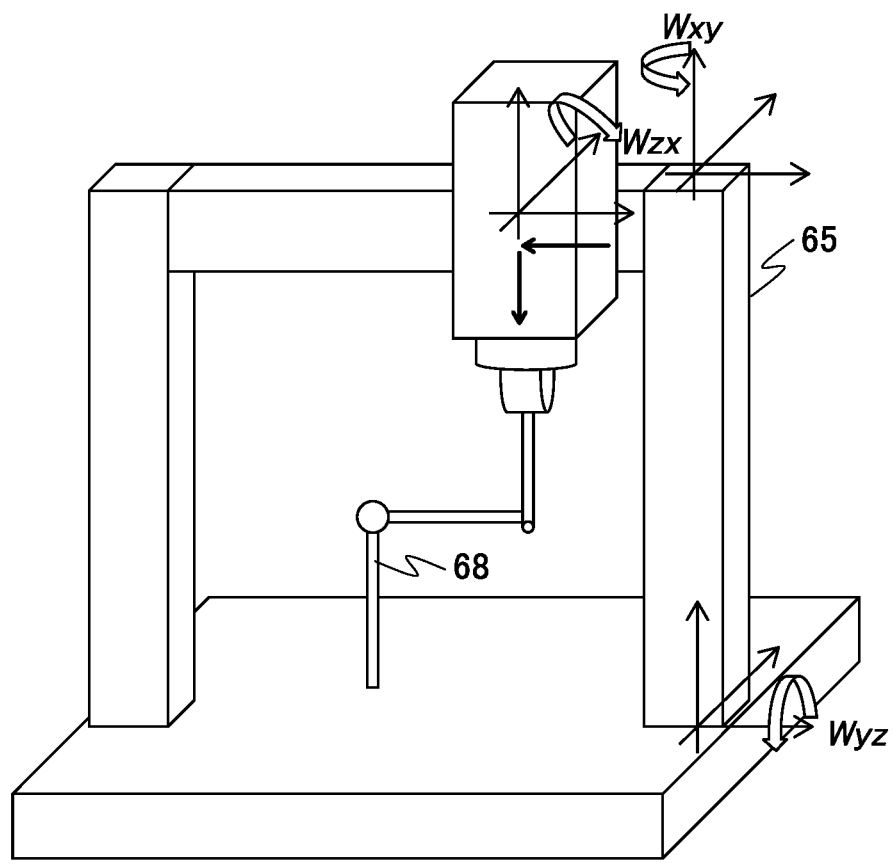
FIG. 44 is an explanatory diagram for illustrating a squareness error in the machine tool.
Figure 45:
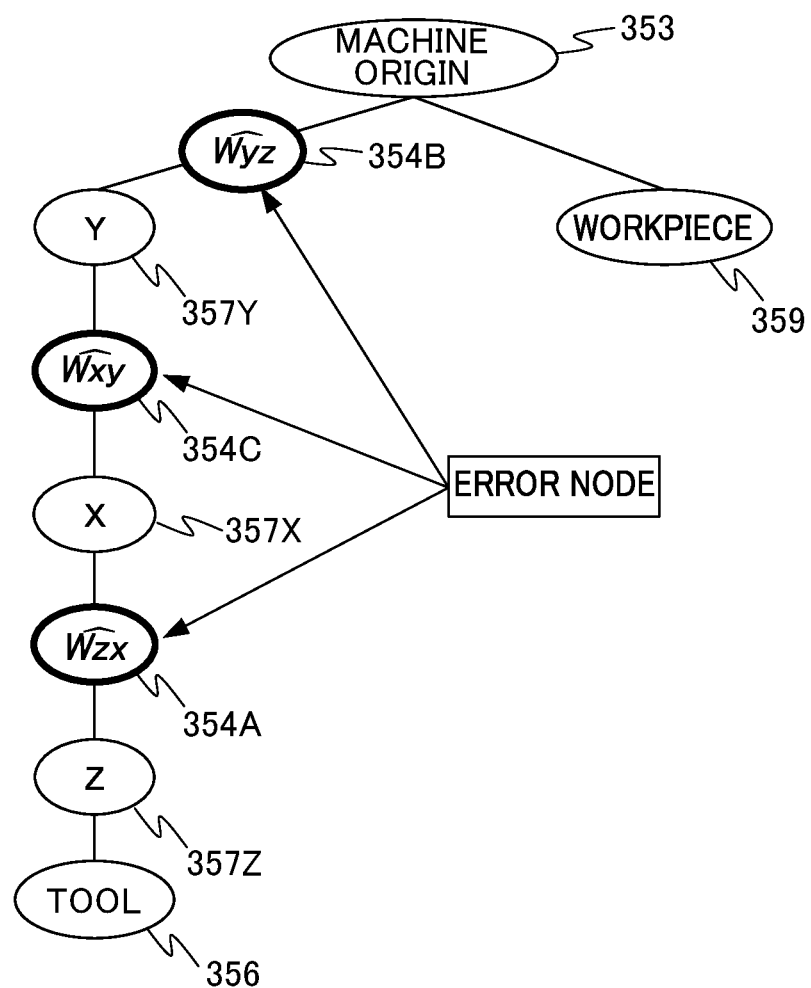
FIG. 45 is a diagram illustrating an example of the machine configuration tree in the embodiment of the present invention.

Hereinafter, Example 3 will be described with reference to FIGS. 44 and 45. Example 3 is an example in which an error node corresponding to a squareness error of each axis is inserted into one machine origin side of the error node cc) corresponding to each axis in the machine configuration tree.

As a general method, a ball bar can be used to measure a squareness error Wzx around a Z-X axis, a squareness error Wyz around a Y-Z axis, and a squareness error Wxy around an X-Y axis. The measured information is stored as error information in the error information storage portion 142. The ball bar is a measuring instrument that measures relative displacement between two balls attached to both ends of a stretchable rod into which a displacement meter is integrated. FIG. 44 illustrates squareness errors around respective axes.

Next, the error node generation portion 115 transforms each of the squareness errors stored in the error information storage portion 142 into a squareness error matrix of each axis using the following formula.

$$\hat{W}_{zx} = \begin{pmatrix} 1 & 0 & W_{zx} \\ 0 & 1 & 0 \\ -W_{zx} & 0 & 1 \end{pmatrix}$$ [Formula 38]

$$\hat{W}_{yz} = \begin{pmatrix} 1 & 0 & 0 \\ 0 & 1 & -W_{zy} \\ 0 & W_{zy} & 1 \end{pmatrix}$$

$$\hat{W}_{xy} = \begin{pmatrix} 1 & -W_{xy} & 0 \\ W_{xy} & 1 & 0 \\ 0 & 0 & 1 \end{pmatrix}$$

Next, the error node addition portion 112 adds error nodes 354A to 354C, which are squareness error matrices generated by the error node generation portion 115, to the machine configuration tree. More specifically, as illustrated in FIG. 45, the error node addition portion 112 adds the error node 354A corresponding to the following formula in front of a node 357Z corresponding to the Z-axis when viewed from the machine origin in the machine configuration tree.

$$\hat{W}_{zx}$$ [Formula 39]

Similarly, the error node addition portion 112 adds the error node 354B corresponding to the following formula in front of a node 357Y corresponding to the Y-axis when viewed from the machine origin in the machine configuration tree.

$$\hat{W}_{yz}$$ [Formula 40]

Similarly, the error node addition portion 112 adds the error node 354C corresponding to the following formula in front of a node 357X corresponding to the X-axis when viewed from the machine origin in the machine configuration tree.

$$\overline{\hat{W}_{xy}}$$ [Formula 41]

Finally, the controller 100 calculates a motor command value using the machine configuration tree to which the error nodes 354A to 354C are added.

In Example 3, since the error node 354 is inserted immediately before the axis that causes the error, it is possible to generate the machine configuration tree that most faithfully reproduces the actual machine tool.

10.4 Example 4

Hereinafter, Example 4 will be described with reference to FIGS. 46 to 48. Example 4 is an example in which an error node related to an error measured on the machine tool is inserted into the machine configuration tree.

Figure 46:
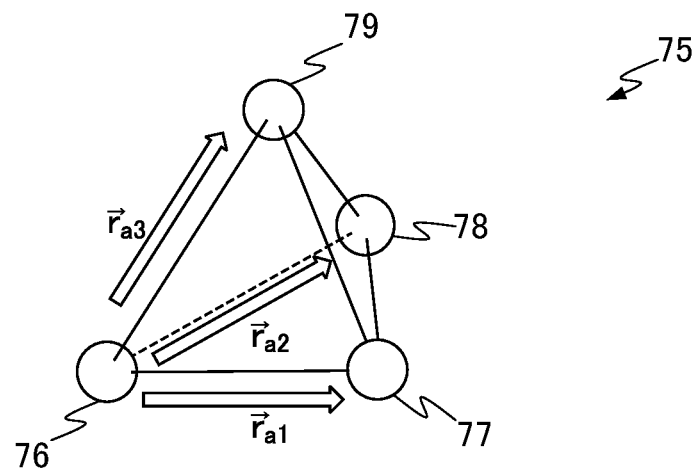
FIG. 46 is a diagram illustrating a configuration example of an artifact which is an artificial object having a reference shape for measurement.

First, an artifact 75 is prepared as illustrated in FIG. 46. Here, the "artifact" is an artificial object having a reference shape for measurement. In the example illustrated in FIG. 46, the artifact 75 has a shape in which each of four balls 76 to 79 is an apex of a triangular pyramid. Further, a true value of a vector from the ball 76 to the ball 77 in a coordinate system on a C-axis node is defined as follows:

$$\vec{r}_{a1}$$ [Formula 42]

a true value of a vector from the ball 76 to the ball 78 in the coordinate system on the C-axis node is defined as follows: and $$\vec{r}_{a2}$$ [Formula 21]

a true value of a vector from the ball 76 to the ball 79 in the coordinate system on the C-axis node is defined as follows.

$$\vec{r}_{a3}$$ [Formula 44]

Figure 47:
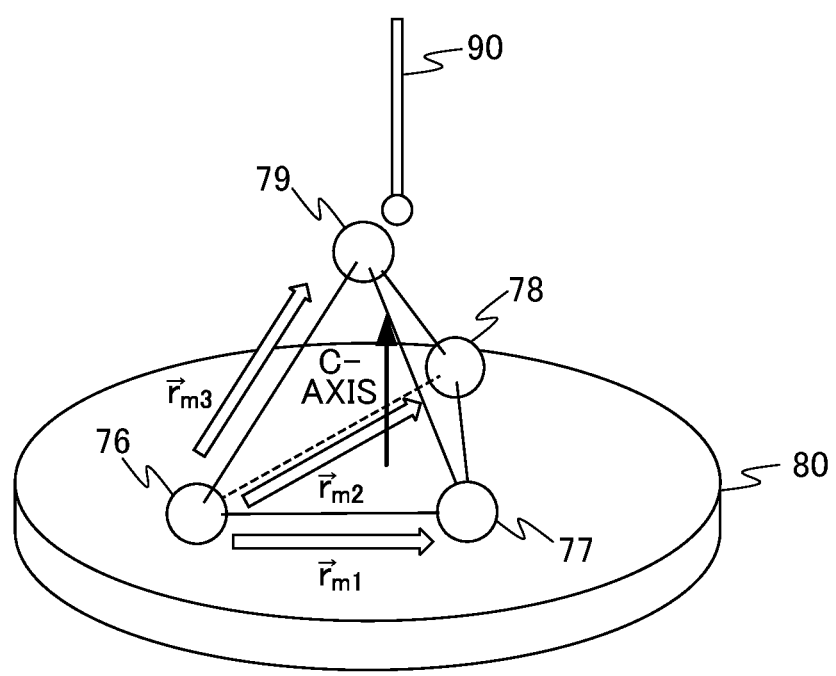
FIG. 47 is a diagram illustrating an installation example of the artifact in the embodiment of the present invention.
Figure 48:
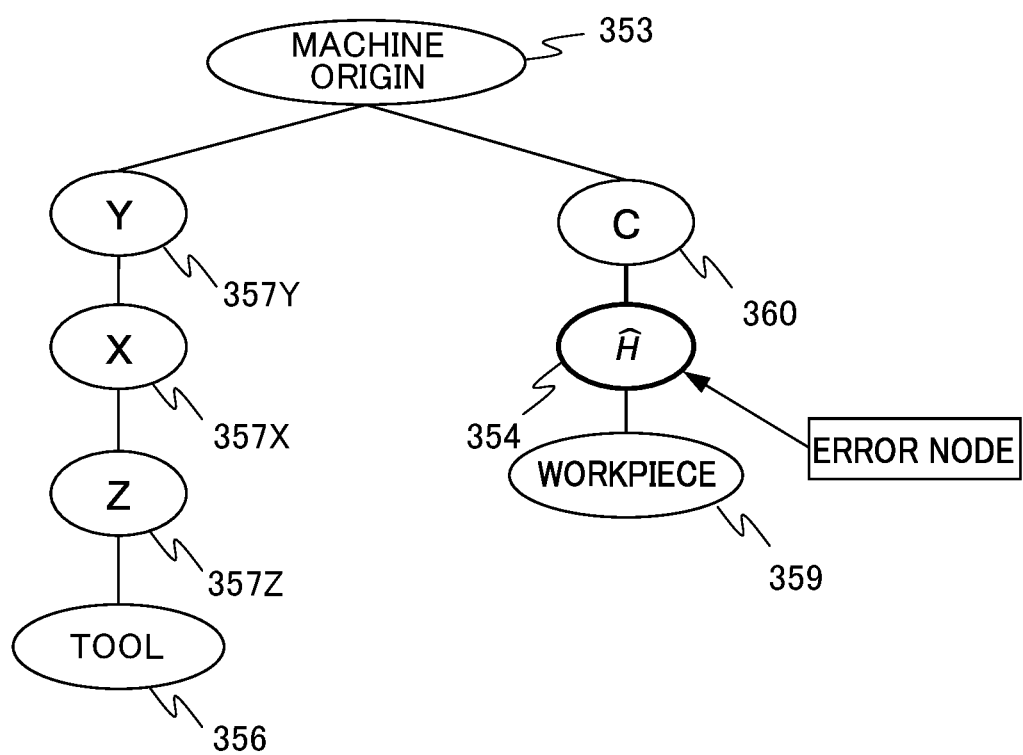
FIG. 48 is a diagram illustrating an example of the machine configuration tree in the embodiment of the present invention.

Next, as illustrated in FIG. 47, the artifact 75 is placed on a table 80 provided in the machine tool, and is measured with coordinates of the balls 76 to 79 by a probe 90 attached to the tip of the machine tool. Here, the "probe" is a measuring instrument that measures an origin, position, and posture of a workpiece placed on the table 80. Further, a central axis of the table 80 is referred to as the C-axis. A measured value of the vector from the ball 76 to the ball 77 obtained from the measured values of the coordinates of the balls 76 to 79 is defined as follows:

$$\vec{r}_{m1}$$ [Formula 45]

a measured value of the vector from the ball 76 to the ball 78 in the coordinate system on the C-axis node is defined as follows: and $$\vec{r}_{m2}$$ [Formula 46]

a measured value of the vector from the ball 76 to the ball 79 in the coordinate system on the C-axis node is defined as follows.

$$\vec{r}_{m3}$$ [Formula 47]

The error information storage portion 142 stores as error information these true values and the measured values.

Next, the error node generation portion 115 uses the following formula:

$$\hat{H}$$ [Formula 48]

and obtains a matrix for transforming each measured value stored in the error information storage portion 142 into a true value to generate an error node 354 corresponding to such a matrix.

$$H = (\vec{r}_{m1}\ \vec{r}_{m2}\ \vec{r}_{m3})(\vec{r}_{a1}\ \vec{r}_{a2}\ \vec{r}_{a3})^{-1}$$ [Formula 49]

Next, the error node addition portion 112 adds the error node 354 generated by the error node generation portion 115 to the machine configuration tree. More specifically, as illustrated in FIG. 48, the error node addition portion 112 adds the error node 354 corresponding to the following formula between a node 359 corresponding to the workpiece and a node 360 corresponding to the C-axis.

$$\hat{H}$$ [Formula 50]

Finally, the controller 100 calculates a motor command value using the machine configuration tree to which the error node 354 is added.

In Example 4, the error in the table coordinate system is measured, and the contact probe can be attached instead of the tool to measure the error. Therefore, an expensive sensor such as a laser interferometer is not required. Further, since the shape of the artifact does not matter as long as the true value can be known, the workpiece machined by the user is measured with a three-dimensional coordinate measuring instrument, and the workpiece can be compensated as a true value, that is, the result of the inspection process can be fed back to the machining process or the installation position error of the workpiece can also be measured and compensated.

11. EFFECTS OF THE PRESENT EMBODIMENT

The controller according to the present embodiment is the controller (for example, the "controller 100" described above) that expresses the machine configuration of the control target in the form of a graph in which the constituent elements are the nodes and that holds the machine configuration, the controller including: the control point coordinate system insertion portion (for example, the "control point coordinate system insertion portion 113" described above) that inserts, as a node, the control point and the coordinate system into each of the nodes in the graph of the machine configuration; the identifier allocation portion (for example, the "identifier allocation portion 114" described above) that allocates the identifier to the control point and the coordinate system which have been inserted; the error information storage portion (for example, the "error information storage portion 142" described above) that stores information related to a machine error in the control target and the identifier allocated to the coordinate system in which the machine error is observed; the error node generation portion (for example, the "error node generation portion 115" described above) that transforms the machine error into the equivalent error node; the error node addition portion (for example, the "error node addition portion 112" described above) that adds the error node in the graph of the machine configuration; the control point coordinate system specification portion (for example, the "control point coordinate system specification portion 116" described above) that specifies, with the identifier, one or more sets of the control point and the coordinate system in the graph of the machine configuration; the command value determination portion that uses the control point and the coordinate system specified by the control point coordinate system specification portion to determine for which control point and on which coordinate system one or more command values commanded in a program correspond to a coordinate value; and the movement command portion (for example, the "movement command portion 118" described above) that commands movement of the control point such that the coordinate value of the control point becomes equal to the command value.

Alternatively, the controller 100 according to the present embodiment is the controller (for example, the "controller 100" described above) that expresses the machine configuration of the control target in the form of a graph in which the constituent elements are the nodes and that holds the machine configuration, the controller including: the control point coordinate system insertion portion (for example, the "control point coordinate system insertion portion 113" described above) that allows each of the nodes in the graph of the machine configuration to have a control point and a coordinate system as information; the identifier allocation portion (for example, the "identifier allocation portion 114" described above) that allocates the identifier to the control point and the coordinate system which have been inserted; the error information storage portion (for example, the "error information storage portion 142" described above) that stores information related to a machine error in the control target and the identifier allocated to the coordinate system in which the machine error is observed; the error node generation portion (for example, the "error node generation portion 115" described above) that transforms the machine error into the equivalent error node; the error node addition portion (for example, the "error node addition portion 112" described above) that adds the error node in the graph of the machine configuration; the control point coordinate system specification portion (for example, the "control point coordinate system specification portion 116" described above) that specifies, with the identifier, one or more sets of the control point and the coordinate system in the graph of the machine configuration; the command value determination portion that uses the control point and the coordinate system specified by the control point coordinate system specification portion to determine for which control point and on which coordinate system one or more command values commanded in a program correspond to a coordinate value; and the movement command portion (for example, the "movement command portion 118" described above) that commands movement of the control point such that the coordinate value of the control point becomes equal to the command value.

As a result, it is possible to compensate the error in the machine tool having an arbitrary machine configuration using the graph where the constituent elements are nodes.

Although the embodiment of the present invention is described above, the present invention is not limited to the embodiment described above. The effects described in the present embodiment are obtained by simply listing the most preferred effects produced from the present invention, and the effects of the present invention are not limited to those described in the present embodiment.

The control method by the controller 100 is realized by software. When it is realized by software, programs constituting the software are installed into a computer (the controller 100). These programs may be distributed to users by being recorded in removable media or may be distributed by being downloaded into the computers of the users through a network. Furthermore, these programs may be provided to the computers (the controllers 100) of the users as a Web service through a network without being downloaded.

EXPLANATION OF REFERENCE NUMERALS

11: CPU
100: Numerical controller
111: Graph generation portion
112: Error node addition portion
113: Control point coordinate system insertion portion
114: Identifier allocation portion
115: Error node generation portion
116: Control point coordinate system specification portion
117: Command value determination portion
118: Movement command portion
141: Machine configuration graph storage portion
142: Error information storage portion
181: Simultaneous equation generation portion
182: Simultaneous equation solving portion
183: Movement pulse generation portion

The invention claimed is:
1. A controller that expresses a machine configuration of a control target in a form of a graph in which constituent elements are nodes and that holds the machine configuration, the controller comprising at least one memory and at least one processor, wherein the at least one memory stores instructions configured with the at least one processor to function as:
  a control point coordinate system insertion portion that inserts, as a node, a control point and a coordinate system into each of the nodes in the graph of the machine configuration;
  an identifier allocation portion that allocates an identifier to the control point and the coordinate system which have been inserted;
  an error information storage portion that stores information related to a machine error in the control target and the identifier allocated to a coordinate system in which the machine error is observed;
  an error node generation portion that transforms the machine error into an equivalent error node;

an error node addition portion that adds the error node in the graph of the machine configuration;

a control point coordinate system specification portion that specifies, with the identifier, one or more sets of the control point and the coordinate system in the graph of the machine configuration;

a command value determination portion that uses the control point and the coordinate system specified by the control point coordinate system specification portion to determine for which control point and on which coordinate system one or more command values commanded in a program correspond to a coordinate value; and a movement command portion that commands movement of the control point such that the coordinate value of the control point becomes equal to the command value, wherein the error node addition portion adds the error node so that the error node is adjacent to a node corresponding to a machine origin.

2. A controller that expresses a machine configuration of a control target in a form of a graph in which constituent elements are nodes and that holds the machine configuration, the controller comprising at least one memory and at least one processor, wherein the at least one memory stores instructions configured with the at least one processor to function as:

a control point coordinate system insertion portion that allows each of the nodes in the graph of the machine configuration to assign a control point and a coordinate system as information;

an identifier allocation portion that allocates an identifier to the control point and the coordinate system which have been assigned;

an error information storage portion that stores information related to a machine error in the control target and the identifier allocated to a coordinate system in which the machine error is observed;

an error node generation portion that transforms the machine error into an equivalent error node;

an error node addition portion that adds the error node in the graph of the machine configuration;

a control point coordinate system specification portion that specifies, with the identifier, one or more sets of the control point and the coordinate system in the graph of the machine configuration;

a command value determination portion that uses the control point and the coordinate system specified by the control point coordinate system specification portion to determine for which control point and on which coordinate system one or more command values commanded in a program correspond to a coordinate value; and a movement command portion that commands movement of the control point such that the coordinate value of the control point becomes equal to the command value, wherein the error node addition portion adds the error node so that the error node is adjacent to a node corresponding to a machine origin.

3. The controller according to claim 1, wherein the graph of the machine configuration is capable of including, as a constituent element, a unit into which a plurality of axes are integrated.

4. The controller according to claim 3, the controller being configured define the unit by analyzing a script described by a user, the controller being capable of including the unit defined, as a constituent element in the graph of the machine configuration.

5. The controller according to claim 1, wherein the error node generation portion transforms the machine error into an equivalent error node by transforming a translational error and a rotational error between different coordinate systems.

6. The controller according to claim 2, wherein the error node generation portion transforms the machine error into an equivalent error node by transforming a translational error and a rotational error between different coordinate systems.

7. The controller according to claim 1, wherein the error node generation portion transforms the machine error into a value relative to an error node insertion position to thereby generate the error node.

8. The controller according to claim 1, wherein the error node generation portion transforms the machine error into an error in an error node insertion position to thereby generate the error node.

9. The controller according to claim 2, wherein the error node generation portion transforms the machine error into a value relative to an error node insertion position to thereby generate the error node.

10. The controller according to claim 2, wherein the error node generation portion transforms the machine error into an error in an error node insertion position to thereby generate the error node.

11. The controller according to claim 1, wherein the at least one memory stores instructions configured with the at least one processor to further function as a graph generation portion that expresses the machine configuration in a form of a graph, and sets a parent-child relationship of constituent elements in which when a coordinate value of one of nodes is varied, a geometric state of the other of the nodes and/or a geometric state of the one of the nodes are/is affected.

12. The controller according to claim 2, wherein the at least one memory stores instructions configured with the at least one processor to further function as a graph generation portion that expresses the machine configuration in a form of a graph, and sets a parent-child relationship of constituent elements in which when a coordinate value of one of nodes is varied, a geometric state of the other of the nodes and/or a geometric state of the one of the nodes are/is affected.

* * * * *